US005502295A

United States Patent [19]

Owen et al.

[11] Patent Number: 5,502,295

[45] Date of Patent: Mar. 26, 1996

[54] WIRELESS POWERING AND COMMUNICATION SYSTEM FOR COMMUNICATING DATA BETWEEN A HOST SYSTEM AND A STAND-ALONE DEVICE

[75] Inventors: William H. Owen, Los Altos Hills; James M. Jaffe, Santa Clara, both of Calif.

[73] Assignee: Xicor, Inc., Milpitas, Calif.

[21] Appl. No.: 420,347

[22] Filed: Apr. 11, 1995

Related U.S. Application Data

[62] Division of Ser. No. 974,131, Nov. 10, 1992, Pat. No. 5,434,396.

[51] Int. Cl.[6] .......... G06K 5/00

[52] U.S. Cl. .......... 235/380; 235/449

[58] Field of Search .......... 235/384, 449, 235/492, 487, 493, 494, 380

[56] References Cited

U.S. PATENT DOCUMENTS

| | | | |
|---|---|---|---|
| 4,650,981 | 3/1987 | Foleta | 235/380 |
| 4,827,115 | 5/1989 | Uchioa et al. | 235/380 |

*Primary Examiner*—John Shepperd
*Assistant Examiner*—Le T. Minh
*Attorney, Agent, or Firm*—Coudert Brothers

[57] ABSTRACT

A wireless communication system for communicating between a host system and a stand-alone device through an electromagnetic coupling medium is disclosed. The communication system has the capabilities of bi-directional data communications between the host and the stand-alone device and of powering the stand-alone device with energy pulses coupled through the electromagnetic coupling medium from the host. The electromagnetic medium is capable of supporting the bi-directional flow of energy pulses and energy transitions thereof between the host and stand-alone device. In one embodiment, bi-directional communication is provided by transmitting and detecting predetermined numbers of consecutive energy transitions coupled through the medium. Resting durations immediately precede and follow each predetermined number of consecutive energy transitions. In a preferred embodiment of the present invention, the host communicates a first binary value to the stand-alone device by coupling a first predetermined number of consecutive energy transitions to the device and a second binary value to the device by coupling a second predetermined number of consecutive energy transitions. Additionally, the host system receives data from the stand-alone device by first coupling a third predetermined number of consecutive energy transitions to the stand-alone device. The stand-alone device then responds by coupling a predetermined number of energy transitions to the medium during the resting duration following the host's transmission of the third predetermined number of consecutive energy transitions. The number of energy transitions sent by the stand-alone device during this resting duration is related to the value of the data digit being sent to the host.

8 Claims, 22 Drawing Sheets

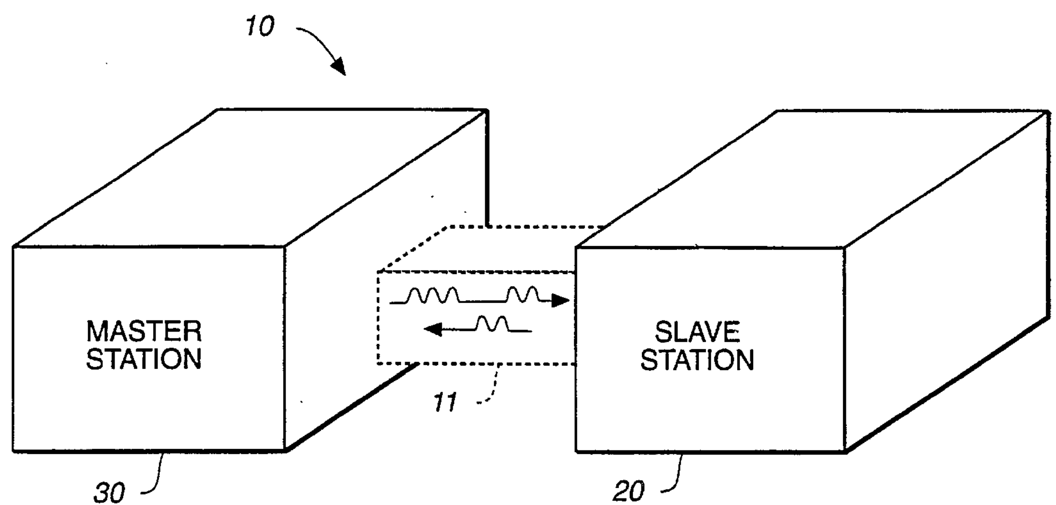
FIG._1
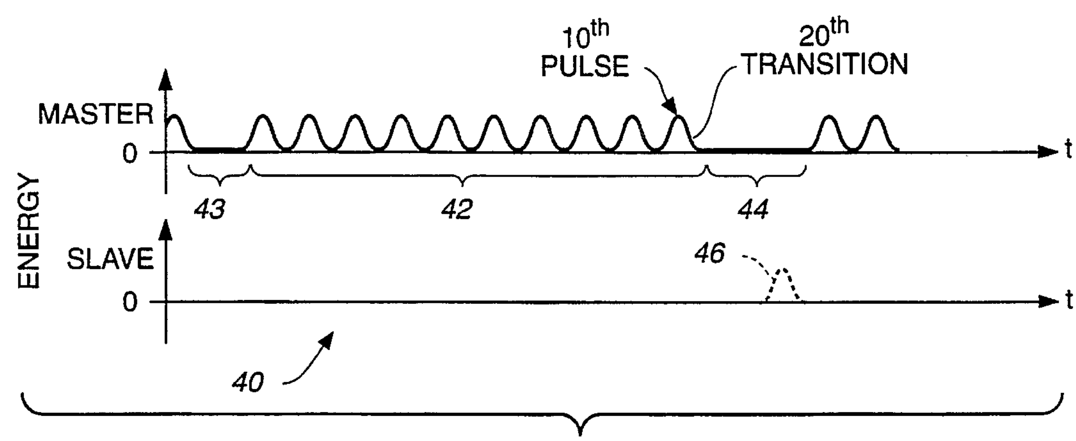
FIG._2A
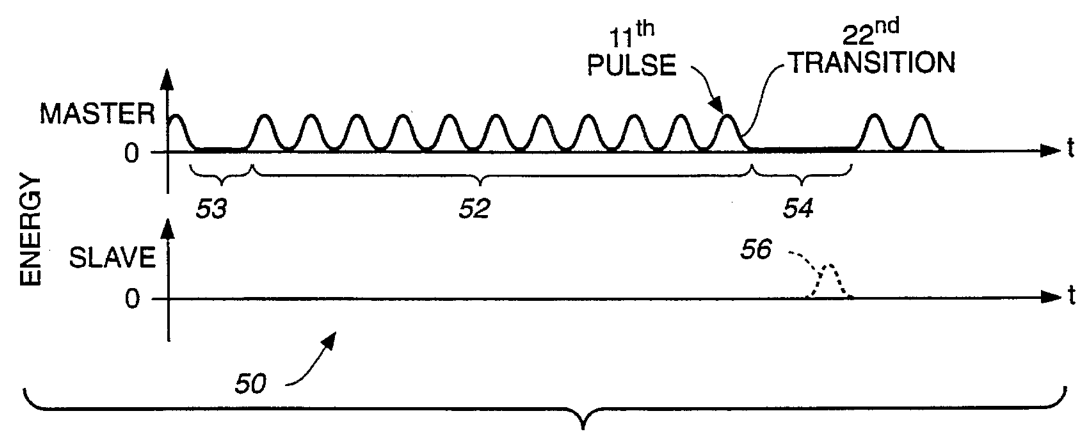
FIG._2B

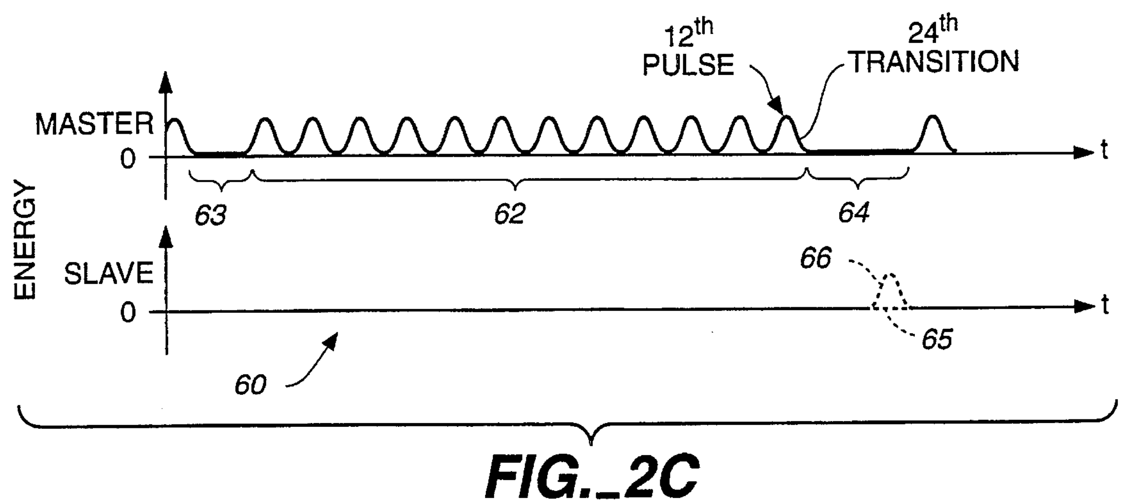
FIG._2C
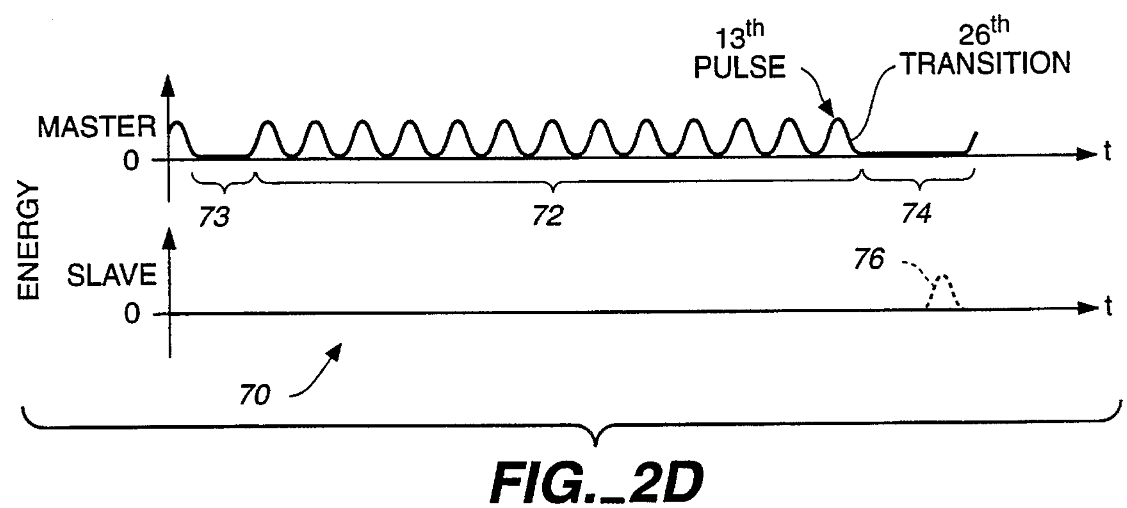
FIG._2D
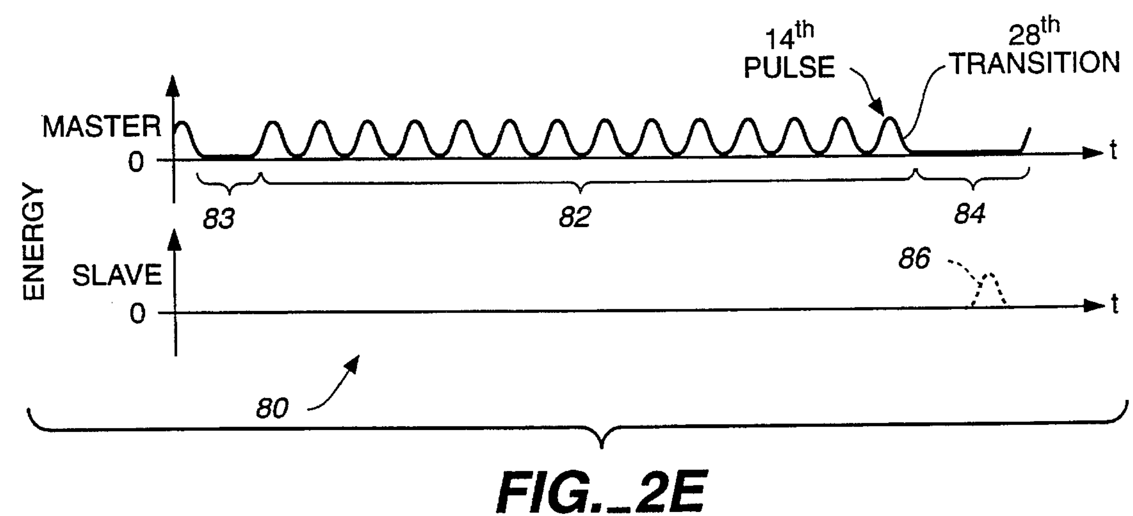
FIG._2E

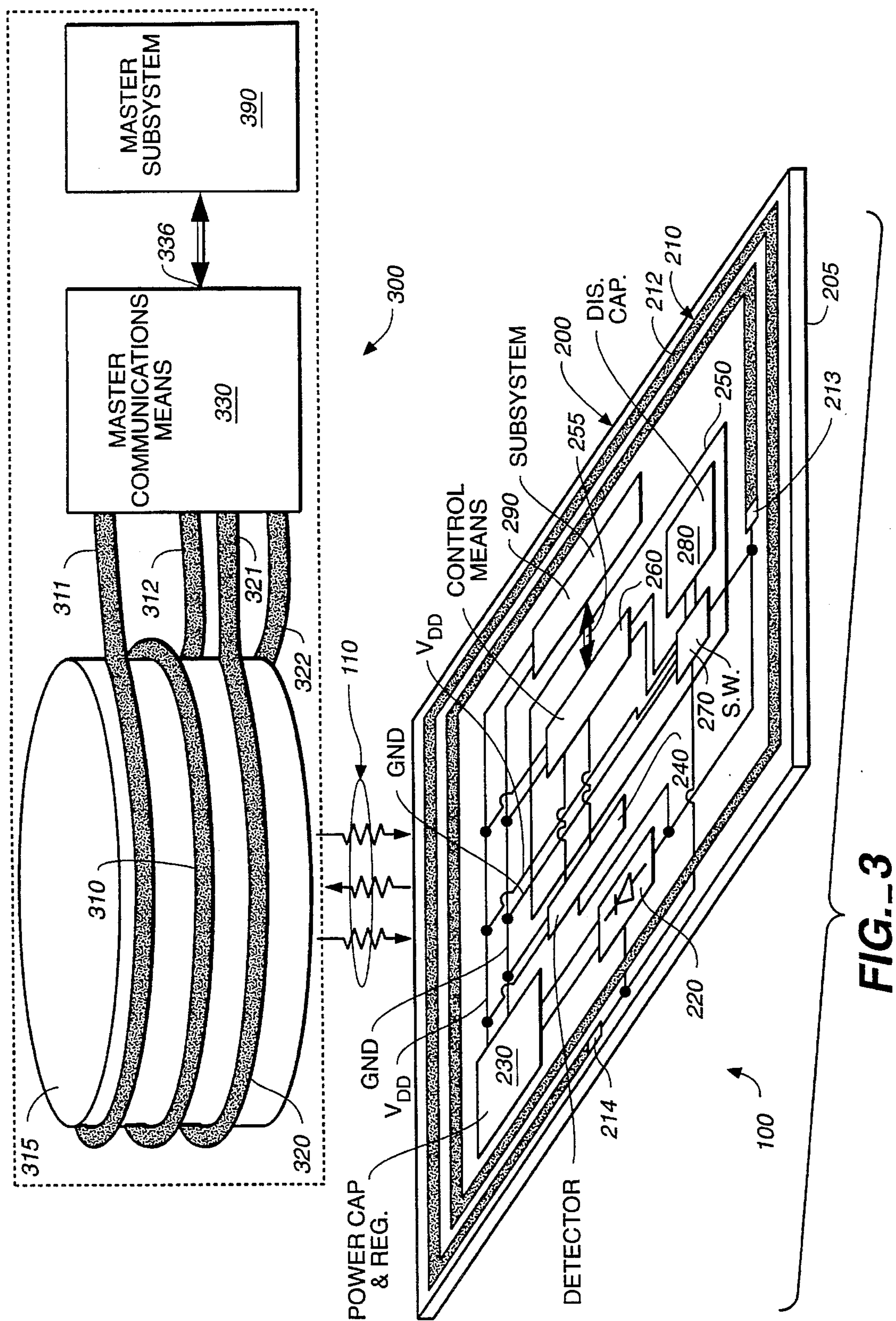
FIG._3

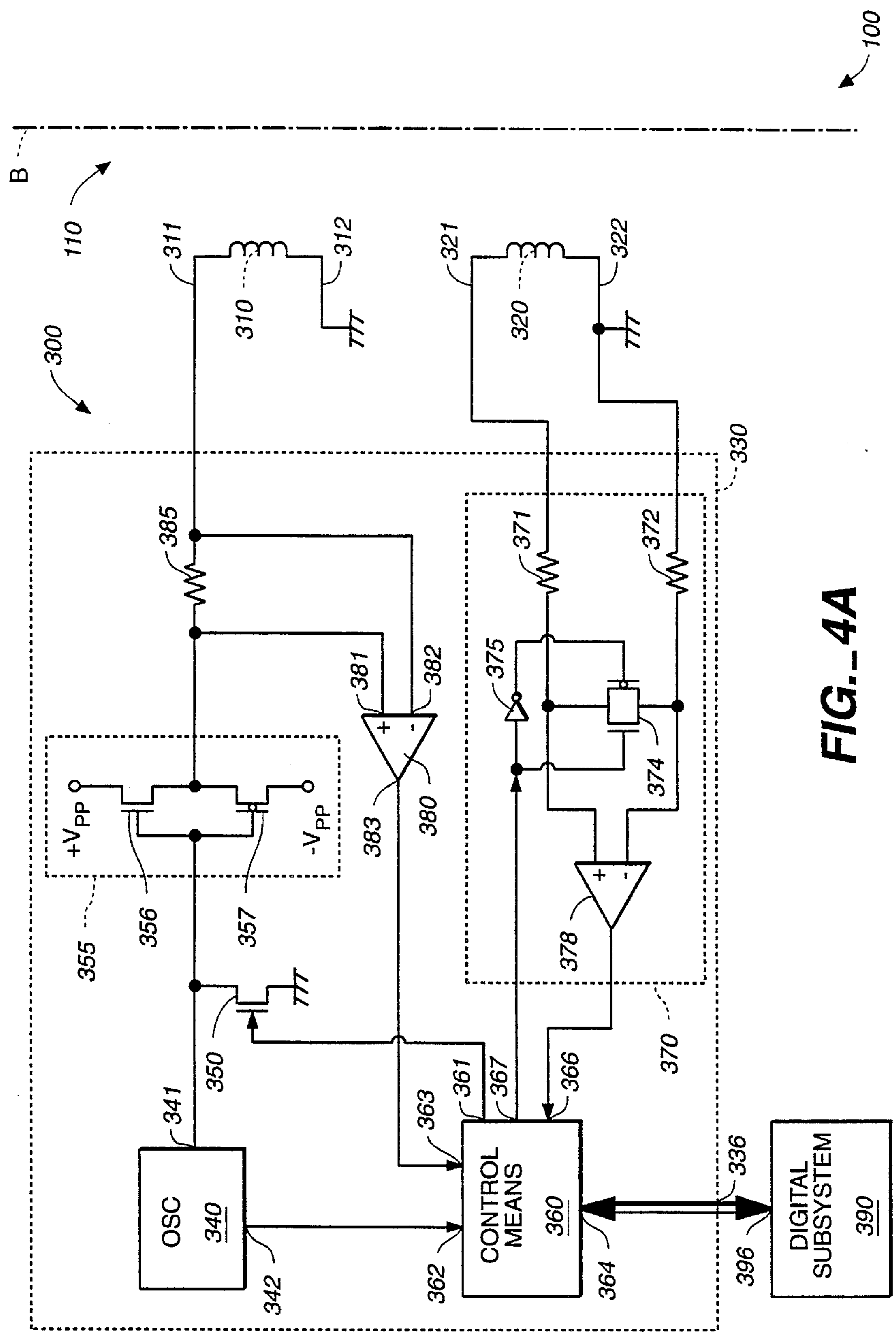
FIG._4A

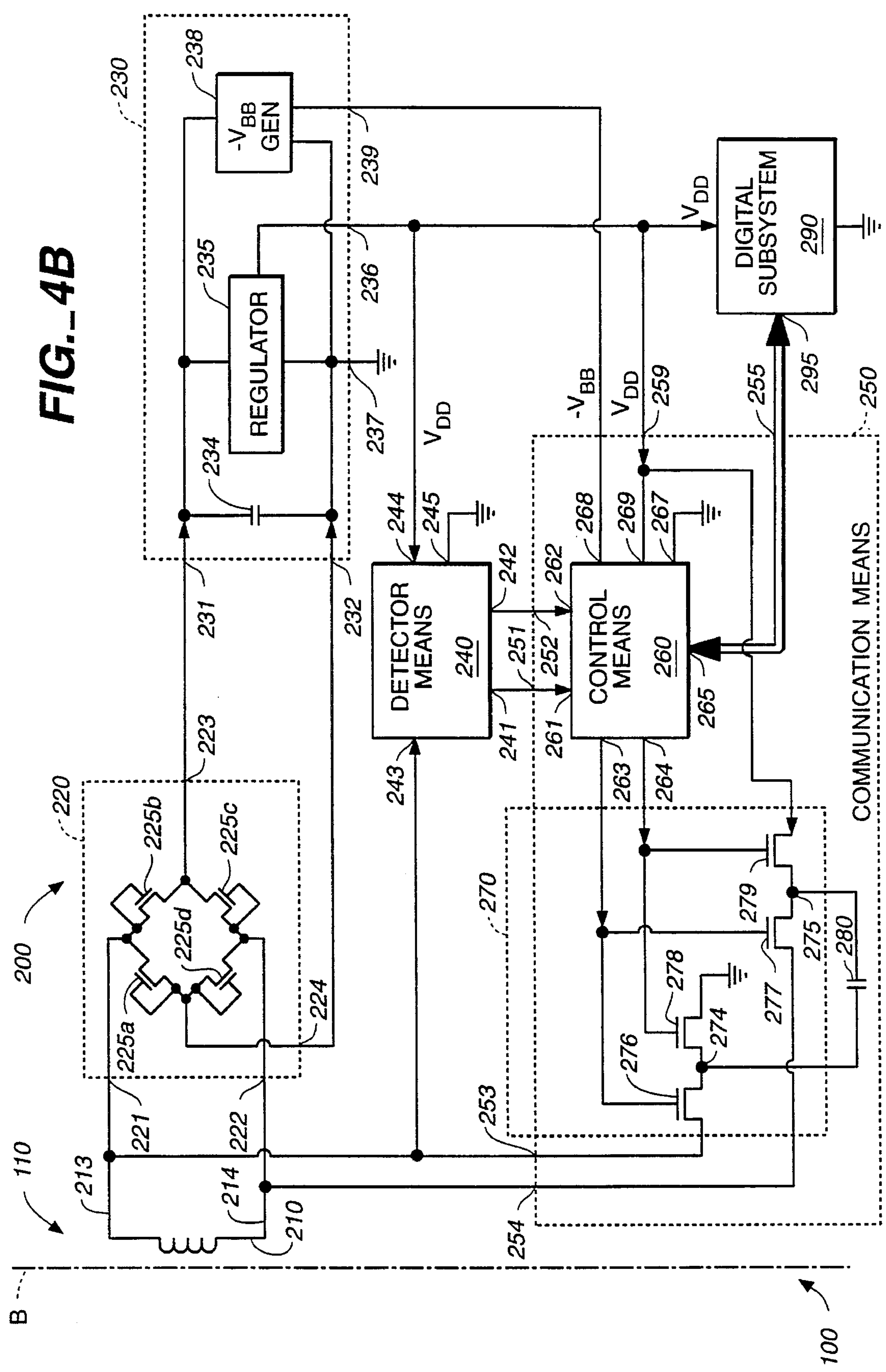
FIG._4B
-VBB GEN
REGULATOR
DIGITAL SUBSYSTEM
290
DETECTOR MEANS
240
CONTROL MEANS
260
COMMUNICATION MEANS
VDD
-VBB
230
238
239
235
236
234
237
244
245
242
262
268
269
267
259
255
295
250
231
232
251
252
241
261
265
263
264
243
220
223
225b
225c
225d
225a
224
200
270
279
275
280
278
277
274
276
221
222
253
254
110
213
214
210
B
100

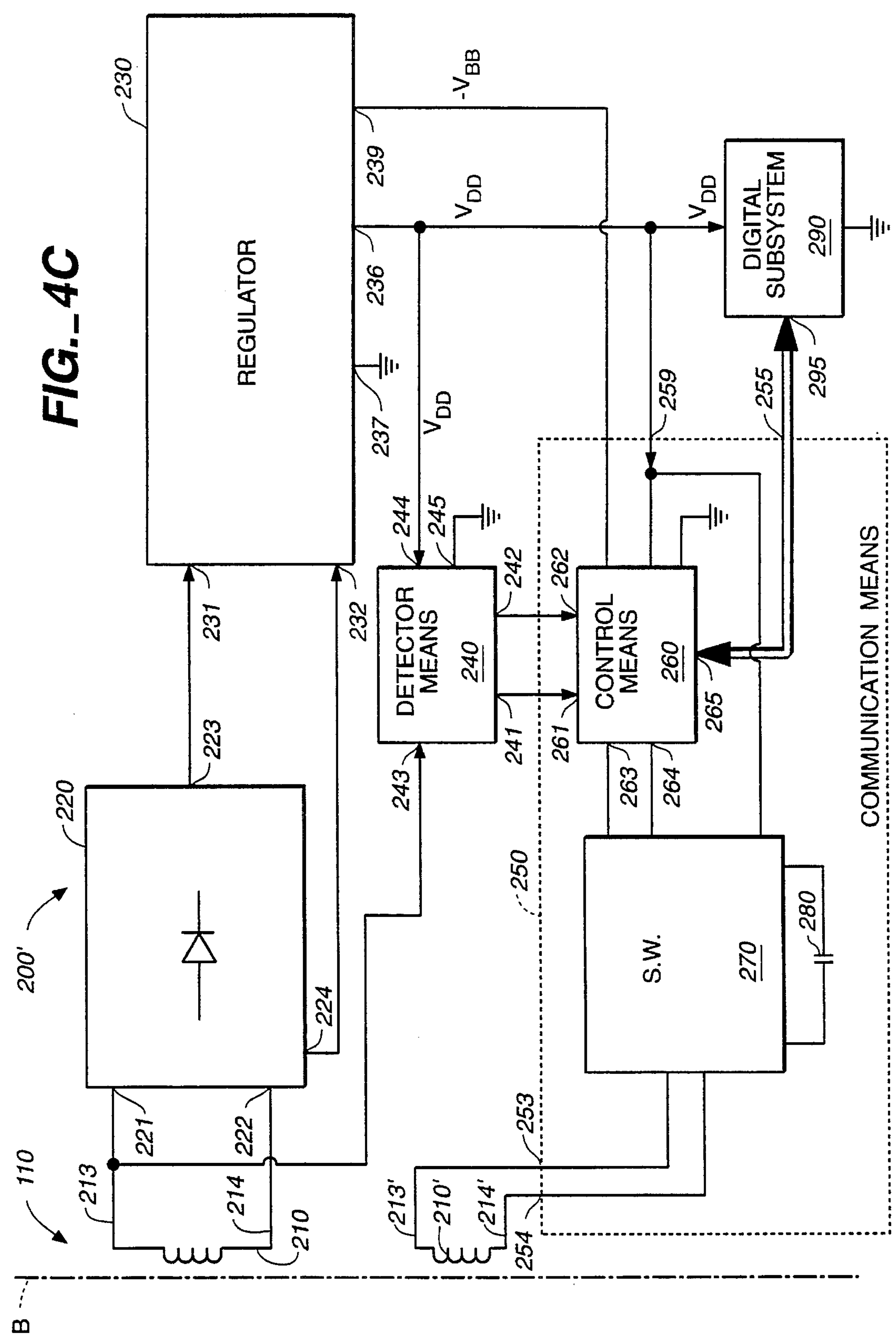
FIG._4C
REGULATOR
230
239
-V_BB
236
V_DD
237
V_DD
DIGITAL SUBSYSTEM
290
295
255
259
DETECTOR MEANS
240
244
245
242
241
243
CONTROL MEANS
260
262
261
265
263
264
COMMUNICATION MEANS
250
S.W.
270
280
231
232
223
220
224
200'
221
222
213
214
210
110
213'
210'
214'
253
254
B

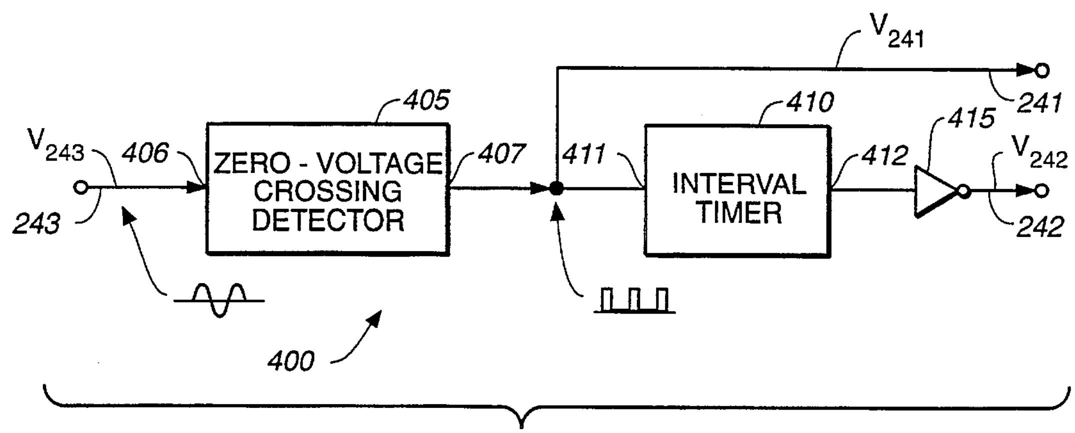
FIG._5A
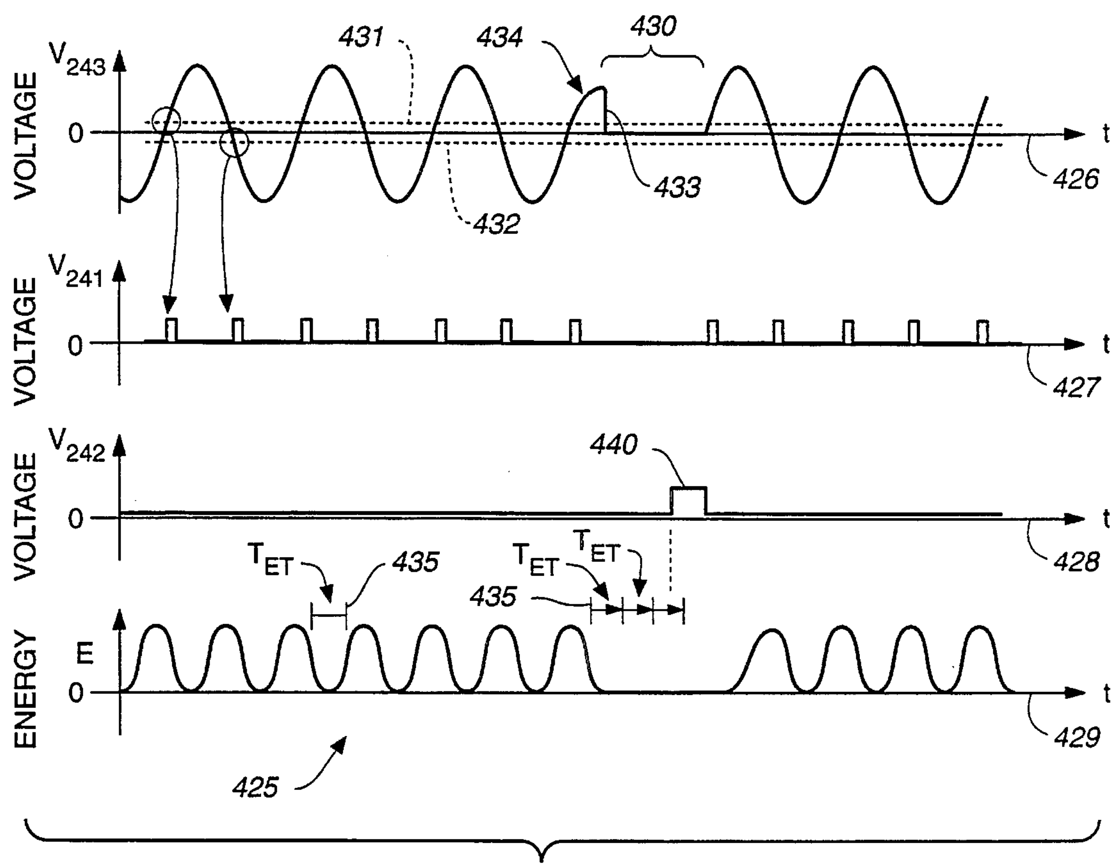
FIG._5B

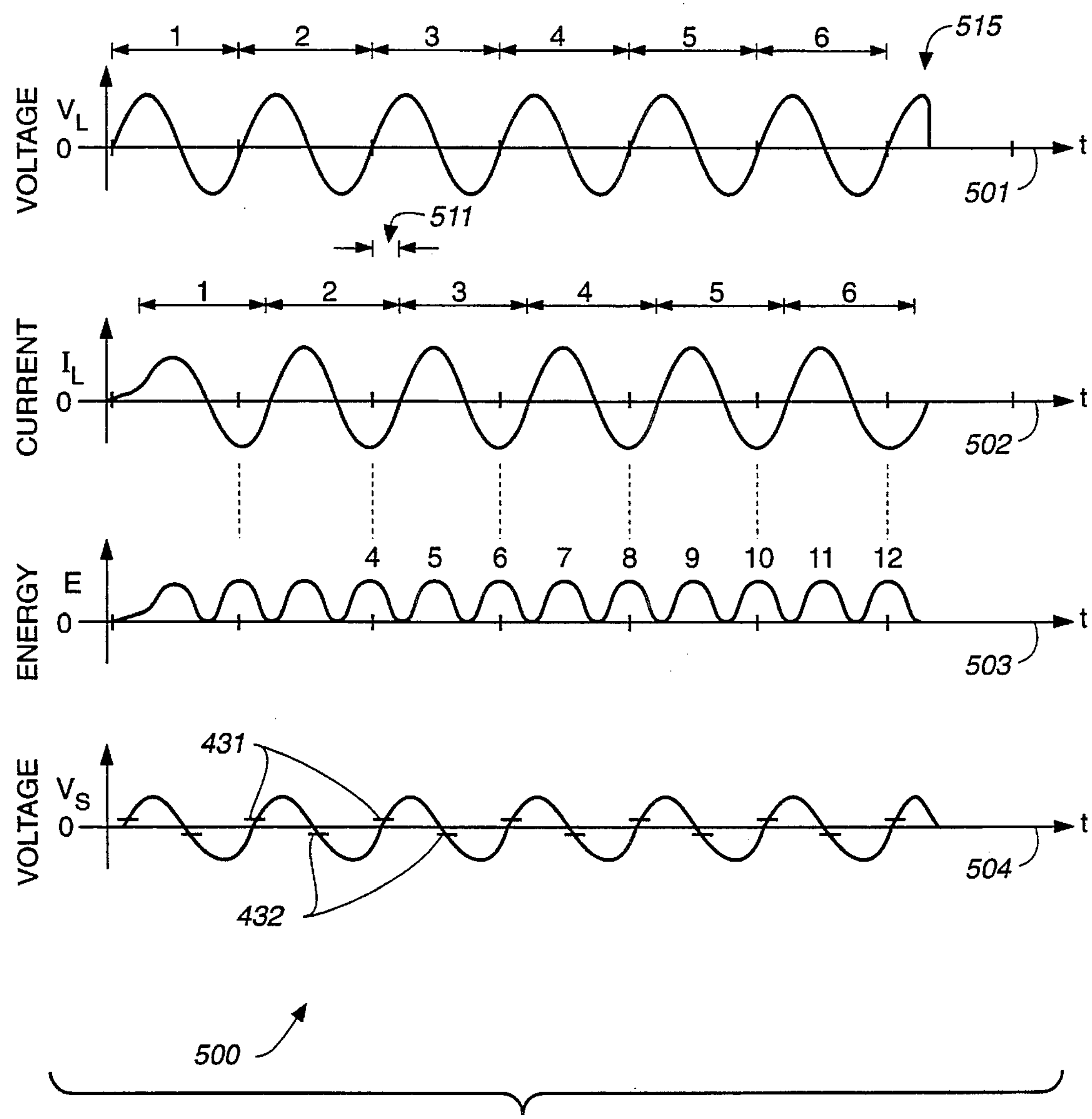
FIG._6

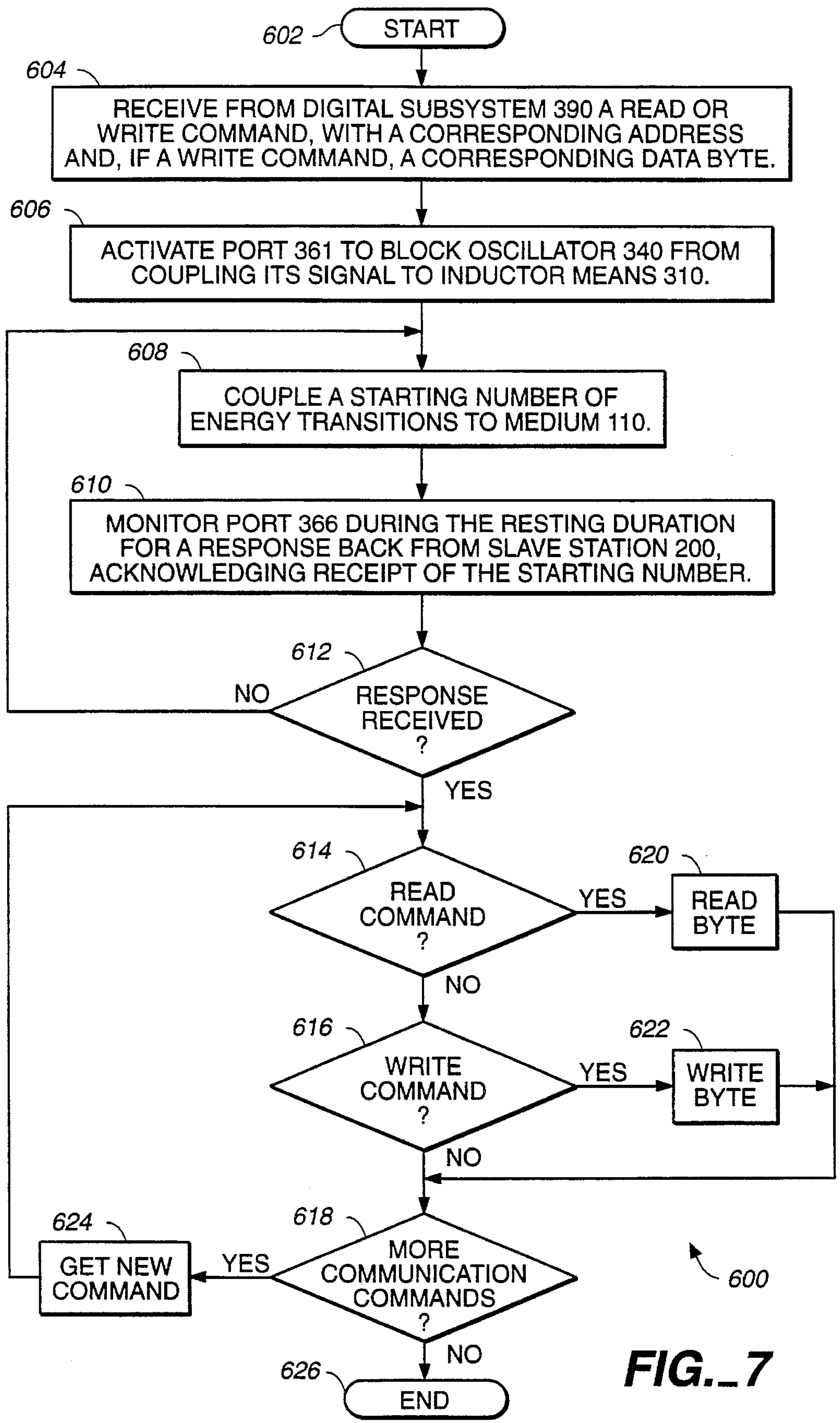
FIG._7

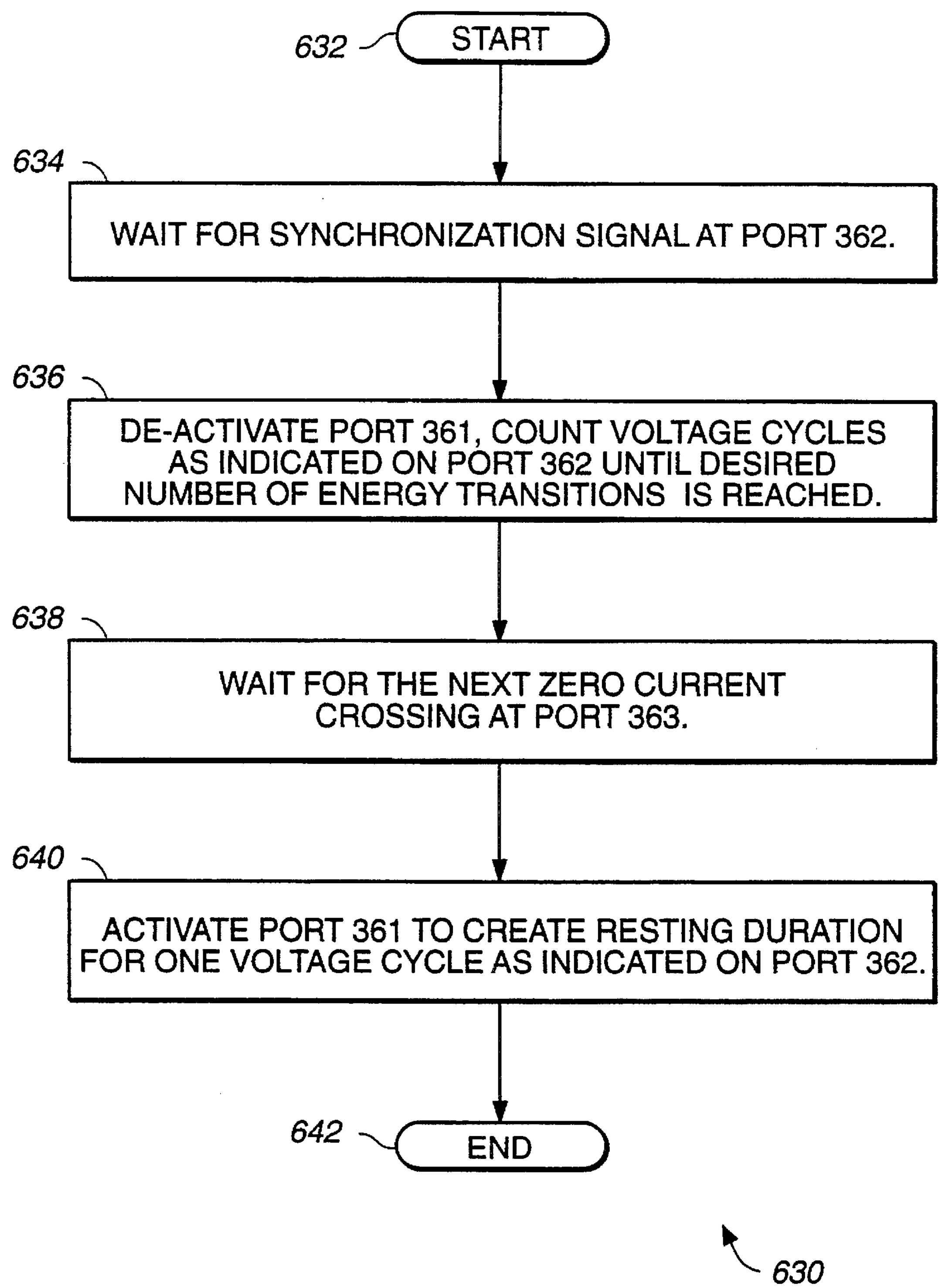
FIG._8

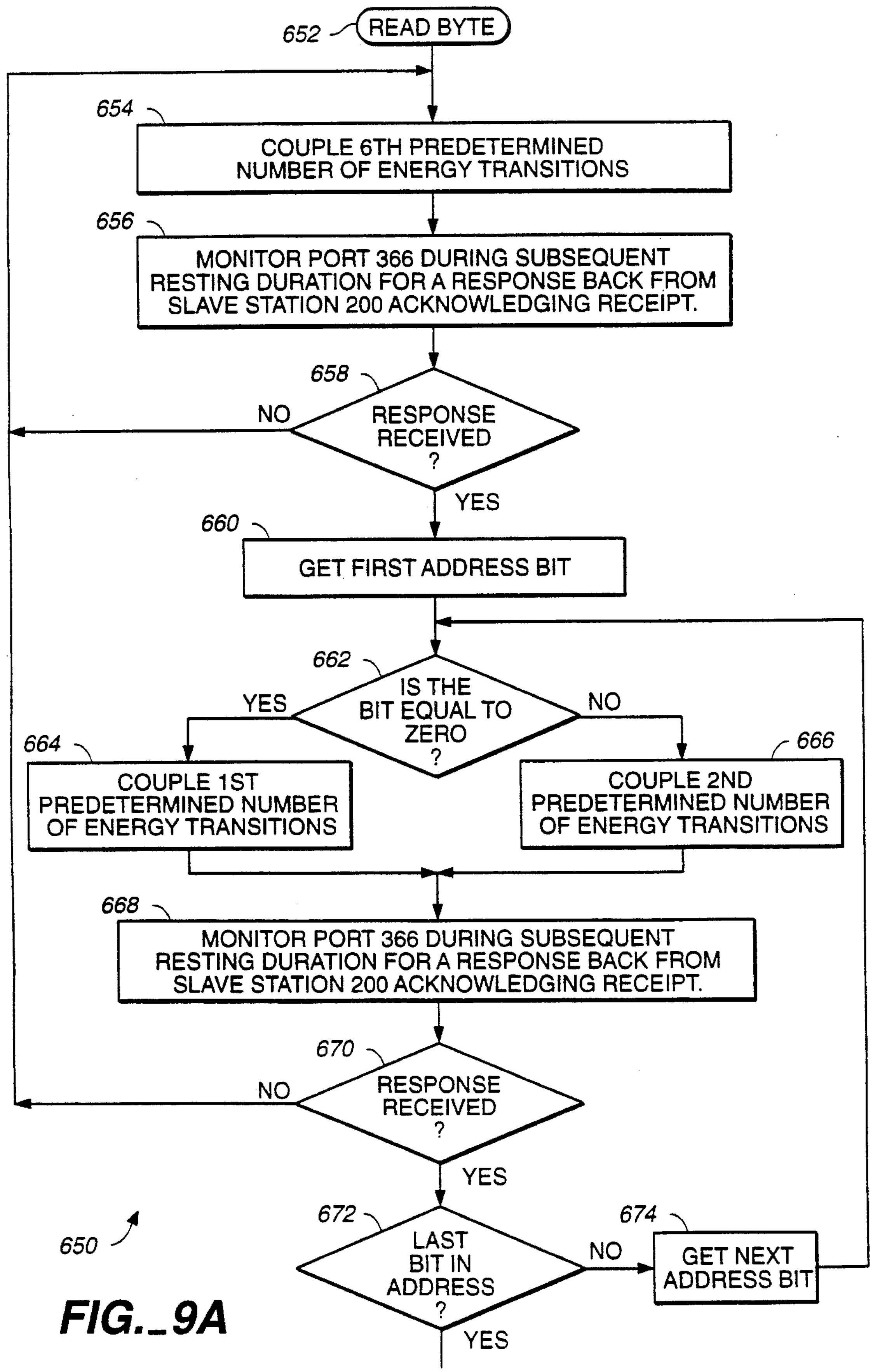
FIG._9A

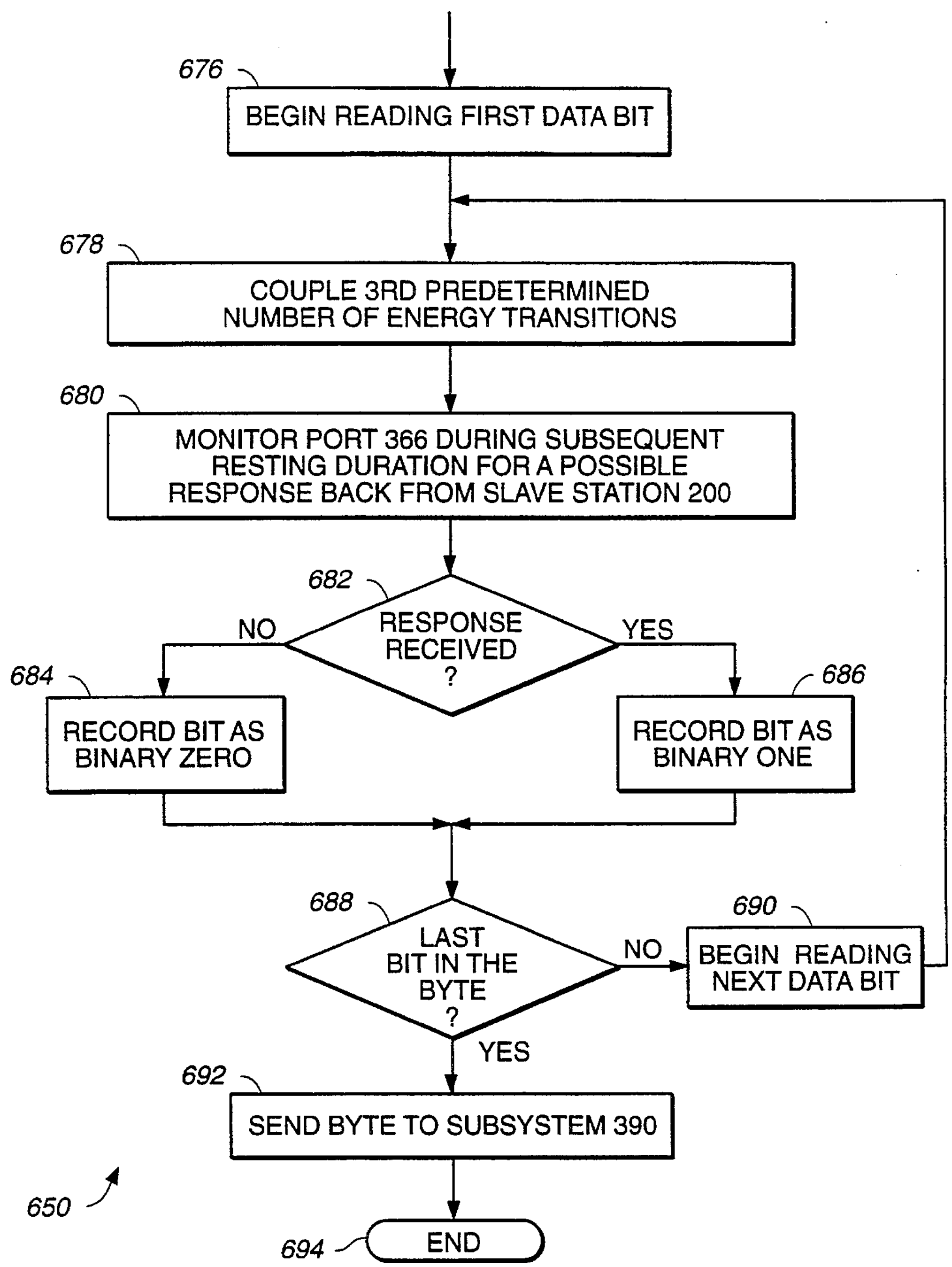
FIG._9B
FIG._9

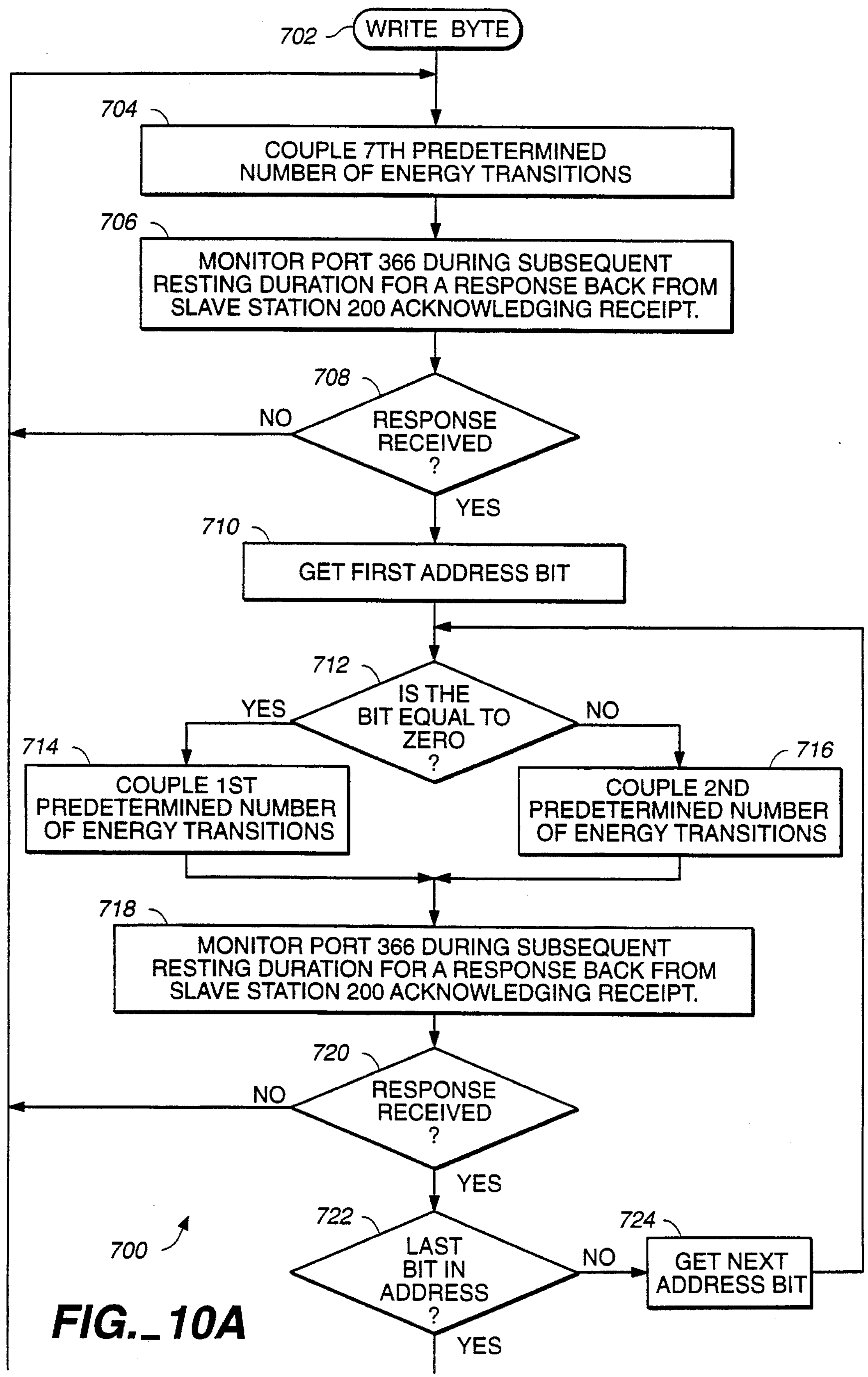
FIG._10A

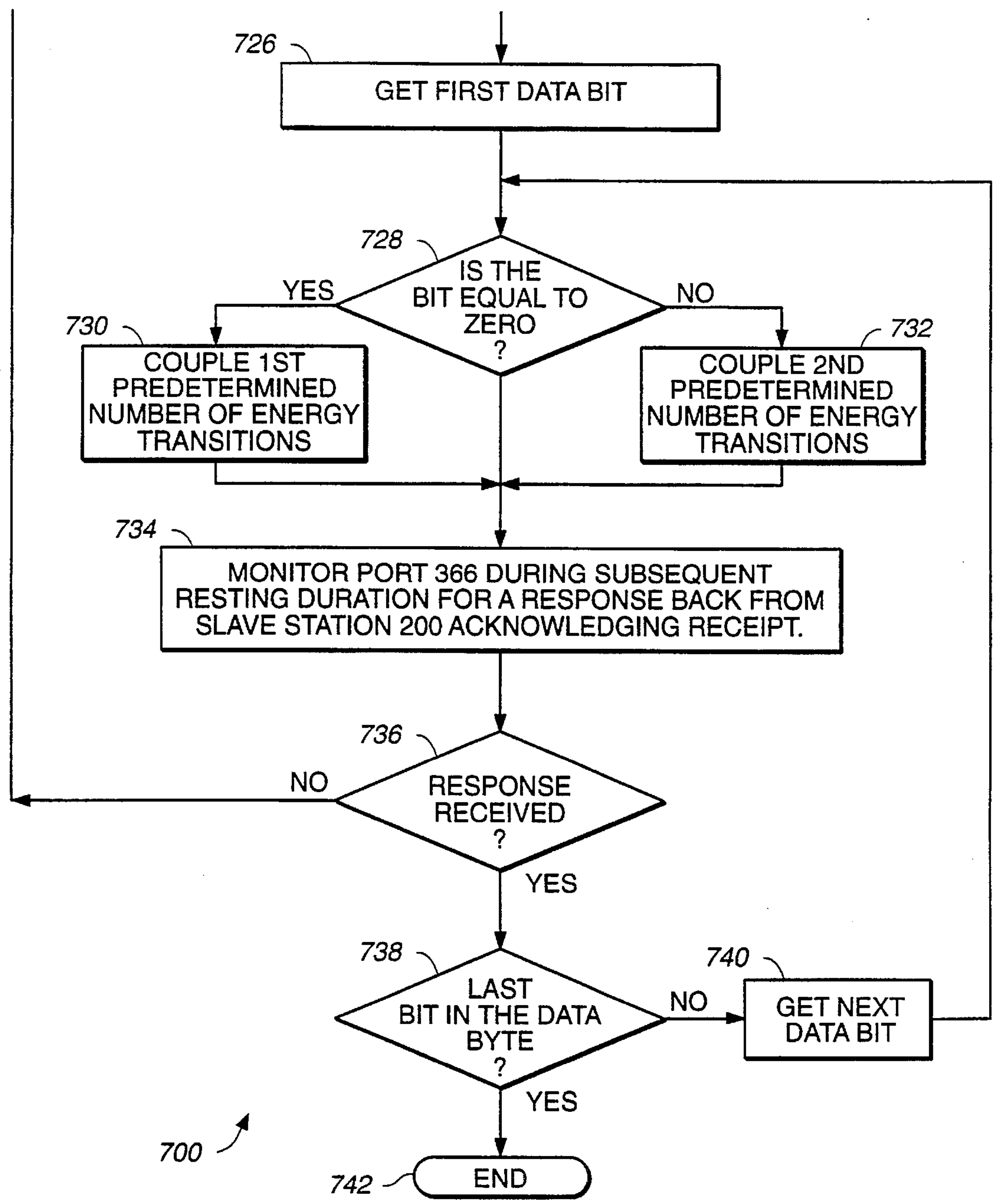
FIG._10B
FIG._10

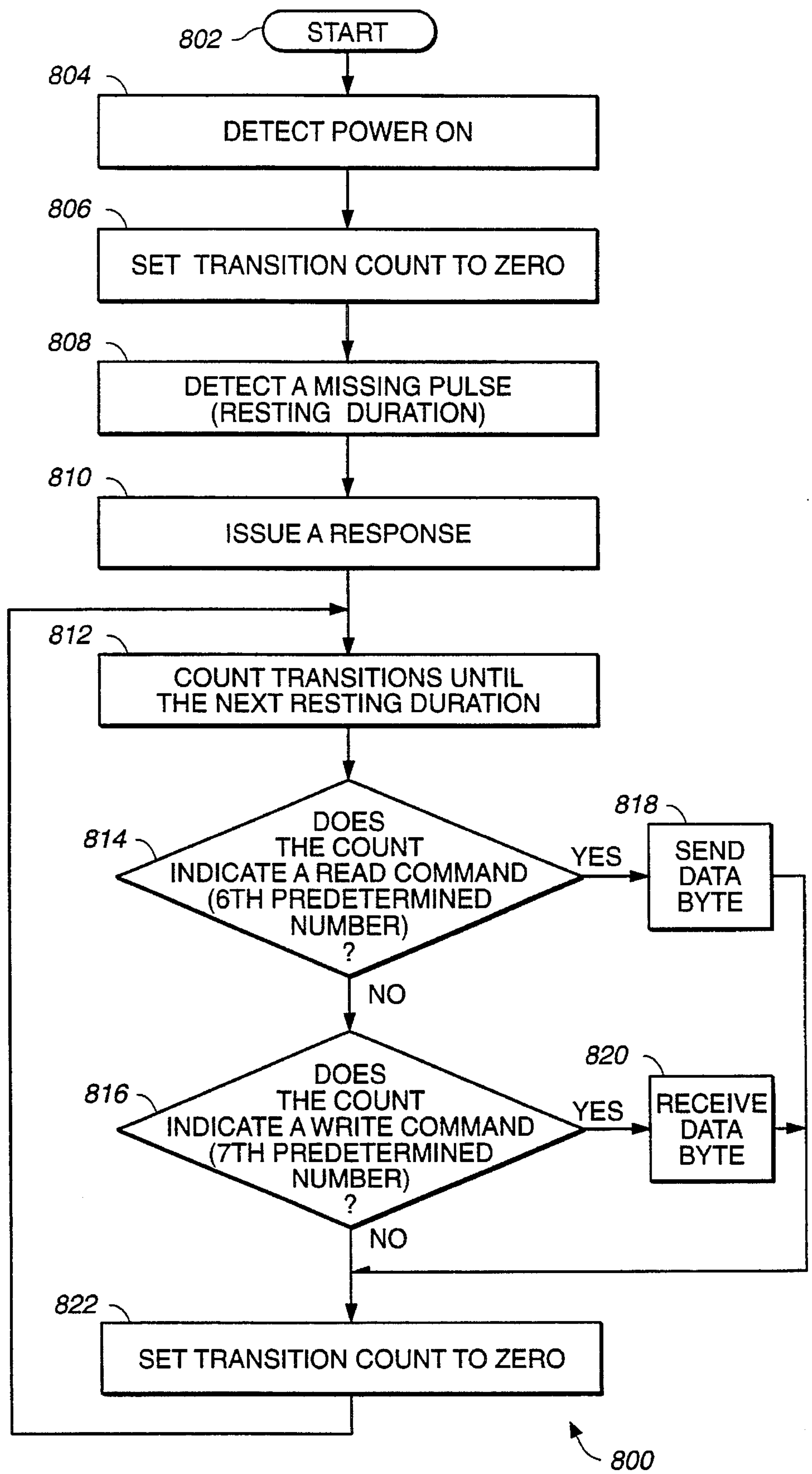
FIG._11

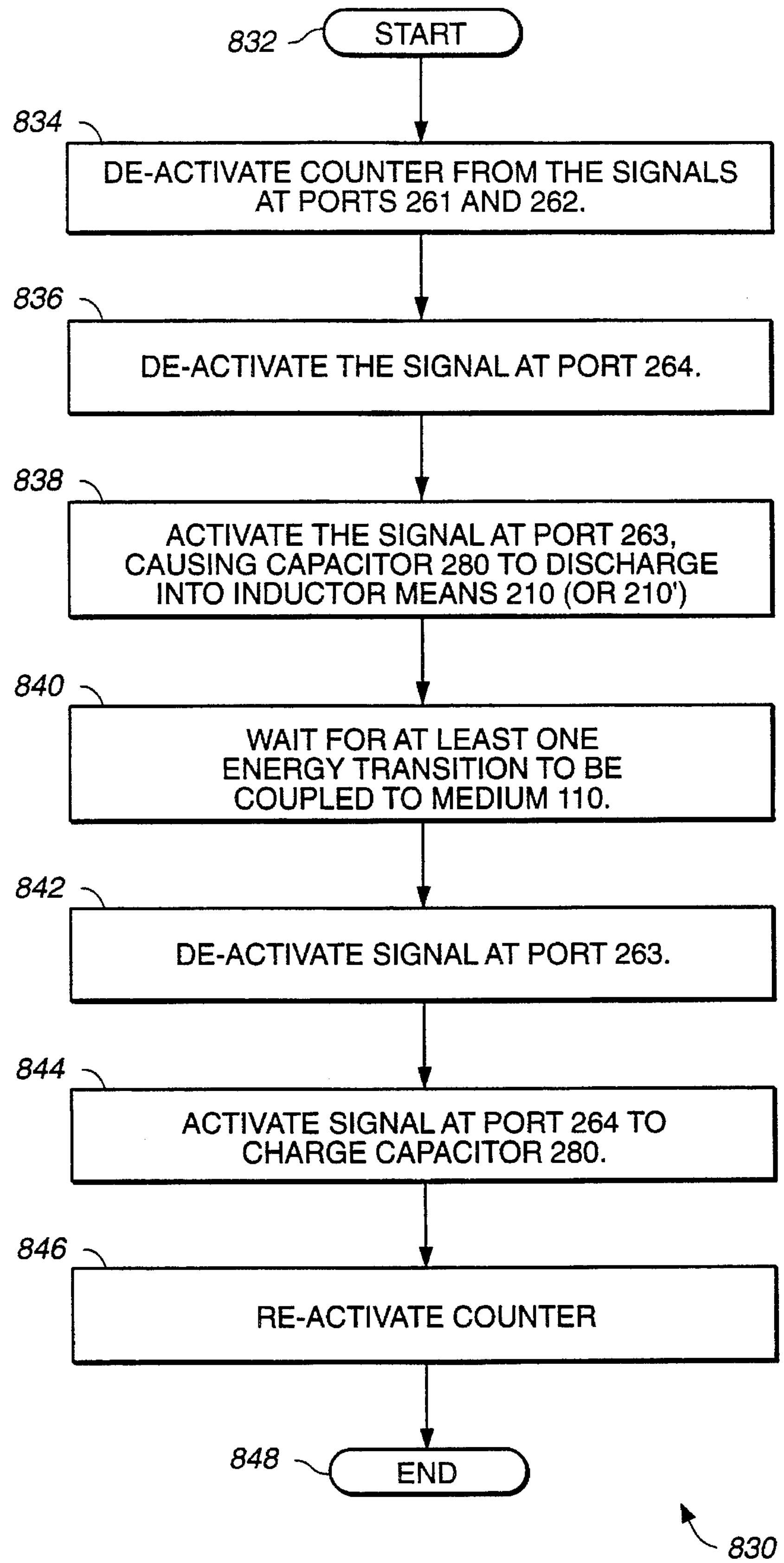
FIG._12

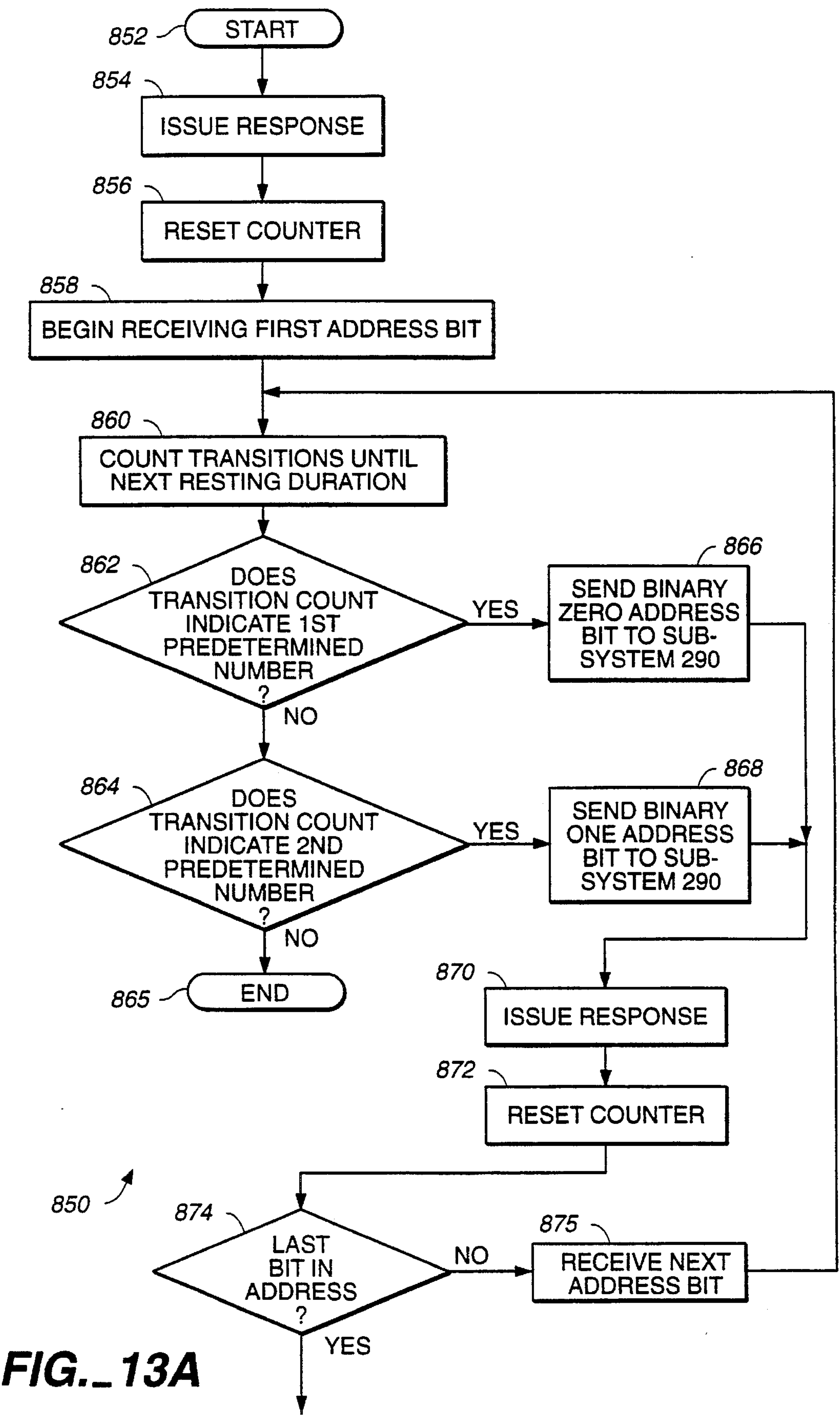
FIG._13A

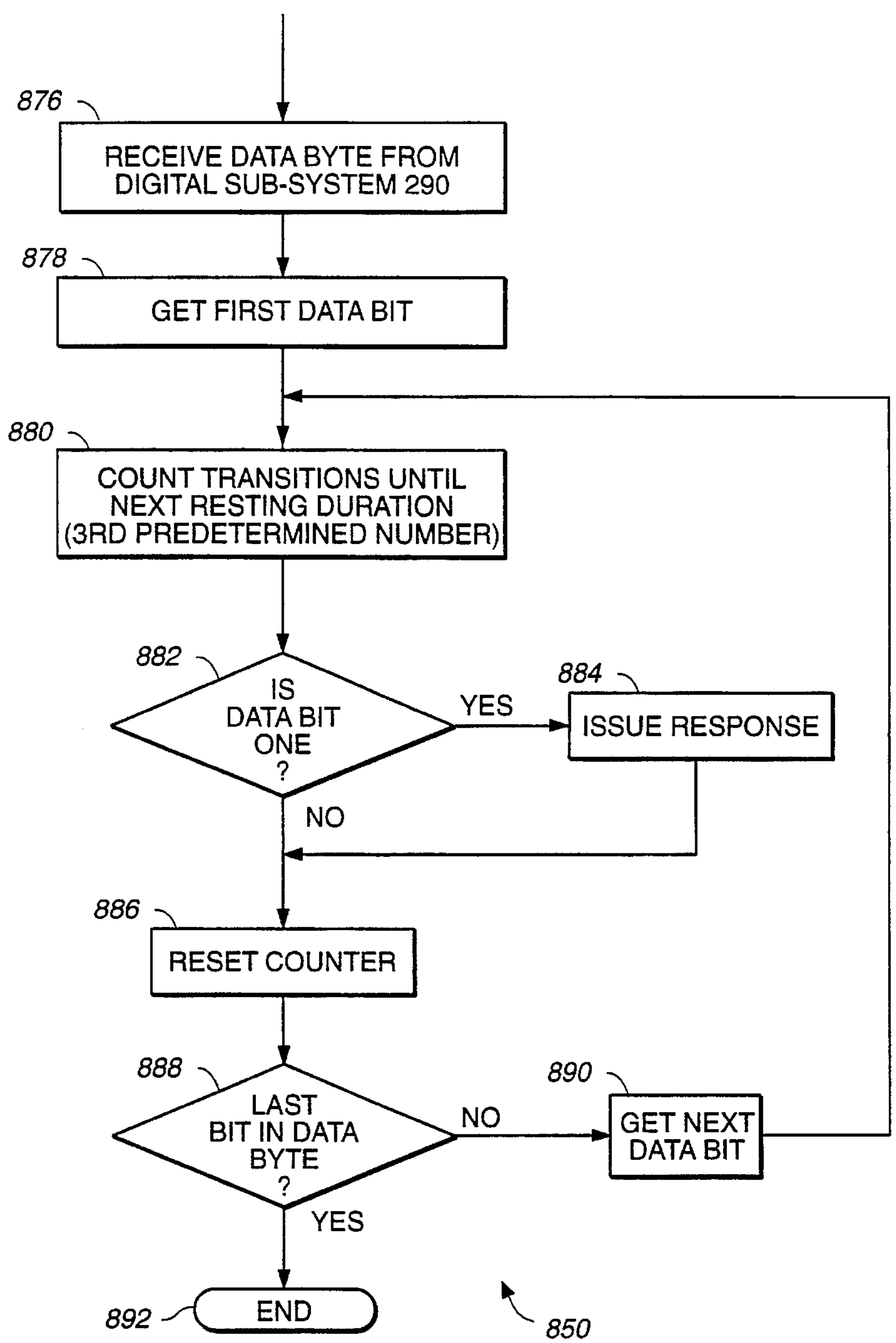
FIG._13B
17 / 22
FIG._13A
18 / 22
FIG._13B
FIG._13

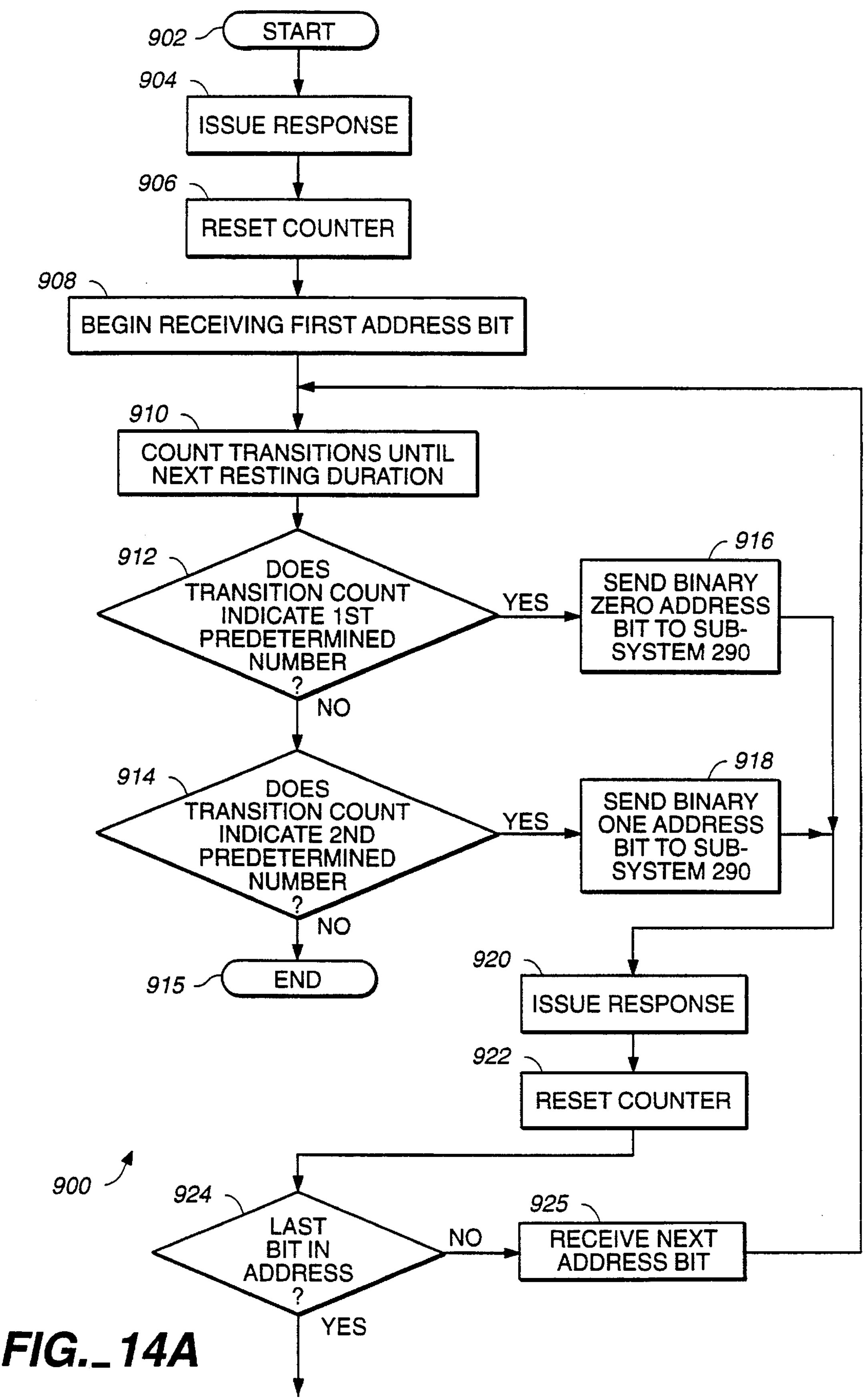
FIG._14A

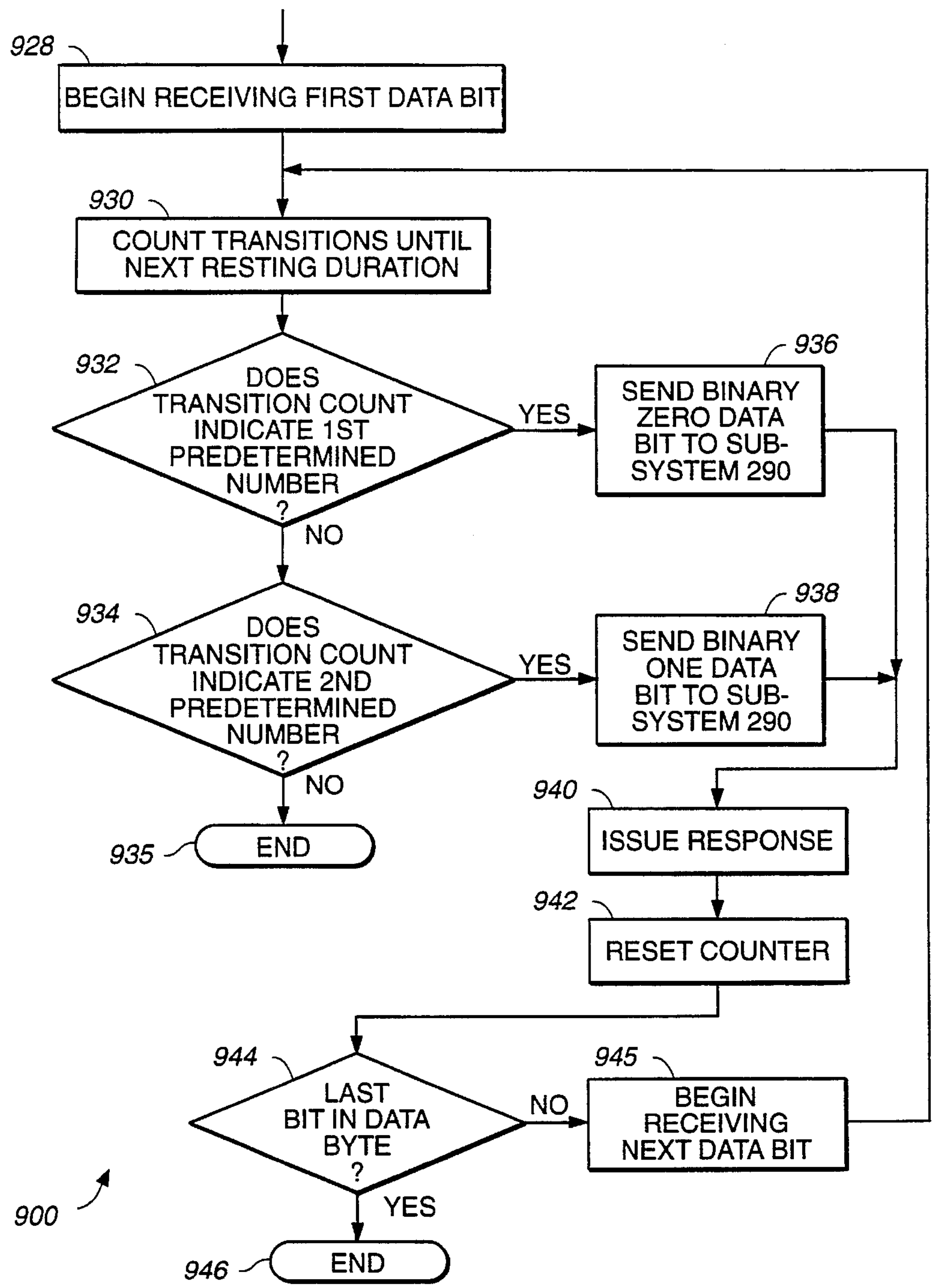
FIG._14B
19 / 22
FIG._14A
20 / 22
FIG._14B
FIG._14

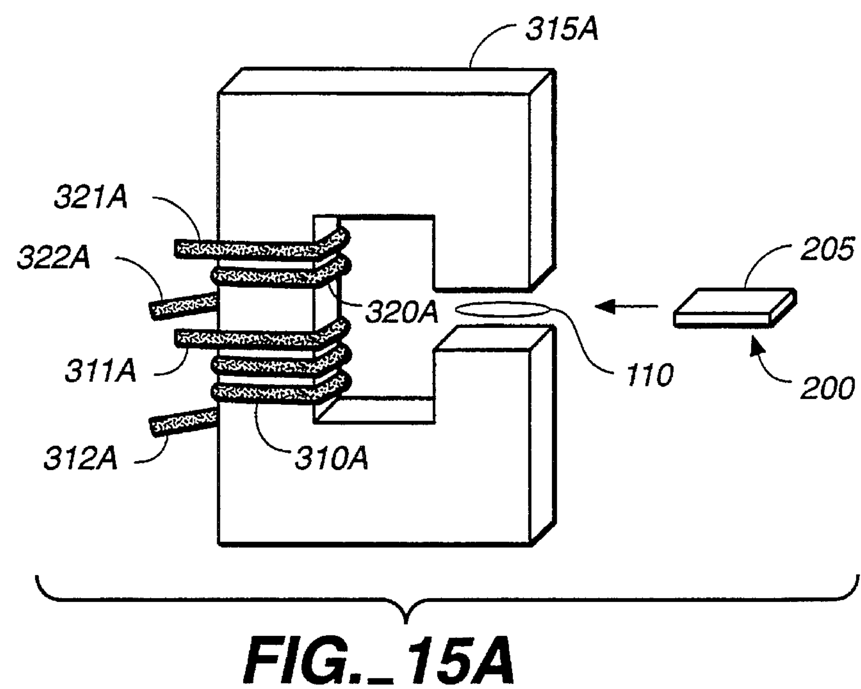
FIG._15A
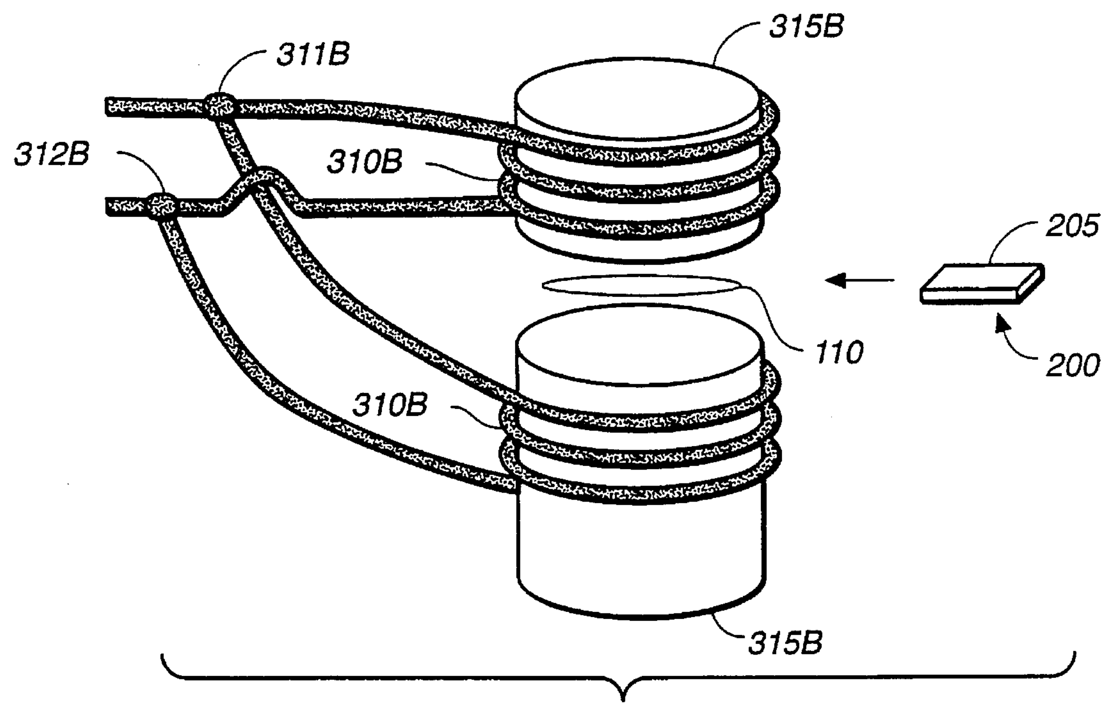
FIG._15B

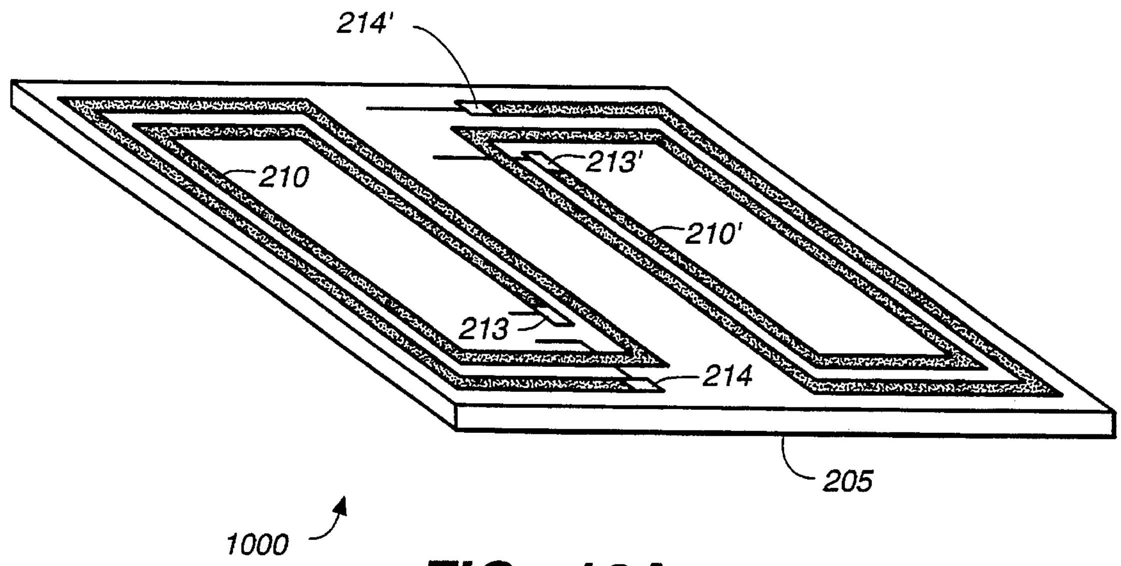
FIG._16A
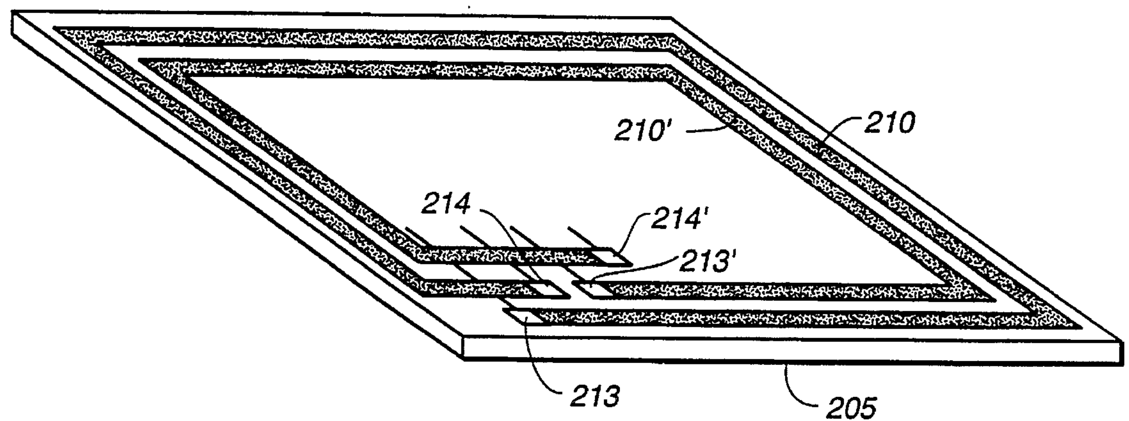
FIG._16B

WIRELESS POWERING AND COMMUNICATION SYSTEM FOR COMMUNICATING DATA BETWEEN A HOST SYSTEM AND A STAND-ALONE DEVICE

This is a divisional of application Ser. No. 07/974,131 filed Nov. 10, 1992, now U.S. Pat. No. 5,434,396.

The present invention relates to communication systems, and methods and apparatus thereof, for communicating between a host system and a stand-alone device, such as an integrated circuit device, through an electromagnetic medium and for providing the capability of simultaneously powering the stand-alone device with energy coupled through the medium. In particular, the present invention relates to single-chip communication systems, methods and apparatus thereof, for communicating between a host and a stand-alone integrated circuit device and for simultaneously powering the integrated circuit.

BACKGROUND OF THE INVENTION

Various means and methods for communicating between a stand-alone device and a host environment without the need for direct wire connections are currently known in the art. An example of such stand-alone devices are integrated-circuit storage devices, usually of the non-volatile type, which may store business transaction information, such as credit card information. An example of a host environment which would operate with such a credit card would be an electronic information processing device which utilizes and updates the information stored by the above-mentioned integrated-circuit storage devices. Another example of such a stand-alone device would be a security pass card which, upon being powered, would output a digital "password" to a corresponding host environment for security clearance. The advantage of these wireless systems over conventional magnetic-strip information bearing cards and the like is that they provide a more reliable communications channel between the host and the stand-alone device (e.g., card) because they are "contactless" systems. However, these wireless systems are more expensive to manufacture and have different reliability problems, as discussed below in grater detail.

Such prior art "wireless" stand-alone devices are generally constructed with a plurality of I.C. chips and magnetic coil components disposed on a substrate carrier (e.g., "credit card") using hybrid circuit construction techniques. This is because relatively complicated communications techniques are used by these wireless devices, which require multiple coils and multiple processing chips. For example, U.S. Pat. No. 4,605,844 to Haggan teaches a hybrid construction of two integrated circuit chips, three magnetic coils, and three separate communication channels for power, incoming data, and outgoing data in a stand-alone device. U.S. Pat. No. 4,720,626 to Nishikawa, et al., teaches a hybrid construction for a stand-alone device including an I.C. chip, a first coil for clock and power, a second coil for outputting data, and a hall-effect device for receiving data. As with Haggan, three separate "channels" are used: power/clock, data in, and data out. U.S. Pat. No. 4,791,285 to Ohki also teaches a hybrid construction including an I.C. chip and four coils (power, data in, data out, mode command).

Examples of wireless stand-alone devices using a single coil are provided by U.S. Pat. Nos. 4,388,524 and 4,473,825, both issued to Walton. In each example, power is periodically coupled to the coil in the stand-alone device from the host system. In each, code sequences can be communicated by the stand-alone device to the host system using the same coil. In the '524 patent, a variable resonant frequency circuit is formed with the coil and a variable capacitor. The resonance frequency is modified according to the code sequence and is detected by the host system. In the '825 patent, signals of difference frequencies are selectively applied to the coil according to the code sequence and detected by the host system. The patents do not disclose the capability of communicating data in the reverse direction from the host system to the stand-alone device. In these examples, the time required for transmitting the code sequence is much greater than the time allocated for receiving power. This naturally requires a significant energy storage capacity in the stand-alone device. As stated in the '825 patent, an electrolytic capacitor or storage battery is used to store energy provided by the power pulses, thus indicating a hybrid construction. The need for such a large power storage capacity teaches away from the formation of these systems on an integrated circuit (IC) chip (i.e., a substrate having dimensions on the order of one centimeter per chip side and less), as is done in the present invention. This is because present day IC chips can only provide a limited amount of capacitive power storage capability on the order of a few hundred picofarads, which is several orders of magnitude less than the storage capability of electrolytic capacitors and storage batteries.

Additionally, the physical size of the coils taught in the '524 and '825 patents are relatively large and are configured as antennas disposed on credit-card size cards (i.e., 5.5 cm by 8.5 cm). In view of the need of these circuits to obtain a large mount of power in a relatively short time duration and based on a realistic estimate of the power coupling to the coil antennas used in these patents, it would appear to one of ordinary skill in the art that the size of these coils is on the order of a credit card (5.5 cm by 8.5 cm). The need for large coil antennas also teaches away from the formation of these systems on an integrated circuit (IC) chip, as is done in the present invention. This is because the area that the largest present day IC chip can provide for such a coil antenna is roughly 1/45th of the area provided by a credit card. In contrast to the circuitry of these patents, the present invention provides a communication means which is more power efficient than those used by these patents and enables the present invention to be integrated on an IC chip.

On a related point, these examples have relatively complex circuitry in the host environment due to the use of frequency modulation transmission. This tends to raise the cost of manufacturing the circuitry for the host.

The cost of such hybrid construction for these wireless communication systems is presently too high for the credit-card and identification markets to bear. Additionally, such hybrid systems may be rendered inoperative by the user flexing the carrier substrate ("credit cards), thus breaking the hybrid connectors between the components. Given the high volume of credit cards, security pass cards, and the like, and given the better communication interface of such wireless systems, there is a great need to decrease the cost of such wireless credit card carriers and to correspondingly increase their durability. The present invention is directed towards these goals.

An example of an integrated circuit chip communication system which is directed towards addressing the disadvantages of hybrid construction is described in the monographs by Adam C. Malamy, "A Magnetic Power and Communications Interface for Pinless Integrated Circuits", Massachusetts Institute of Technology, September 1987, and by Charles W. Selvidge, "A Magnetic Communication Scheme for Integrated Circuits", Massachusetts Institute of Technology, June 1987. These monographs describe a system in which two coils are integrated on a single IC chip, a first coil for receiving a combined power and clock signal from a first electromagnetic coupling medium and a second coil for receiving and transmitting data to and from a second separate electromagnetic coupling medium. To communicate information from the host to the IC chip, the host couples an amplitude modulation signal to the second coil. To communicate information from the IC chip to the host, the IC chip selectively shorts its second coil to magnetically load a corresponding coil in the host. This changes the inductance of the host's coil, which may be detected. An on-chip power supply is generated from the first coil. An on-chip power supply of ~3 VDC at 0.9 mW was achieved (0.3 mA). Unfortunately, this level of power is not sufficient for most applications of IC wireless communication applications. In this regard, the monographs do not appear to suggest deriving power from the amplitude-modulated signal coupled to the second coil. From their results, however, it would not appear that deriving power from the second coil would be fruitful due to the ON/OFF amplitude modulation of the signal and the low level of power derived from the first coil.

In contrast to the present invention, other prior art wireless communications systems use a finely tuned resonant L-C circuit in the stand-alone device to increase the amount of power that can be coupled to the stand-alone device. In these systems, energy is received by the tuned L-C circuit much more efficiently at or near the L-C resonance frequency. The frequency of the power signal from the host or master station must be tightly controlled to be within a narrow range of frequencies about the resonant frequency. To communicate data information along with the resonant power signal, these prior art systems generally employ frequency modulation of the master station's power signal about this narrow frequency range. These systems do not employ selective gating of electromagnetic energy pulses in the master station's power signal as such gating would cause the frequency of the master's power signal to significantly deviate from its narrow frequency range. This, in turn, would significantly interrupt both the communication of data to the stand-alone device and the coupling of power to the stand-alone device. In this sense, as will become apparent in view of the present invention, these prior art systems teach against the communication system according to the present invention.

SUMMARY OF THE INVENTION

The present invention solves the above described problems of cost and reliability of prior devices by means of a novel communication system and associated protocol. Specifically, the present invention recognizes that the communications between the host, hereinafter referred to as the master station, and the stand-alone device, hereinafter referred to as the slave station, may be accomplished with the communication of energy transitions through an electromagnetic coupling medium coupled between the master and slave stations. In particular, bi-directional communications can be provided by transmitting and detecting predetermined numbers of consecutive energy transitions coupled through the medium, with resting durations immediately preceding and following a predetermined number of consecutive energy transitions. Additionally, the present invention further recognizes that data may be communicated from the master to the slave by varying the number of consecutive energy transitions in relation to the value of the data digits being sent. The present invention also recognizes that data may be communicated from the slave to the master by coupling energy transitions to the medium during predetermined resting durations provided by the master station. The present invention further recognizes that the pulsed energy transitions may also be used to power the slave station (stand-alone device). Additionally, the present invention recognizes that the communication system of the present invention enables both data communications and power to be coupled through a single electromagnetic coupling medium, thus allowing the stand-alone device (slave station) to be integrated onto a single integrated circuit chip.

Broadly stated, the present invention encompasses a system for data transmission between a master station and a slave station in which an electromagnetic coupling medium is formed between the master station and the slave station. The electromagnetic coupling medium is capable of communicating data bi-directionally between the master station and the slave station in the form of electromagnetic energy transitions. In one embodiment according to the present invention, the slave station comprises an inductor means magnetically coupled to the coupling medium and including a segment of conductive material disposed on a substrate, preferably of an integrated-circuit chip. The inductor means includes a first terminal and a second terminal coupled at respective ends of the segment of conductive material. The inductor means is for receiving magnetic energy transitions from the medium and for providing at its terminals an electrical signal indicative of these transitions. The slave station further comprises means coupled to the inductor means for powering the slave station from the energy pulses coupled to it by the master station through said energy coupling medium and a communication means for selectively coupling at least one energy transition to said electromagnetic coupling medium in a selected time interval. The selective coupling of transitions communicates data information to the master station from the slave station. Additionally, in a preferred embodiment of the present invention, the selected time interval follows a consecutive number of energy transitions provided to the coupling medium by the master station. These means enable a power efficient implementation thereof, which enable the slave station to be integrated on a single integrated circuit chip at a significantly lower cost that present day hybrid communication systems.

For communicating data from the master station to the slave station, a second embodiment according to the present invention comprises means in the master station for transmitting a first digital value to the slave station, including means for causing a first predetermined number of energy transitions to be coupled to the medium followed by a first resting duration in which substantially no energy transitions are coupled to the medium by the master station. This embodiment further comprises means in the master station for transmitting a second digital value to the slave station, including means for causing a second predetermined number of energy transitions to be coupled to the medium followed by a second resting duration in which substantially no energy transitions are coupled to said medium by said master station. This embodiment further comprises means in the slave station for detecting from the medium the first predetermined number of energy transitions followed by the first resting duration and for outputting a signal representative of the first digital value in response thereto, and for detecting the second predetermined number of energy transitions followed by the second resting duration and for outputting a signal representative of the second digital value in response thereto.

For communicating data from the slave station to the master station, a third embodiment according to the present invention comprises means in the master station for initiating a read operation from the slave station, including means for causing a third predetermined number of energy transitions to be coupled to the medium followed by a third resting duration in which substantially no energy transitions are coupled to the medium by the master station. This second embodiment further comprises means in the slave station for detecting from the medium the third predetermined number of energy transitions followed by the third resting duration and for outputting a read command signal in response thereto. This embodiment further comprises means in the slave station responsive to the read command signal for transmitting a binary zero value to the master station, including means for causing a fourth predetermined number of energy transitions to be coupled to the medium by the slave station during the third resting duration. This embodiment further comprises means in the slave station responsive to the read command signal for transmitting a binary one value to the master station, including means for causing a fifth predetermined number of energy transitions to be coupled to the medium by the slave station during the third resting duration, the fifth predetermined number being different from the fourth predetermined number. This second embodiment further comprises means in the master station for detecting from the medium the fourth predetermined number of energy transitions during the third resting duration and for outputting a signal representative of the binary zero value in response thereto, and means in the master station for detecting from the medium the fifth predetermined number of energy transitions during the third resting duration and for outputting a signal representative of the binary one value in response thereto. In a further, the slave station couples no energy transitions to the coupling medium when sending a binary zero to the slave station and couples one or more energy transitions to the coupling medium when sending a binary one.

It may be appreciated that the features of either of the above first and third embodiments of the present invention may be combined with the features of the above second embodiment of the present invention to provide a system for bi-directional communications between the master and slave stations. It may be further appreciated that some, if not all, of these resting durations may be of substantially equal duration.

Accordingly, it is an object of the present invention to enable a wireless communication receiver and transmitter system to be constructed in a single integrated circuit chip, thereby decreasing the construction cost of devices employing the present invention.

It is another object of the present invention to provide a generally-applicable wireless communication system which may be implemented using a single electromagnetic communication channel (e.g., a single magnetic path) and a minimum of one coil in the slave station.

It is a further object of the present invention to eliminate the need for hybrid construction of the slave station, and thereby increase the durability of credit cards and the like employing the present invention.

It is still another object of the present invention to enable the construction of the slave station on an integrated circuit chip having dimensions of one centimeter per chip side and less.

It is yet another object of the present invention to provide a simple protocol for enabling data to be communicated as a signal modulated on the same signal that provides power to the slave station.

These and other objects of the present invention will become apparent to those skilled in the an from the following detailed description of the invention and from the accompanying drawings.

BRIEF DESCRIPTION OF THE DRAWINGS

FIG. 1 is a block diagram of a wireless communications system according to the present invention;

FIG. 2A is a timing diagram showing the energy transitions coupled between the master and slave stations according to the present invention where a first digital value is communicated from the master station to the slave station;

FIG. 2B is a timing diagram showing the energy transitions coupled between the master and slave stations according to the present invention where a second digital value is communicated from the master station to the slave station;

FIG. 2C is a timing diagram showing the energy transitions coupled between the master and slave stations according to the present invention where digital values are communicated from the slave station to the master station;

FIG. 2D is a timing diagram showing the energy transitions coupled between the master and slave stations according to the present invention where a read command is communicated from the master station to the slave station;

FIG. 2E is a timing diagram showing the energy transitions coupled between the master and slave stations according to the present invention where a write command is communicated from the master station to the slave station;

FIG. 3 is a diagrammatic plan view/schematic isometric view of a communication system, including a master station and a slave station, according to the present invention;

FIGS. 4A and 4B show a more detailed partial block and schematic diagram of the communication system of FIG. 3 according to the present invention;

FIG. 4C shows a partial block and schematic diagram of an alternate embodiment of the slave station according to the present invention;

FIG. 5A shows an exemplary embodiment of the detector means of the slave station according to the present invention;

FIG. 5B shows waveforms for key signals of the exemplary detector means according to the present invention shown in FIG. 5A;

FIG. 6 shows a timing diagram for the generation of energy pulses and transitions by a preferred embodiment of the master station according to the present invention;

FIG. 7 shows a flow diagram of the operation of an exemplary control means for the master station according to the present invention;

FIG. 8 shows a flow diagram of the control means for the master station according to the present invention coupling a selected number of energy transitions to the coupling medium;

FIGS. 9A and 9B show a flow diagram of a read-byte operation performed by the control means for the master station according to the present invention;

FIGS. 10A and 10B show a flow diagram of a write-byte operation performed by the control means for the master station according to the present invention;

FIG. 11 shows a flow diagram of the operation of an exemplary control means for the slave station according to the present invention;

FIG. 12 shows a flow diagram of the control means for the slave station according to the present invention issuing a response to the master station;

FIGS. 13A and 13B show a flow diagram of a send-byte operation performed by the control means for the slave station according to the present invention;

FIGS. 14A and 14B show a flow diagram of a receive-byte operation performed by the control means for the slave station according to the present invention;

FIGS. 15A and 15B show alternate embodiments of power transmitting inductor means and data receiving inductor means according to the present invention;

FIG. 16A is a partial schematic isometric view of a slave station according to the present invention showing two inductor means according to the present invention disposed separately from one another; and FIG. 16B is a partial schematic isometric view of a slave station according to the present invention showing two inductor means according to the present invention disposed concentric to one another.

DETAILED DESCRIPTION OF THE INVENTION

A wireless communication system according to the present invention is shown at 10 in FIG. 1. Wireless communication system 10 comprises a host system or master station 30, a stand-alone device or slave station 20 and an electromagnetic coupling medium 11 formed between master station 30 and slave station 20. Electromagnetic coupling medium 11 is capable of supporting energy conveyed from master station 30 to slave station 20, and is capable of supporting energy conveyed from slave station 20 to master 30. Preferably, the energy is conveyed between master station 30 and slave station 20 is in the form of electromagnetic energy pulses and energy transitions, as explained in greater detail below. In a preferred embodiment of the present invention, the electromagnetic energy is conveyed substantially through magnetic field lines, i.e., through magnetomotive force energy.

In the preferred embodiments of the present invention, the electromagnetic energy is conveyed through medium 11 in the form of energy pulses. Such an electromagnetic energy pulse begins at a first energy level, rises to a second energy level, stays at the second energy level for a predetermined time duration, returns back to the first energy level, and stays at the first energy level for a second predetermined time duration. In one embodiment of the present invention, the first energy level has a value of substantially zero Joules and the second energy level has a non-zero value. In the change from the first energy level to the second energy level, an energy transition occurs. Additionally, in the change from the second energy level to the first energy level, another energy transition occurs.

An electromagnetic energy pulse is capable of traveling from master station 30 to slave station 20 and of traveling from slave station 20 to master station 30. As is known in the art, such electromagnetic energy pulses travel at a speed approximating the speed of light. According to the present invention the distance between stations 20 and 30 is generally less than a centimeter, and preferably on the order of a millimeter or less. Consequently, the electromagnetic energy pulses are received substantially instantaneously by each of stations 20 and 30 from its respective other station.

Electromagnetic energy pulses and the corresponding energy transitions between energy levels may be coupled to coupling medium 11 in a conventional manner by means provided in master station 30 or by means in slave station 20. Such means are discussed below in greater detail with reference to preferred master station and slave station embodiments. Preferably, stations 20 and 30 do not couple electromagnetic energy pulses and transitions to medium 11 at the same time. This is not a necessary requirement, but rather simplifies the communications between stations 20 and 30. It should be understood that electromagnetic coupling medium 11 is capable of conveying energy pulses and energy transitions bi-directionally between stations 20 and 30. As discussed below in greater detail, this capability is utilized according to the present invention to enable bi-directional communications between stations 20 and 30 and to enable the powering of slave station 20 from energy coupled to medium 11 by master station 30.

In a preferred embodiment of the present invention, the electromagnetic energy pulses are generated and coupled to medium 11 by the application of sinusoidal voltage waveforms, or cycles, to magnetic coils (e.g., inductors) present within each of the master and slave stations. In a preferred embodiment of master station 30, a voltage cycle begins at zero volts, rises (or falls) to a first voltage level, then falls (or rises) to a second voltage level, and returns back to a value of zero. One of the voltage levels is positive and the other is negative. One or more voltage cycles are applied to the magnetic coil consecutively in a group to communicate information. Resting durations of substantially zero volts before and after the group are used to delineate the group.

A sinusoidal voltage waveform applied to the magnetic coil generates a corresponding sinusoidal magnetic field in medium 11. In turn, the sinusoidal magnetic field conveys electromagnetic energy in a quasi-sinusoidal form. This is explained as follows with reference to FIG. 6, which shows a timing diagram 500 of exemplary sinusoidal voltage cycles, current cycles, and electromagnetic cycles generated by a coil in an exemplary embodiment of master station 30. Six (6) exemplary sinusoidal voltage cycles are shown at a graph 501 in FIG. 6. The voltage cycles are substantially sinusoidal (i.e., of the mathematical form sin wt) and occur sequentially after one another. There is an initial transient response due to the finite resistances in the magnetic coil and in the circuit driving the coil. The magnitude of the transient response depends upon the parameter values of the magnetic coil and the voltage source, and is preferably small.

Each voltage cycle causes a corresponding current cycle to flow in the magnetic coil, as governed by the well known differential equation $V_L=L*dI_L/dt$, where $V_L$ is the instantaneous voltage across the magnetic coil, L is the inductor inductance, and $I_L$ is the instantaneous current in the magnetic coil. The corresponding current cycles are shown at a graph 502 in FIG. 6. Each current cycle has a period on the order of the period of the corresponding voltage cycle. The start of each current cycle is delayed in time from its corresponding voltage cycle by a phase shift determined by the values of L, C, and R. The delay is shown at 511 in FIG. 6. Each current cycle is substantially of a cosine form, i.e., of the mathematical form cos wt.

The current cycles flowing in the magnetic coil produce an electromagnetic energy field in medium 11 immediately surrounding the magnetic coil. The electromagnetic field may be readily detected by a sensing coil located in slave station 20. The total electromagnetic energy generated by the current flowing in the inductor is specified by the well known relationship $E=½L*I_L^2$. Due to the square relationship, each current cycle generates two energy pulses. For the current cycles shown at graph 502, the corresponding energy pulses are shown at a graph 503 in FIG. 6. Each energy pulse begins at a first energy level of substantially zero Joules, rises to a second energy level (where the slope in the energy equals zero), and then returns to the first energy level of substantially zero Joules. In the change from the first energy level to the second energy level, an energy transition occurs; and in the change from the second energy level to the first energy level, another energy transition occurs. The shape of the later energy pulses is substantially of a cosine form, being of the mathematical form: $\frac{1}{2}*(1-\cos(2\,wt))=(\cos wt)^2$.

In a preferred embodiment of the present invention, a partial voltage cycle is generated at the end of the sequence of voltage cycles so as to complete the last current cycle and the last energy pulse. The partial voltage cycle is shown at 515 in FIG. 6. This enables the current in the magnetic coil to settle to zero amperes before the sequence of voltage cycles is terminated. As is known in the art, shutting off the voltage across an inductor before the current in the inductor reaches zero amperes will likely result in "ringing" caused by the inductor current resonating with the parasitic capacitance of the inductor and of the external circuit. Such ringing in the master station according to the present invention is generally undesirable as it may generate an unpredictable number of energy pulses in medium 11. The partial voltage cycle generated at the end of the sequence of voltage cycles, as described above, substantially lessens the amount of ringing by bringing the inductor current to near zero amperes at the end the voltage cycle sequence.

In a preferred embodiment of the present invention, the numbers of energy pulses and energy transitions in a voltage cycle sequence are related to the number of voltage cycles in the sequence by the following relationships. First, the number of energy pulses $N_{EP}$ is equal to twice the number of voltage cycles $N_{VC}$:$N_{EP}=2*N_{VC}$. This is because the energy is related to the square of the current. As indicated above, there are two energy transitions per energy pulse. Thus, the number of energy transitions $N_{ET}$ per voltage cycle sequence is equal to four times the number of voltage cycles: $N_{ET}=4*N_{VC}$.

In a preferred embodiment of the present invention, the electromagnetic energy pulses and transitions coupled to medium 11 are detected by slave station 20 by way of a magnetic sensing coil. As is known in the art, each electromagnetic energy pulse has corresponding changes in the magnetic flux. These changes in the magnetic flux may be detected by a magnetic coil in the slave station. A voltage is generated across the slave's magnetic coil as a function of the change in the magnetic flux and as governed by Faraday's induction law: $V \propto d\phi/dt$. This shape of the sensed voltage is similar to the shape of the voltage across the magnetic coil in the master station. For the sequence of voltage cycles shown in graph 501, the corresponding sensed voltage $V_S$ in an exemplary embodiment of slave station 20 shown at 504 in FIG. 6. Slave station 20 may determine the number of energy pulses coupled to it (through medium 11) in a voltage cycle sequence by counting the number of sensed voltage cycles. One ready way of detecting the number of cycles in the sensed voltage is to count the number of zero crossings. Such zero crossing counting is discussed in greater detail below with reference to an exemplary embodiment of slave station 20. In this way, the number of energy pulses and energy transitions coupled to medium 11 by master station 30 may be detected by slave station 20. It may be appreciated that other means within slave station 20 may be used to detect the coupled energy pulses and transitions, such as hall effect devices.

The above exemplary voltage cycles, current cycles, and energy pulses shown in graphs 501–504 are provided with the assumption that the magnetic coils are nearly ideal (i.e., small core losses and small parasitic capacitances and resistances), and that the detection coil of the slave unit does not substantially load the magnetic energy in medium 11. The latter assumption is generally a valid assumption because the amount of energy coupled by slave station 20 from medium 11 is a small percentage of the energy provided to medium 11 by master station 30. In practice, each of the magnetic coils has parasitic resistance, capacitance, core loss, and a finite separation spacing distance (e.g., air gap) from the other coil which makes the coils less than ideal. However, it is believed by the inventors that any such non-ideal characteristics in these coils would not significantly impact the relationships between the above-described voltage cycles, current cycles, energy pulses, and sensed voltage cycles or significantly change the qualitative shape of these cycles and pulses.

For the case of slave station 20 coupling energy pulses and transitions to medium 11 for reception by master station 30, the above discussion applies with the roles of stations 20 and 30 being reversed.

Communications according to the present invention between master station 30 and slave station 20 via the use of electromagnetic energy transitions is now described. Bidirectional communication is provided by transmitting and detecting predetermined numbers of consecutive energy transitions coupled through coupling medium 11. In a preferred embodiment of the present invention, resting durations immediately precede and follow each such predetermined number of consecutive energy transitions. Such a predetermined number of consecutive energy transitions may represent a data digit or a control instruction. Such a control instruction may be required to support a specific communication protocol between master station 30 and slave station 20. Exemplary control instructions would be those governing the flow and direction of data between stations 20 and 30, such as by master station 30 instructing slave station 20 to transmit data in its buffer to master station 30. Further examples of control instructions are provided below in greater detail. The data digit flowing between stations 20 and 30 may be communicated in the form of binary digits, each binary digit having either a binary zero value or a binary one value. In the present invention, the data digit may also be communicated in other numerical basis, such as base 4 and base 10. With base 4, for example, a data digit would have one of four digital values at a given time.

In a preferred embodiment of the present invention, master station 30 communicates data digits to slave station 20 through sets of consecutive energy transitions. Specifically, master station 30 includes means for communicating a data digit having a first digital value to slave station 20. This includes means for causing a first predetermined number of consecutive energy transitions to be coupled to medium 11, and thereby to slave station 20. This is illustrated by way of a timing diagram 40 shown in FIG. 2A. This first predetermined number of consecutive energy pulses is shown at 42 in FIG. 2A. Consecutive energy transitions 42 are followed by a resting duration 44 and are preceded by a resting duration 43. In a preferred embodiment of the present invention, consecutive energy transitions 42 are generated by master station 30 in the form of pulses, two transitions per pulse. For the purposes of illustration, FIG. 2A shows ten such pulses for a predetermined number of 20 consecutive energy transitions. During the consecutive transitions 42, slave station 20 preferably does not provide energy pulses or transitions to coupling medium 11. During the subsequent resting duration 44, slave station 20 need not provide energy pulses or transitions to coupling medium 11. However, in a further embodiment of the present invention, slave station 20 may couple one or more energy transitions to medium 11 during resting duration 44 as an acknowledgement response to indicate that it properly received the first predetermined number of energy transitions. This is shown at 46 in FIG. 2A. Such an acknowledgement is used to increase the fault tolerance of the communications between master and slave stations.

Additionally, master station 30 includes means for communicating a data digit having a second digital value to slave station 20. This includes means for causing a second predetermined number of consecutive energy transitions to be coupled to medium 11, and thereby to slave station 20. This is illustrated in a timing diagram 50 shown in FIG. 2B. This second predetermined number of consecutive energy pulses is shown at 52 in FIG. 2B. Consecutive energy transitions 52 are followed by a resting duration 54 and preceded by a resting duration 53. As with consecutive energy transitions 42 above, consecutive energy transitions 52 are preferably in the form of pulses, two transitions per pulse. For the purposes of illustration, FIG. 2B shows eleven such pulses for a predetermined number of 22 consecutive energy transitions. During the consecutive transitions 52, slave station 20 preferably does not provide energy pulses or transitions to coupling medium 11. During the subsequent resting duration 54, slave station 20 need not provide energy pulses or transitions to coupling medium 11. However, in a further embodiment of the present invention, slave station 20 may couple one or more energy transitions to medium 11 during resting duration 54 as an acknowledgement response to indicate that it properly received the first predetermined number of energy transitions. This is shown at 56 in FIG. 2B. Such an acknowledgement is used to increase the fault tolerance of the communications between master and slave stations.

The first and second predetermined numbers of energy transitions are preferably different from one another, 20 transitions versus 22 transitions. This is so that slave station 20 may distinguish between the two digital values being communicated by master station 30. With these two digital values, master station 30 is capable of communicating binary digits to slave station 20 with the first and second predetermined numbers of consecutive energy transitions.

In an alternate embodiment according to the present invention, by using additional predetermined numbers of consecutive transitions different from the first and second predetermined numbers, master station may communicate digits in numerical bases greater than 2, such as ternary digits, quaternary digits, and decimal digits. Note also that the resting duration at the beginning of a sequence of energy transitions is preferably the resting duration created by master station 30 after it has transmitted a previous digital value or command to the slave station.

System 10 further comprises means in slave station 20 for detecting from medium 11 the first predetermined number of energy transitions 42 followed by resting duration 44. This also includes means for outputting a signal representative of the first digital value in response to the detection of energy transitions 42. This detection means in slave station 20 also detects the second predetermined number of energy transitions 52 followed by resting duration 54, and outputs a signal representative of the second digital value in response thereto. The signals representative of the first and second digital values may be used to communication binary digits to slave station 20, as indicated above, and may be used by components within slave station 20 in processing or storing information. Such examples of where data is stored and/or processed within slave station 20 are provided below.

For transmitting data in the reverse direction from slave station 20 to master station 30, communication system 10 further comprises the following means, which are illustrated by way of a timing diagram 60 shown in FIG. 2C. System 10 further comprises means in master station 30 for initiating a read operation from slave station 20. This includes means for causing a third predetermined number of energy transitions 62 to be coupled to medium 11 followed by a resting duration 64. An exemplary number of twelve energy pulses and 24 energy transitions are shown in FIG. 2C. Transitions 62 are preceded by a resting duration 63. Substantially no energy transitions are coupled to medium 11 by master station 30 during resting durations 63 and 64. System 10 further comprises means in slave station 20 for detecting from medium 11 the energy transitions 62 followed by resting duration 64 and for outputting a read command signal in response thereto.

System 10 further comprises means in slave station 20 responsive to the read command signal for transmitting a binary one value or binary zero value (i.e., third or fourth binary values) to master station 30. This includes means for causing one or more energy pulses or no energy pulses to be coupled to medium 11 by slave station 20 in a time interval during resting duration 64 (i.e., a selected time interval), depending upon the value to be transmitted. These energy pulses comprise corresponding energy transitions. A binary zero is communicated by a fourth predetermined number of energy transitions during resting duration 64 and a binary one is communicated by a fifth predetermined number of energy transitions during duration 64. To distinguish between the binary zero and one values being sent, the corresponding fourth and fifth predetermined numbers of energy transitions are different. In a preferred embodiment of the present invention, the fourth predetermined number is zero for a binary zero, and the fifth predetermined number is at least one energy pulse (i.e., two or more energy transitions) for a binary one. This is shown in FIG. 2C at 65 (binary zero) and 66 (binary one).

For communicating data from slave station 20 to master station 30, system 10 further comprises means in master station 30 for detecting from medium 11 the number of energy pulses and/or energy transitions coupled by slave station 20 during resting duration 64 and for outputting a signal representative of the corresponding detected binary value in response thereto. In one embodiment of the present invention, the absence of energy pulses during duration 64 indicates a binary zero value from slave station 20 and one or more energy pulses during duration 64 indicates a binary one value from slave station 20. This corresponds to the above described fourth and fifth predetermined number of energy transitions. In this way, it may be appreciated that system 10 comprises the means for transmitting data from slave station 20 to master station 30 using energy transitions (or energy pulses) coupled through medium 11 in the reverse direction.

The third predetermined number of energy transitions 62 may be different from the first and second predetermined numbers of energy transitions 42 and 52, so as to specify the direction of data flow. Alternatively, a high-level communication protocol may be included to specify the direction of data flow without requiring that the third predetermined number be different from the first and second predetermined numbers. An example of such a high-level communication protocol is described below in a further embodiment of the present invention with reference to flow diagrams shown in FIGS. 7–14.

In addition to sending data from master station 30 to slave station 20, system 10 may, in a further embodiment, send communication commands from master station 30 to slave station 20 in the form of predetermined numbers of consecutive energy transitions. Such commands may include: reading a byte of data, and writing a byte of data.

In one embodiment of the present invention, master station 30 sends a "read data byte" command, followed by an associated memory address, or identifier, to slave station 20. The associated address is sent using the above write formats illustrated in FIGS. 2A and 2B for sending digits to slave station 20. In response, slave station 20 provides, in sequential order, the digits of the requested byte, using the above read digit format illustrated in FIG. 2C. The "read data byte" command is illustrated in FIG. 2D at graph 70, where a sixth predetermined number of consecutive energy transitions 72 is used, and where resting durations 73 and 74 bracket transitions 72. As an example, 26 energy transitions are shown (13 pulses). During the consecutive transitions 72, slave station 20 preferably does not provide energy pulses or transitions to coupling medium 11. During the subsequent resting duration 74, slave station 20 need not provide energy pulses or transitions to coupling medium 11. However, in a further embodiment of the present invention, slave station 20 may couple one or more energy transitions to medium 11 during resting duration 74 as an acknowledgement response to indicate that it properly received the sixth predetermined number of energy transitions. This is shown at 76 in FIG. 2D. Such an acknowledgement is used to increase the fault tolerance of the communications between master and slave stations.

The sixth predetermined number of energy transitions 72 need not be different than the other predetermined numbers 42, 52, and 62, but a different number may be helpful in distinguishing the command from the above read and write formats. One example in which a different number is not needed is where only a single read operation is performed during the time slave station 20 is powered. Another example is where a high-level communication is included (as a further embodiment) which distinguishes the use of the fourth predetermined number from the first, second, and third predetermined numbers. Such an example is provided below.

Also in this embodiment of the present invention, master station 30 sends a "write data byte" command, followed by an associated memory address, or identifier, and data byte, to slave station 20. The associated address and data byte are sent using the above write formats illustrated in FIGS. 2A and 2B for sending digits to slave station 20. In response, slave station 20 stores the data byte at the specified location. The "write data byte" command is illustrated in FIG. 2E at graph 80, where a seventh predetermined number of consecutive energy transitions 82 is used, and where resting durations 83 and 84 bracket transitions 82. As an example, 28 energy transitions are shown (14 pulses). During the consecutive transitions 82, slave station 20 preferably does not provide energy pulses or transitions to coupling medium 11. During the subsequent resting duration 84, slave station 20 need not provide energy pulses or transitions to coupling medium 11. However, in a further embodiment of the present invention, slave station 20 may couple one or more energy transitions to medium 11 during resting duration 84 as an acknowledgement response to indicate that it properly received the seventh predetermined number of energy transitions. This is shown at 86 in FIG. 2D. Such an acknowledgement is used to increase the fault tolerance of the communications between master and slave stations.

The seventh predetermined number of energy transitions 82 is preferably different from the sixth predetermined number of energy transitions 72, but need not be different than the first second and third predetermined numbers of transitions (42, 52, and 62, respectively) for the reasons indicated above.

According to the above-described processes and device operations, data may be transmitted from master station 30 to slave station 20 and vice-versa. There may be times in which either station 20 or station 30 is processing information and, therefore, will require additional time before providing results to the other station. As a further embodiment of the present invention, communication system 10 further comprises an idling means for indicating that no digital data is being communicated between master station 30 and slave station 20. The idling means according to the present invention includes a means in master station 30 for causing any other number of consecutive energy transitions to be coupled to medium 11 from master station 30.

In a preferred embodiment of the present invention, the above described resting durations 44, 54, 64, 74, and 84 are substantially of the same time duration. However, it may be appreciated that one or more of these durations may be of different durations. Additionally, the resting durations need to be of sufficient length such that the detection means within slave station 20 is enabled to distinguish the resting durations from the consecutive energy transitions. As one means of distinguishing these resting durations in a preferred embodiment of the present invention, each resting duration 44, 54, 64, 74 and 84 is at least greater than the duration between two consecutive energy transitions. In a further preferred embodiment, each of the resting durations is equal to or greater than the time duration between three consecutive transitions.

According to the present invention, communication system 10 preferably further comprises means for initiating communications between master station 30 and slave station 20. Such initialization means may be used to "synchronize" stations 20 and 30 before beginning data communications. To initiate communications, master station 30 generates, for example, a first missing energy pulse (i.e., a resting duration). If slave station 20 is ready for communications, which usually occurs after it is sufficiently powered and after it has finished with initializing various means within slave station 20, slave station 20 outputs one or more energy pulses, preferably during the missing energy pulse (resting duration), which may be detected by master station 30 as an indication that slave station 20 is ready for communications. Master station 30 continues to periodically generate a resting duration (the missing energy pulse) until slave station 20 issues a response. It may be appreciated that the slave station may be configured such that a larger resting duration must be detected before initialization can take place.

Depending on the operation and purpose of slave station 20, it may be appreciated that communication system 10 may be configured such that data can only be communicated uni-directionally from master station 30 to slave station 20. It can also be configured such that data can only be communicated uni-directionally from slave station 20 to master station 30. Finally, it can also be configured to enable bi-directional data communication between stations 20 and 30. Similarly, commands can also be issued from either station to the other, or bi-directionally. An exemplary application where data is communicated only uni-directionally from master station 30 to slave station 20 may be found in the field of diagnostic equipment. For example, master station 30 may comprise an automobile electronics unit or a photocopying machine which communicates essential diagnostic data to slave station 20. In this case, slave station 20 may comprise means for receiving the diagnostic data from master station 30 and for providing the user with a visual display thereof. Commands, if any, would also be communicated in this example uni-directionally from the master to the slave.

Exemplary applications in which data is only uni-directionally communicated from slave station 20 to master station 30 may be found in the field of "simple" credit card and identification systems. For example, slave station 20 may comprise a means for storing an identity for the credit card user, such as a credit card number or a security password, and may communicate this user identity to master station 30 for use therein. Master station 30 may comprise means for utilizing this user identity, such as for checking the user's credit balance in the case of the credit card application or for checking the security clearance of the user in a case of a security identification application.

An exemplary application in which bi-directional communications between stations 20 and 30 is provided may be found in the so-called "debit card" field. In this application, slave station 20 comprises a debit card having means for storing a user balance, which may be deducted from as the user obtains services using the debit card. In this case, master station 30 would comprise a means for providing services to the user, such as a photocopying machine or a transit fare collector. In operation, slave station 20 may first provide the current balance on the debit card to master station 30. In response, master station 30 may provide services requested by the user if there are sufficient funds indicated by the debit card to cover the requested services. Upon dispensing the services, master station 30 may then transmit a new balance to slave station 20 for recordation therein. From the above examples, it may be appreciated that communication system 10 may operate to transmit data uni-directionally in either direction between a master station and a slave station or bi-directionally.

The above discussion of communication system 10 focused on the transmission of data digits between stations 20 and 30. It may be appreciated that stations 20 and 30 may organize the data digits into groups of predetermined numbers of digits, so as to support a higher level of overall communications. For example, control instructions and data may be organized into groups of eight data digits, preferably binary digits, or sixteen data digits, preferably binary digits. The illustration of such grouping of digital data is intended to point to the greater applicability of the present invention and is not intended as a limitation thereof.

Because master station 30 and slave station 20 communicate by the above-described sequences of predetermined numbers of energy transitions, all the communications between master station 30 and slave station 20 may occur through a single electromagnetic coupling medium. This provides the advantage of enabling slave station 20 to use a single magnetic coil for receiving and transmitting energy transitions to coupling medium 11 and for deriving energy to power itself. The majority of the above-described prior art systems use two or more magnetic paths, or coupling mediums, with corresponding magnetic coils, thereby comprising expensive hybrid implementations. A further advantage of communication system 10 is that the ability to use a single magnetic coil for slave station 20 readily enables an integrated circuit (IC) implementation thereof on the smallest possible chip size. An exemplary embodiment of slave station 20 using a single coil system is described below.

Related to this, it may be advantageous to use two magnetic coils in an IC chip embodiment of slave station 20, one coil for receiving energy pulses and transitions from master station 30 and a second coil for sending energy transitions to master station 30. Although two coils may be used, they preferably still use a single electromagnetic coupling medium and need not be separated from one another by a large distance. In fact, these two coils may be disposed concentrically to one another to reduce the chip size of the embodiment. Further, these coils may be disposed in an overlapping relationship as well as being concentric to further reduce the chip size. The use of two coils enables the coils to be separately optimized for their particular function.

Another advantage of communication system 10 is that it enables a highly power efficient means within slave station 20 of communicating data to master station 30. This highly power efficient communication means further aids in enabling an integrated circuit implementation of slave station 20 because all the energy received by slave station 20 is efficiently used, thereby reducing the required chip area needed for energy storage. As described below in greater detail, this more efficient means comprises an energy storage means, preferably a capacitor, which is separate from the main energy storage means for powering slave station 20. Additionally, the separate energy storage means is operated to selectively discharge a substantial portion of its energy into the inductor means (e.g., magnetic coil) of slave station 20 in a relatively short time duration to couple one or more detectable energy transitions to medium 11. This may be done with little or no effect on the main energy storage means for powering the components of salve station 20.

A more detailed embodiment of the communication system according to the present invention is shown at 100 in FIG. 3. Communication system 100 comprises a slave station 200, a master station 300, and an electromagnetic coupling medium 110 formed between master station 300 and slave station 200. Slave station 200 corresponds to slave station 20 shown in FIG. 1 and comprises the same means as disclosed above for slave station 20. Likewise, master station 300 corresponds in function to master station 30 shown in FIG. 1, and comprises the same means as disclosed above for master station 30. Electromagnetic coupling medium 110 corresponds in function to coupling medium 11 shown in FIG. 1 and is capable of communicating data bi-directionally between master station 300 and slave station 200 in the form of electromagnetic energy transitions.

Shown in FIG. 3 is a partial block diagram and schematic diagram of master station 300. Master station 300 comprises a power transmitting inductor means 310, a data receiving inductor means 320, a master communication means 330, and a master digital subsystem 390. Inductor means 310 and 320 preferably comprise at least one loop of conductive wire wound about a coil form 315. In one embodiment of the present invention, coil form 315 is cylindrical in nature and is formed from ferromagnetic material, such as type K-1, having a relatively high permeability. However, form 315 may be rectangular in nature and/or may be formed from a different material. Also in this embodiment, inductor means 310 includes 15 to 25 turns (conductive loops) at an average radius of ~80 mils (~2 millimeters). Inductor means 310 comprises a first terminal 311 and a second terminal 312. Inductor means 320 comprises a first terminal 321 and a second terminal 322. Each of the terminals of inductor means 310 and 320 are coupled to master communication means 330. In turn, communication means 330 includes a bi-directional data bus 336 for communicating with master digital subsystem 390.

As also shown in FIG. 3, slave station 200 is preferably formed on a substrate 205 as an integrated circuit chip.

Substrate 205 may comprise an insulating material, a semi-insulating material or a semiconductor material. In one embodiment of the present invention, substrate 205 comprises a semiconductor material. Substrate 205 is preferably square or rectangular in shape having side measurements of approximately 2.5 millimeters×2.5 millimeters (i.e., 100 mils× 100 mils) and a thickness of approximately 250 microns to 500 microns. Disposed about the outer edge of substrate 205 is an inductor means 210 magnetically coupled to coupling medium 110 and including a segment of conductive material 212. Inductor means 210 further comprises a first terminal 213 and a second terminal 214 coupled at respective ends of conductive segment 212. Inductor means 210 receives magnetic energy pulses and magnetic energy transitions from coupling medium 110 and provides at terminals 213 and 214 an electrical signal indicative of these energy pulses and energy transitions. In a preferred embodiment of the present invention, conductive segment 212 of inductor means 210 comprise at least one loop of conductive wire disposed on substrate 205. Two such loops are shown in FIG. 3. In one embodiment of the present invention, ten to forty such loops are formed on substrate 205 in slave station 200 so as to provide sufficient power coupling to slave station 200. The wire forming these loops is preferably approximately 6 microns wide, with a spacing of approximately 2 microns between adjacent loops.

In communication system 100, the energy transitions coupled by master station 300 are generated according to the relationships disclosed above with reference to FIG. 6. Specifically, voltage cycles are coupled to power inductor means 310, each voltage cycle generating two energy pulses and four energy transitions. The energy pulses and transitions are coupled to medium 110 and generate, or induce, a voltage across inductor means 210 of slave station 200 which is similar in nature to the voltage cycles being coupled to inductor means 310. This is shown, for example, by graph 504 in FIG. 6. In slave station 200, the voltage transitions in the induced voltage are detected and counted to determine the number of energy transitions in a set of such transitions. As described above, there is a relationship between the number of consecutive voltage transitions detected and the number of consecutive energy transitions coupled to medium 110 by master station 300.

Slave station 200 further comprises a rectifying means 220 coupled to terminals 213 and 214 of inductor means 210. Rectifier means 220 generates a rectified voltage at an output port from the energy received by inductor means 210. Slave station 200 further comprises a power storage and regulation means 230 having an input port coupled to the output port of rectifier means 220. Means 230 comprises means for storing electrical energy provided by the output of rectifier 220 and means for powering the components disposed on substrate 205 of slave station 200. Each of rectifier means 220 and power storage and regulation means 230 are discussed below in greater detail with reference to a full schematic diagram of communication system 100 shown in FIGS. 4A and 4B.

Detector means 240 includes an input coupled to terminal 213 of inductor 210. From the signal at terminal 213, detector means 240 detects voltage transitions through zero volts (i.e., zero-crossings) and outputs a signal in response thereto as a first output. As such, detector means 240 comprises means for detecting the consecutive energy transitions being coupled to medium 110 by master station 300. Detector means 240 further detects the absence of a voltage transition during a predetermined time duration following the detection of a preceding voltage transition and responds by outputting an absence signal at a second output. This corresponds to detecting the absence of an energy transition during a predetermined time duration following the detection of a preceding energy transition. In this way, detector means 240 comprises means for detecting resting durations, or times when at least one transition is missing, such as durations 44, 54, 64, 74, and 84 shown in FIGS. 2A–2E. It may be appreciated that the two signal outputs of detector means 240, the transition signal and the absence signal, enable the detection of sets of consecutive energy transitions (or voltage transitions) coupled to slave station 200 occurring between successive resting durations.

Slave station 200 further comprises a digital subsystem 290 and a communication means 250. Communication means 250 is responsive to the output signals of detector means 240, and is for counting the number of consecutive voltage (energy) transitions in a set of such transitions, and for outputting a command signal, a first digital value, or a second digital value in response thereto, depending upon the number counted. The command signal and digital values are output to digital subsystem 290. Communication means 250 may also determine the duration of the resting durations occurring before and after sets of consecutive energy transitions, where these durations are unequal. Each resting duration, however, must be of a sufficient duration to enable its detection by slave station 200.

Digital subsystem 290 is for processing the commands and digital values that are communicated between master station 300 and slave station 200 as detected by communication means 250 and detector means 240. As discussed below in greater detail, communication means 250 also receives data digits from subsystem 290 to be communicated to master station 300 and, in response thereto, at the direction of master station 300, causes the coupling of appropriate energy transitions to medium 110 from slave station 200. Thus, the digital data flowing between communication means 250 and subsystem 290 is reflective of the commands and digital data being communicated between slave station 200 and master station 300. In one embodiment of the present invention, digital subsystem comprises a memory storage means, or the like, having at least one memory storage location, and preferably a plurality of storage locations. Additionally, each memory storage location comprises a number of data bits, such as for example 8 bits (one byte), and a corresponding unique address, or identifier. Such memory storage means and the construction thereof are well known in the art. An explanation of the construction and operation of such a memory storage means is not necessary in order to understand the present invention and enable one of ordinary skill in the art to make and use the same.

More specifically, a slave control means 260 in communication means 250 outputs a signal to subsystem 290 on a bi-directional data bus 255 representative of a first digital value when the above-described first predetermined number of consecutive energy transitions (cf. FIG. 2A) is detected via the output signals of detector means 240. Control means 260 further outputs a signal to digital subsystem 290 representative of a second digital value when the above-described second predetermined number of consecutive energy transitions (cf. FIG. 2B) is detected. In a preferred embodiment of system 100 and slave station 200, the first digital value is a binary zero and the second digital value is a binary one, and the digit thereby output to subsystem 290 is in the form of a binary digit. Also in a alternative preferred embodiment of system 100 and slave station 200, the first predetermined number of energy transitions is equal to 72 (36 energy pulses, 18 voltage cycles), and the second predetermined number of energy transitions is equal to 76 (38 energy pulses, 19 voltage cycles).

Referring again to FIG. 3, communication means 250, and specifically control means 260, further comprises means for receiving a data digit from digital subsystem 290 to be communicated to master station 300. The data digit provided by subsystem 290 is communicated to master station 300 during the resting duration following a receipt of energy pulses from master station 300 equal in number to the above-described third predetermined number (cf. FIG. 2C). In this regard, control means 260 further comprises means responsive to detector means 240 for detecting the third predetermined number of consecutive energy transitions provided by master station 300 and for outputting a read data digit command signal to digital subsystem 290 in response thereto. In a preferred alternative embodiment of system 100 and slave station 200, the third predetermined number of energy transitions is equal to 80 (40 energy pulses, 20 voltage cycles).

Digital subsystem 290 responds to the read data digit command signal by providing control means 260 with a data digit on the bi-directional data bus 255. Communication means 250 further comprises a transmission means for transmitting the data digit provided by subsystem 290 to master station 300 during the resting duration, or transition absence, following the detection of the third predetermined number of energy transitions signaling the read operation. This transmission means comprises portions of control means 260, a capacitor 280 for storing electrical energy in the form of electrical charge, and a switch matrix 270 for selectively charging capacitor 280 from the energy rectified by rectifier means 220 and for selectively coupling capacitor 280 to inductor means 210.

In response to the detection of the third predetermined number of energy transitions from master station 300, the transmission means causes a predetermined number of energy transitions to be coupled to inductor means 210 in a time interval during the subsequent resting duration (transition absence), the number being related to the value of the digital data provided by digital subsystem 290. In a preferred embodiment of the present invention, control means 260 directs switch matrix 270 to couple capacitor 280 to inductor means 210 when the value of the data digit provided by subsystem 290 is a binary one. This causes capacitor 280 to discharge its stored charge into inductor means 210 and causes at least one energy transition, preferably at least two energy transitions, to be coupled from slave station 200 to coupling medium 110. More specifically, capacitor 280 and inductor means 210 form a damped resonant circuit which causes voltage cycles to be applied across inductor means 210. The voltage cycles generate energy pulses and energy transitions in a similar manner as that described above with reference to FIG. 6.

When the value of the data digit supplied by digital subsystem 290 is a binary zero, control means 260 directs switch matrix 270 to isolate, or prevent, capacitor 280 from being discharged into inductor means 210. In this case, substantially no energy transitions are coupled from slave station 200 to medium 110. In a preferred embodiment of the present invention, capacitor 280 is charged, via switch matrix 270, by energy provided by rectifier means 220 such that an mount of charge is stored on capacitor 280. The charging occurs when capacitor 280 is not needed for discharging energy into inductor means 210. In a further embodiment of system 100, control means 260 outputs a read-byte command to digital subsystem 290 when a sixth predetermined number of consecutive energy transitions (cf. FIG. 2D) is detected. In a preferred alternative embodiment of system 100 and slave station 200, the sixth predetermined number of energy transitions is equal to 84 (42 energy pulses, 21 voltage cycles). In response to this, digital subsystem 290 prepares to receive an address which identifies the particular byte of data master station 300 is requesting from the memory of digital subsystem 290. This address is provided to slave station 200 in a sequence of data digits, preferably binary digits, where each data digit is communicated by a corresponding set of consecutive energy transitions as described above (cf. FIGS. 2A and 2B). The address is provided to digital subsystem 290, which outputs a corresponding data byte to control means 260. To receive the data byte, master station couples a sequence of eight sets of consecutive energy transitions, each set having a third predetermined number of transitions (cf. FIG. 2C). Control means 260 communicates, in sequential order, each bit from the data byte in a corresponding resting duration of these eight sets of consecutive energy transitions.

In a further embodiment of system 100, control means 260 outputs a write-byte command to digital subsystem 290 when a seventh predetermined number of consecutive energy transitions (cf. FIG. 2E) is detected. In a preferred alternative embodiment of system 100 and slave station 200, the seventh predetermined number of energy transitions is equal to 88 (44 energy pulses, 22 voltage cycles). In response to this, digital subsystem 290 prepares to receive an address which identifies the location within the memory of digital subsystem 290 where the byte is to be written. This address is provided to slave station 200 in a sequence of data digits, preferably binary digits, where each data digit is communicated by a corresponding set of consecutive energy transitions as described above (cf. FIGS. 2A and 2B). The address is provided to digital subsystem 290. Following the address, the data byte is communicated to slave station 200 one digit at a time and provided to digital subsystem 290 in a manner as described above.

Each of the respective components of slave station 200 and master station 300 are described in greater detail with respect to the more specific schematic diagram of communication system 100 shown in FIGS. 4A and 4B. As seen in FIGS. 4A and 4B, communication system 100 is shown with slave station 200 and master station 300 being separated by a boundary line B. Inductor means 210 of slave station 200 is represented by a coil symbol at the reference numeral 210, which is disposed near boundary line B. Likewise, inductor means 310 and 320 of master station 300 are represented by respective coil symbols at reference numerals 310 and 320, respectively. The coil symbols for inductor means 310 and 320 are disposed near boundary line B and positioned opposite to that for inductor means 210. Coupling medium 110 is disposed between the respective inductor means of slave station 200 and master station 300, as indicated in FIGS. 4A and 4B.

It should be appreciated that, for the purposes of modeling the coupling of energy between inductor means 210 and inductor means 310 and 320, these inductor means may be viewed as forming a transformer. It should be pointed out, however, that such a transformer need not be an ideal transformer, and, in practice, may often be less than ideal due to core losses, core reluctance, parasitic resistance in the inductor means, low magnetic coupling between the windings of the inductor means, and due to the gap between inductor means 310, 320 and inductor means 210, which may be on the order of zero to sixteen millimeters or more. A transformer model having sufficient parasitic leakage inductance, winding resistances, core loss resistances, and low coupling may be used to model the inductive interaction between inductor means 210 and inductor means 310, 320 according to the present invention. An explanation of the operation of a conventional transformer formed by these inductor means is not necessary in order to understand the present invention and enable one of ordinary skill in the art to make and use the same. For a further discussion of transformer interaction, reference is made to the monographs by Adam C. Malamy, "A Magnetic Power and Communications Interface for Pinless Integrated Circuits", Massachusetts Institute of Technology, September 1987, and by Charles W. Selvidge, "A Magnetic Communication Scheme for Integrated Circuits", Massachusetts Institute of Technology, June 1987.

Turning now to master station 300 as shown in FIG. 4A, master communication means 330 of master station 300 comprises an oscillator 340, a gating transistor 350, a driver stage 355, a master control means 360, a transition sensing means 370, a current sense resistor 385, and a differential amplifier 380. Oscillator 340 generates voltage cycles which are buffered by driver stage 355 and coupled to inductor means 310. Under the direction of master control means 360, gating transistor 350 selectively grounds the voltage cycles produced by oscillator 340 so as to selectively introduce resting periods in the energy transitions coupled to medium 110 by master station 300, thereby delineating sets of consecutive energy transitions. Master control means 360, in response to commands received by digital subsystem 390, directs the communication of information between stations 30 and 20 by coupling sets of consecutive energy transitions to medium 110 and by receiving responses back from slave station 20 by way of inductor means 320. Current sense resistor 385 and amplifier 380 monitor the current through inductor means 310 and generate a signal indicative of the current zero-crossings therein so that the voltage drive to inductor means 310 can be shut off under zero current conditions. Transition sensing means 370 is coupled to inductor means 320 and is for detecting the magnetic energy transitions received by master station 300 from coupling medium 110. The detected energy transitions are provided to master control means 360.

In a preferred embodiment of the present invention, energy pulses and energy transitions are coupled to medium 110 by master station 300 by the application of voltage cycles to a magnetic coil (inductor means 310) as discussed above with reference to FIG. 6. Oscillator 340 preferably outputs a continuous sinusoidal voltage signal at an output port 341, which is coupled to the input of driver stage 355. In one embodiment of master station 300, the signal at output port 341 alternates between a first voltage of −10 V and a second voltage of +10 V, has a duty cycle of substantially 50%, and has an oscillation frequency in the range of 0.5 MHz to 10 Mhz, preferably 5 Mhz. In other embodiments of master station 300, the peak-to-peak voltage at output port 341 is increased towards 40 V (−20 V for the first voltage and +20 V for the second voltage) in order to increase the power coupling to slave station 200. Oscillator 340 further comprises a second output port 342 for outputting a synchronization signal to an input port 362 of master control means 360. The synchronization signal has digital logic levels and is preferably a square wave having the same frequency or multiple (e.g., 2, 3, 4, . . . ) or sub-multiple (e.g., ½, ⅓, ¼, . . . ) thereof. Additionally, the synchronization signal preferably comprises logic transitions representative of the zero-voltage crossing in the signal at output port 341. This enables control means 360 to initiate a set of consecutive voltage cycles starting at a voltage value of zero volts. In one embodiment of the present invention, the synchronization frequency has the same frequency as the signal at output port 341, has a duty cycle of 50%, and is substantially in phase with the signal at output port 341 (i.e., it has a low-to-high logic transition when the signal at output port 341 begins its positive half cycle).

Output driver 355 preferably comprises an NMOS transistor 356 and a PMOS transistor 357, which are coupled in a standard push-pull, source-follower output-stage configuration. The voltage gain of driver stage 355 is slightly less than one, but the power gain is substantially more than one. The gates of transistors 356 and 357 are coupled together at the input of driver stage 355 and the source terminals are coupled together at the output of driver stage 355. The drain of NMOS transistor 356 is coupled to the $+V_{PP}$ supply and the drain of PMOS transistor 357 is coupled to the $-V_{PP}$ supply. The $-V_{PP}$ level has a value near that of the first voltage level of oscillator output 341 and the $+V_{PP}$ has a value near that of the second voltage level of oscillator output 341. In turn, the output of the driver stage 355 is coupled to first terminal 311 of power inductor means 310 by way of current sense resistor 385. Second terminal 312 of power inductor means 310 is coupled to ground. (As an alternative, second terminal 312 may be driven by a signal which is 180° out of phase with the signal coupled to first terminal 311.) With this coupling, the signal from oscillator 340 is coupled to power inductor means 310, for coupling of energy pulses and energy transitions to medium 110.

Gating transistor 350 comprises a first conduction terminal (e.g., a FET drain) coupled to output port 341 of oscillator 340 and to the input of driver stage 355, a second conduction (e.g., a FET source) terminal coupled to ground, and a control terminal (e.g., a FET gate) coupled to a first output port 361 of control means 360. Caring transistor 350 serves to selectively ground the input signal to driver stage 355, which results in an output voltage of substantially zero volts, due to the near unity voltage gain of stage 355. This occurs when gating transistor 350 is rendered conductive by a voltage of approximately 5 to 10 volts applied to its control terminal (gate). As a result, the signal coupled to power inductor means 310 by driver stage 355 is substantially zero. Gating transistor 350 is rendered non-conductive when a voltage of approximately $-V_{PP}$ is applied to its control gate. When this occurs, the signal generated at output port 341 is coupled to the input of driver stage 355 and on to inductor means 310.

The control terminal (e.g., gate) of transistor 350 is responsive to a control signal generated on an output port 361 by control means 360. Depending upon the state of communications between master station 300 and slave station 200, control means 360 selectively renders transistor 350 conductive so that one or more energy transitions from oscillator 340 are prevented from being coupled to inductor means 310. In this manner, control means 360 is enabled to selectively place resting durations between sets of consecutive energy transitions provided by oscillator 340.

As indicated above, resistor 385 is coupled between the output of driver stage 355 and terminal 311 of inductor means 310 and is for sensing the instantaneous current through inductor 310. As indicated above with reference to FIG. 6, the current through inductor means 310 is cosine in nature. In turn, the voltage generated across resistor 385 is cosine in nature. Differential amplifier 380 includes a non-inverting input 381 and an inverting input 382, each coupled to a respective terminal of resistor 385, and an output 383 coupled to an input 363 of control means 360. The value of resistor 385 is preferably chosen such that a voltage having a peak-to-peak value of at least ~100 mV is generated between the inputs 381,382 of amplifier 380. In one embodiment of the present invention, where the inductance of inductor 310 is ~10 μH and the frequency of oscillator 340 is ~5 MHz, the value of resistor 385 is on the order of 1 to 2 ohms. With this level of input, amplifier 380 generates a square wave analog of the current waveform at its output 383. The signal at output 383 comprises zero-voltage crossings which indicate when the current in inductor 310 is substantially zero. Master control means 360 monitors the zero-voltage crossings and preferably comprises a zero-voltage crossing detector.

Master control means 360 is responsive to communication commands issued by digital subsystem 390 and comprises means for controlling the operation of gating transistor 350 to provide appropriate sets of consecutive energy transitions to medium 110, as specified by a given communication protocol. An exemplary communication protocol is described below. Control means 360 additionally includes input port 362 for receiving the synchronization signal from oscillator 340, input port 363 for receiving the zero-current sense signal from amplifier 380, an input port 366 for receiving a detection indication signal from sensing means 370, and an input/output port 364 coupled to a bi-directional data bus 336 for receiving commands from digital subsystem 390. Data bus 336 is, in turn, coupled to an input/output port 396 of digital subsystem 390. Master control means 360 further includes output port 361 for outputting a gating signal to transistor 350, and an output port 367 for outputting a control signal to transition sensing means 370, which is described in greater detail below.

In this regard, it may be appreciated that the electrical characteristics of oscillator 340, driver stage 355, and inductor means 310 can be characterized to determine the steady-state phase difference between the voltage signal at oscillator output 341 and the current through inductor means 310. The current typically lags the voltage signal at a phase angle ranging between ~0° and ~90°, depending upon the amount of parasitic resistance, capacitance, and core losses. With a known phase difference and a known oscillation frequency, control means 260 can turn off the voltage to inductor means 310 under a zero current condition by turning off the voltage at a predetermined time, as determined by the frequency and phase angle, after a zero-voltage crossing in the signal at oscillator output 341. In this case, it may be appreciated that this predetermined turn-off time would serve the same function as current sense resistor 385 and buffer amplifier 380, and that it could be used as a replacement thereof.

Master control means 360 further comprises means responsive to the signal at input port 362 for initiating a set of consecutive energy transitions when the voltage of oscillator output 341 is near zero volts and means responsive to the signal at input port 363 for terminating a set of consecutive energy transitions when the current through inductor 310 is near zero amperes. The initiating means includes means for generating a voltage of —$V_{PP}$ at output port 361 at the beginning of each set of transitions and throughout the set of transitions. The termination means includes means for generating a voltage of between ~5 volts and +$V_{PP}$ at output port 361 at the end of each set of transitions and before each set. The means for generating the voltages at output port 361 may be accomplished by digital circuitry and level-shifting circuitry well known in the digital circuits art.

Master control means 360 further comprises means for communicating with digital subsystem 390 by way of data bus 336. Both communication commands and bi-directional data are capable of being communicated between control means 360 and digital subsystem 390 over bus 336. Any one of the many well known data bus communication protocols such as RS232, μWIRE, SPI, $I^2C$, or byte-wide transfer may be used for communicating between control means 360 and digital subsystem 390. The choice of such a protocol and a detailed description thereof is not critical to an understanding of the present invention and to enable one of ordinary skill in the art to make and use the same.

As indicated above, transition sensing means 370 is for detecting the magnetic energy transitions received by master station 300 from coupling medium 110 by way of inductor means 320. Transition sensing means 370 comprises a differential amplifier 378, two resistors 371 and 372, an analog switch 374 having a PMOS transistor and an NMOS transistor, and an invertor 375 for driving the gate of the PMOS transistor of analog switch 374. Differential amplifier 378 includes a non-inverting input and an inverting input, which are coupled to terminals 321 and 322 of inductor means 320, respectively, by way of resistors 371 and 372, respectively. In one embodiment, terminal 322 is coupled to ground to reference the voltage generated by inductor means 320. The magnetic energy transitions received by inductor means 320 are coupled to amplifier 378 in the form of electrical signals, preferably voltage signals, which are then amplified at an output of amplifier 378. The output of differential amplifier 378 is coupled to input port 366 of control means 360, which provides control means 360 with an indication that energy transitions have been coupled to master station 300. The number of energy transitions is preferably determined by counting the number of voltage transitions occurring at the output of amplifier 378. In a preferred embodiment of system 100, the occurrence of no transitions at the output of amplifier 378 during a resting duration 64 represents a binary zero value and the occurrence of one or more represents a binary one value. These transitions are readily detected by control means 360 at input port 366.

Switch 374 of sensing means 370 is for selectively coupling the inverting and non-inverting inputs of amplifier 378 together such that amplifier 378 is prevented from providing an indication of any energy transitions. In a preferred embodiment of the present invention, analog switch 374 is rendered conductive to prevent amplifier 378 from indicating transitions during those times in which master station 300 is coupling energy transitions to medium 110, and to avoid over-driving the sensitive inputs of amplifier 378 with the relatively large signal generated by inductor means 310 of the master station itself. Sensing means 370 is enabled to only detect those energy transitions provided to coupling medium 110 by slave station 200. In this regard, it may be appreciated that, as an equivalent, analog switch 374 may be omitted and an equivalent function placed within control means 360, whereby the signal at second input 366 is only monitored by control means 360 during resting durations, e.g., at times when control means 360 has rendered gating transistor 350 conductive. This may be done in cases where amplifier 378 comprises inputs which can tolerate the large signal generated by indictor means 310.

As an alternative to coupling the inputs of amplifier 378 to inductor means 320, these inputs may be coupled to inductor means 310, provided that driver means 355 is electrically isolated from inductor means 310 during the resting durations.

For selectively gating analog switch 374, sensing means 370 preferably comprises an invertor 375 having an input coupled to the gate of the NMOS transistor of analog switch 374 and an output coupled to the gate of the PMOS transistor. Second output port 367 of control means 360 is coupled to the gate of the NMOS transistor of analog switch 374 and to the input of invertor 375. To selectively render analog switch 374 conductive, control means 360 raises the voltage on output port 367 to substantially greater than three volts, which causes both the PMOS and NMOS transistors of analog switch 374 to become conductive. To render the PMOS and NMOS transistors of analog switch 374 nonconductive, control means 360 places a negative voltage on the order of $-V_{PP}$ on output port 367.

The operation of control means 360 is further described below with reference to a flow diagram shown in FIGS. 6A–6C. However, a further description of slave station 200 is first provided.

A more specific schematic diagram of slave station 200 is also shown in FIG. 4B. Each of rectifier means 220, power and regulation means 230, detector means 240, communication means 250, and digital subsystem 290 are discussed below in greater detail. Rectifier means 220 includes a first port having terminals 221 and 222 coupled to terminals 213 and 214, respectively, of inductor means 210, and an output port having terminals 223 and 224. Rectifier means 220 comprises means for generating a rectified voltage at its output port from the energy received at its input port from inductor means 210. Rectifier means 220 further comprises four transistors *225a, 225b, 225c, 225d* configured in a conventional full-wave bridge rectifier topology. In a preferred embodiment of the present invention, transistors *225a–d* comprise NMOS transistors. Rectifier means 220 generates a rectified voltage and current at its output port from the energy received by inductor means 210. Transistors *225a–d* are configured such that a positive voltage is developed at terminal 223 with respect to terminal 224. As shown in FIG. 4B, terminal 223 is coupled to a power storage capacitor 234 of regulator 235.

Power and regulation means 230 includes an input port having terminals 231 and 232 coupled to the output port of rectifier means 220. Specifically, input terminal 231 is coupled to output 223 of rectifier means 220 and input terminal 232 is coupled to output 224 of rectifier means 220. Power and regulation means 230 further includes an output port including a terminal 236 for providing a positive voltage supply $V_{DD}$, a terminal 239 for providing a negative voltage supply $-V_{BB}$, and a terminal 237 for providing a ground reference potential. The power supplies and ground provided by means 230 are used to provide the requisite power for detector means 240, communication means 250, and digital subsystem 290 of slave station 200. Power and regulation means 230 comprises a power storage capacitor 234 coupled between input terminals 231 and 232 for storing electrical energy generated by rectifier means 220. Power and regulation means 230 preferably further includes a regulation means 235 having an input coupled to capacitor 234, an output coupled to terminal 236, and a grounding port coupled to input terminal 232 and to ground terminal 237. As shown in FIG. 4B, input terminal 232 is coupled to ground terminal 237. Exemplary regulation means are well known in the an and a more detailed discussion of such means is not necessary in order to understand the present invention and enable one of ordinary skill in the an to make and use the same.

Power and regulation means 230 preferably further includes a negative voltage generation means 238 having an input coupled to capacitor 234 and an output coupled to terminal 239. An exemplary negative voltage generation means may include a charge pump, as for example taught in U.S. Pat. No. 4,393,481 to Owen, et al. A more detailed discussion of such a negative voltage generation means is not necessary in order to understand the present invention and enable one of ordinary skill in the an to make and use the same. It may be appreciated that rectifier means 220 and capacitor 234 comprise means for powering slave station 200 and that regulation means 235 and 238 comprise means for providing regulated power supplies to slave station 200.

In one preferred embodiment of the present invention, regulation means 235 comprises means for limiting the maximum voltage provided at output terminal 236 to a predetermined voltage, for example 6 V. Such regulation means are well known to the solid state circuits an and a detailed explanation thereof is not necessary in order to understand the present invention and enable one of ordinary skill in the an to make and use the same. Regulation means 235 may further include an source-follower type output stage which regulates the voltage of its output to approximately 5 V and enables the voltage at its input (i.e., capacitor 234) to rise to voltages well above 5 V, thus enabling capacitor 234 to store greater amounts of energy.

Detector means 240 includes a first input terminal 243, a first output port 241, a second output port 242, a power receiving terminal 244, and a ground terminal 245. As indicated above, inductor means 210 receives magnetic energy transitions from medium 110 and provides at its terminals 213 and 214 an electrical signal indicative of these magnetic energy transitions. Input port 243 of detector means 240 is coupled to inductor means 210 and is for receiving this electrical signal indicative of the magnetic energy transitions received by inductor means 210. Detector means 240 comprises means for detecting from the electrical signal provided to input port 243 an energy transition and for outputting a transition signal in response thereto at its first output port 241. Detector means 240 further comprises means for detecting, from the electrical signal at input 243, the absence of an energy transition during a predetermined time duration following the detection of a preceding energy transition and for outputting an absence signal in response thereto at its second output port 242.

For detecting the absence of an energy transition, detector means 240 further includes means for comparing the time duration between successive detected transitions against a predetermined time duration and for generating the absence signal at output port 242 when the time duration between two successive transitions exceeds this predetermined time duration. In operation, consecutive energy transitions received by slave station 200 occur substantially within a set predetermined time $T_{ET}$. If an energy transition does not occur within the time duration $T_{ET}$ from the last detected transition, then an absent transition is indicated. In one embodiment of detector means 240, an absence signal is generated if such an energy transition does not occur within a time duration of $2*T_{ET}$, which is equal to the time duration between three consecutive transitions. This longer time is to provide a "safety" margin for the detection of absent transitions since master station 300 and slave station 200 may be operating with slightly different time bases. It may be appreciated that any time duration greater than $T_{ET}$, such as $3/2*T_{ET}$, may also be used.

An exemplary embodiment of detector means 240 is shown at 400 in FIG. 5A. Ports 241–243 of detector means 240 are replicated for detector means 400. Detector means 400 comprises a zero-voltage crossing detector 405 for detecting zero-voltage crossings in the signal present at port 243 and for outputting corresponding pulses at an output 407, which is coupled to port 241. Zero-crossing detector 405 includes an input 406 coupled to input port 243.

Detector means 400 further comprises an interval timer 410, including an input 411 and an output 412, for generating a predetermined time-out period. Input 411 is coupled to output 407 of detector 405 and output 412 is coupled to port 242 by way of a digital inverter 415. In response to a pulse at its input 411, interval timer 410 generates a negative-going pulse (high-low-high) a predetermined time interval later. If another pulse is received at input 411 before this time interval is elapsed, the timer is reset. In this case, a negative-going pulse is not generated. In this way, a negative-going pulse is generated if the time between pulses at input 411 is greater than the timer interval. The timer interval is set to be greater than the time $T_{ET}$ and, in a preferred embodiment, greater than $2*T_{ET}$. For convenience, the negative-going pulse at output 412 is inverted to a positive going pulse (low-high-low) by inverter 415 before being coupled to output port 242.

Exemplary waveforms of the signals at ports 241–243 are shown in timing diagram 425 in FIG. 5B. Timing diagram 425 includes a graph 426 showing an exemplary voltage $V_{243}$ at port 243, a graph 427 showing an exemplary voltage $V_{241}$ at port 241, a graph 428 showing an exemplary voltage $V_{242}$ at port 242, and a graph 429 showing the energy pulses and transitions corresponding to input signal $V_{243}$. Two sets of consecutive voltage cycles separated by a resting duration 430 are shown in graph 426. Also shown in graph 426 are a positive threshold level 431 and a negative threshold level 432, which are used in detecting the zero voltage crossings in signal $V_{243}$. In a preferred embodiment of the present invention, a pulse is generated at output 407 of detector 405 when a positive-going transition in $V_{243}$ (i.e., negative to positive) crosses positive threshold 431, and a pulse is generated at output 407 when a negative-going transition in $V_{243}$ (i.e., positive to negative) crosses negative threshold 432. The corresponding pulses at shown at graph 427. In a preferred embodiment, the last voltage transition in a set of voltage cycles, shown at 433 in FIG. 5B, does not generate a pulse because it does not cross through negative threshold level 432. Threshold levels 431 and 432 aid in mitigating the effects of noise, which may cause an unwanted pulse indication. These levels are also shown in graph 504 of FIG. 6.

The time period $T_{ET}$ between energy transitions in graph 429 are shown at 435 in graph 429. The missing pulse signal $V_{242}$ generated in response to resting duration 430 is shown at 440 graph 428. As can be seen by comparing graphs 428 and 429, pulse 440 occurs slightly more than $2*T_{ET}$ after the last energy transition preceding resting duration 430. In a preferred embodiment of the present invention, there are two zero-voltage crossings detected for each voltage cycle (graph 426). Thus, the number of zero crossings $N_{ZVC}$ detected is twice the number of voltage cycles $N_{VC}$:$N_{ZVC}$= $2*N_{VC}$. In each set of consecutive voltage cycles, the number of zero-crossing detection pulses (graph 427) is equal to twice the number of voltage cycles plus one due to the pulse generated in response to the partial voltage cycle at the end of the set, which is shown at 434 in graph 426. Thus, the number of pulses, $N_{PULSES}$, output on port 241 for a set of consecutive energy transitions is equal to $(2*N_{VC}+1)$. As indicated above, there are four energy transitions per voltage cycle, $N_{ET}= 4*N_{VC}$. Thus, the number of pulses output on port 241 can be directed related to the number of energy transitions in medium 110 as: $N_{PULSES}=(½*N_{ET}+1)$.

Both zero-voltage crossing detector 405 and interval timer 410 may be constructed by circuits well known in the digital circuits art. For example, detector 406 may comprise a dual edge-triggered monostable multivibrator ("one-shot") having an output pulse duration which is shorter than the time between zero-crossings. Interval time 410 may comprise an edge triggered monostable multivibrator timer. Such circuitry are well known in the art and a further detailed explanation thereof is not necessary in order to understand detector means 400 (and 240) and enable one of ordinary skill in the art to make and use the same. Thus, it may be appreciated and detector means 240 comprise a detection means coupled to the first and second terminals of inductor means 210 for detecting from the electrical signal of inductor means 210 an energy transition and outputting a transition signal at output port 241 in response thereto. It may also be appreciated that this detection means is further for detecting the absence of an energy transition during a predetermined time duration following the detection of a preceding energy transition and for outputting an absence signal at output 242 in response thereto.

Returning now to FIG. 4B, communication means 250 includes an input port 251 for receiving the transition signal from detector means 240, an input port 252 for receiving the absence signal from detector means 240, output ports 253 and 254 for providing energy transitions to inductor means 210, a bi-directional communications bus 255 for communications to and from digital subsystem 290, and a power port 259 for receiving power from power means 230. Ports 251 and 252 are coupled to output ports 241 and 242, respectively, of detector means 240. Ports 253 and 254 are coupled to terminals 213 and 214, respectively, of inductor means 210. Bus 255 is coupled to a corresponding port 295 of digital subsystem 290. Power port 259 is coupled to output terminal 236 of power and regulation means 230.

Control means 260 of communication means 250 is responsive to the transition and absence signals from detector means 240 and includes an input port 261 coupled to output port 241 (by way of port 251) for receiving the transition signal, and an input port 262 coupled to output port 242 (by way of port 252) for receiving the absence signal. Additionally, control means 260 comprises means for detecting, i.e., counting, the number of consecutive energy transitions occurring between a first absence of energy transitions and a subsequent second absence of energy transitions. Control means 260 preferably comprises a counter means responsive to the signals at ports 241 and 242 for this purpose. Control means 260 further includes output ports 263 and 264 coupled to switch matrix 270 for directing the operation of matrix 270, and a communications port 265 coupled to bus 255 for communicating data to digital subsystem 290. Control means 260 further includes a power port 269 coupled to $V_{DD}$ supply terminal 236, a negative voltage port 268 coupled to $-V_{BB}$ supply terminal 239, and a ground port 267 coupled to ground 237. As discussed below in greater detail, control means 260 further comprises means for outputting digital data to digital subsystem 290 and for receiving digital data from subsystem 290 via port 265, and means for directing switch matrix 270 to charge capacitor 280 from the $V_{DD}$ supply terminal 236 and to selectively discharge capacitor 280 into inductor means 210 via port 253 and 254.

Switch matrix 270 comprises a first node 274, a second node 275, and four transistors 276–279. A respective terminal of capacitor 280 is coupled of each of nodes 274 and 275. The two conduction terminals of transistor 276 (e.g., source and drain) are coupled to node 274 and output port 253 of the communication means 250, respectively. The control terminal of transistor 276 (e.g., gate) is coupled to output port 263 of control means 260. Likewise, the two conduction terminals of transistor 277 (e.g., source and drain) are coupled to node 275 and output port 254 of communication means 250, respectively. The control terminal of transistor 277 (e.g., the gate) is also coupled to output port 263 of control means 260. Transistors 276 and 277 are responsive to output port 263 and provide means for coupling capacitor 280 to inductor means 210 via ports 253 and 254 when a positive voltage is applied by output port 263. The discharge of capacitor 280 into inductor means 210 couples at least one energy transition, and preferably at least two energy transitions, from inductor means 210 into coupling medium 110. When capacitor 280 is to be isolated from inductor means 210, output port 263 applies a negative voltage to the control terminals of transistors 276 and 277 to keep these transistors turned OFF. This is because the voltage at each of terminals 213 and 214 alternate between positive and negative values with respect to ground 237.

In a similar manner, the conduction terminals of transistor 278 (e.g., source and drain) are coupled to node 274 and ground, respectively. The control terminal of transistor 278 (e.g., gate) is coupled to output port 264 of control means 260. Likewise, the conduction terminals of transistor 279 (e.g., source and drain) are coupled to node 275 and $V_{DD}$ supply terminal 236, respectively. The control terminal of transistor 279 (e.g., the gate) is coupled to output port 264 of control means 260. Transistors 278 and 279 are responsive to output port 264 and provide means for coupling capacitor 280 between ground and the $V_{DD}$ supply terminal 236 for selectively charging capacitor 280 when a positive voltage is applied by output port 264. In a preferred embodiment, transistors 278 and 279 collectively have an initial "ON" resistance which is sufficiently high to prevent the charging of capacitor 280 from excessively loading the supply voltage $V_{DD}$, thereby maintaining $V_{DD}$ at a sufficient level for operating the other components of slave station 200. The sufficient "ON" resistance may be accomplished in a number of ways. First, either one or both transistors 278 and 279 may be designed with a lower W/L ratio (channel-width to channel-length). Second, the gate drive to transistors 278 and 279 may be gradually ramped up, or otherwise modulated. Third, the gate drive may be pulsed.

When capacitor 280 is coupled to inductor means 210, a resonant distributed LC circuit is formed whereby energy may be transferred back and forth between capacitor 280 and inductor means 210. In one embodiment of slave station 200, the distributed LC circuit of inductor means 210 and discharge capacitor 280 have a resonant frequency of approximately 30 Mhz, which is greater than the preferred range of oscillation frequency of 0.5 Mhz to 10 Mhz for oscillator 340 of master station 300. Additionally in this embodiment, inductor means 210 has a parasitic resistance of 2K-ohms to 4K-ohms (lumped equivalent), an inductance of 5 to 10 micro-henries (lumped equivalent), and a capacitance of approximately 5–10 picofarads (lumped equivalent), and capacitor means 280 has a capacitance of 10–20 picofarads (lumped equivalent). With these parameters, the distributed RLC circuit has an over-damped response characteristic, which limits the number of voltage and current oscillations that occur between capacitor 280 and inductor means 210 when capacitor 280 is discharged into inductor means 210. Also in this preferred embodiment of communication system 100, master station 300 provides resting durations equal to at least one pulse duration of oscillator 340. Thus, with this limited number of oscillations in the slave's LC circuit and with the resonant frequency of the slave's LC circuit being larger than the preferred frequency range of oscillator 340, slave station 200 is capable of coupling a limited number of transitions, preferably at least two, during the above-described third resting duration.

An alternate embodiment of slave station 200 is shown at 200' in FIG. 4C. Slave station 200' is identical to slave station 200 shown in FIG. 4B with the exception that a second inductor means 210' is used in discharging storage capacitor 280. Second inductor means includes a first terminal 213' coupled to port 253 of communication means 250 and a second terminal 214' coupled to port 254 of communication means 250. Second inductor means 210' is coupled to electromagnetic coupling medium 110 and may be constructed in a similar manner as inductor means 210. Inductor means 210 and 210' may comprise coils which are separately disposed from one another or are disposed concentrically. The case where inductor means 210 and 210' are disposed separate from one another is shown at 1000 in FIG. 16A, and the case where inductor means 210 and 210' are disposed concentrically to one another is shown in FIG. 16B. In order to reduce the visual complexity of FIGS. 16A and 16B, two exemplary loops of conductive wire for each of inductor means 210 and 210' are shown in FIG. 16A and an exemplary single loop of conductive wire for each of inductor means 210 and 210' is shown in FIG. 16B. The use of two such coils 210 and 210' provides the advantage of enabling the design optimization of each coil for its respective function.

Having thus described slave station 200, the following points may now be appreciated. First, it may be appreciated that capacitor 234 comprises a first energy storage means for storing energy in an electrical form and that inductor means 210 and transistors *225a–d* collectively comprise means for coupling the energy from the energy pulses coupled to slave station 200 to the first energy storage means. It may be further appreciated that capacitor 280 comprises a second energy storage medium and that control means 260 and switch matrix 270 collectively comprise means for charging capacitor 280 (the second energy storage means) from the energy stored in capacitor 234 (the first energy storage means). It may also be appreciated that control means 260 and switch matrix 270 collectively comprise means for selectively coupling the energy stored in capacitor 280 to inductor means 210 during a selected time interval (such as, for example, during a portion of a resting duration) to cause at least one energy transition to be coupled to medium 110. Nearly all the charge stored on capacitor 280 may be coupled to inductor means 210 in a relatively short time duration without substantially affecting the charge stored on capacitor 234, which powers the components of slave station 200. The short time duration is preferably less than the average time duration of the above-described numbers of consecutive energy transitions. As compared with the prior methods of communicating information from a slave station to a master station, this is a highly power efficient way of coupling energy transitions to medium 110 which may be readily detected by master station 300. With this greater efficiency, slave station 200 may be readily formed on an integrated circuit chip because all the energy received by slave station 20 is efficiently used, thereby reducing the required chip area needed for energy storage.

The operation of control means 360 of master station 300 and control means 260 of slave station 200 are now further described with reference to flow diagrams shown in FIGS. 7–14.

A flow diagram of the operation of an exemplary master control means 360 for master station 300 according to the present invention is shown at 600 in FIG. 7. Flow diagram 600 comprises blocks 602–626, beginning at block 602 and ending at block 626. In blocks 604 through 612, master control means 360 receives a command from digital subsystem 390 and initializes communications with a slave station 200. In blocks 614–624, master control means 360 interprets the communication command from subsystem 390, executes the communication command, and then checks digital subsystem 390 for further communication commands. In a preferred embodiment of the present invention, the communication commands include, but are not limited to, a read-byte command which requests a byte of data from slave station 200, and a write-byte command, which sends a byte of data to slave station 200 for storage.

From starting block 602, flow diagram 600 proceeds to block 604, where master control means 360 waits for a communication command from digital subsystem 390. In a preferred embodiment of the present invention, each of the read-byte and write-byte commands includes an address for a desired memory location within slave digital subsystem 290 of slave station 200. The write-byte command also includes a corresponding data byte. The address may comprise 2–32 binary bits for specifying the desired memory location, as well-known in the semiconductor memory art. For the write command, digital subsystem 390 preferably provides eight data bits for the data byte. It may be appreciated that error correction bits may be included along with the eight data bits. Flow diagram 600 then proceeds to block 606 where master control means 360 activates its port 361 to prevent the oscillator signal at port 341 from being coupled to inductor means 310. This creates a resting duration in coupling medium 110 between stations 200 and 300.

From block 606, flow diagram 600 proceeds to block 608 where control means 360 couples a starting number of energy transitions to medium 110. A resting duration follows the starting number of energy transitions. In one embodiment of the present invention, the starting number of energy transitions is on the order of 400 (corresponding to 200 energy pulses and to 100 voltage cycles). The operation of master control means 360 for coupling the starting number of energy transitions to medium 110 is discussed in greater detail below with reference to a flow diagram 630 in FIG. 8. Flow diagram 630 is a flow diagram describing the steps master control means 360 performs for coupling any specified number of energy transitions to coupling medium 110 and has general applicability.

From block 608, flow diagram 600 proceeds to block 610, where control means 360 monitors its port 366 during this resting duration for a response from slave station 200 acknowledging receipt of the starting number of energy transitions. For this monitoring step, master control means 360 de-activates its port 367 flow voltage) to enable transition sensing means 370, waits a predetermined time for a response, and then re-activates port 367 (high voltage) to disable transition sensing means 370. If slave station 200 is powered up and initialized at this point, it will issue one or more energy transitions in this resting duration. If slave station 200 is not suitably powered and initialized, it will not issue a response in this resting duration. Flow diagram 600 proceeds to block 612, where control means 360 determines whether slave station 200 has issued a response during the resting duration. If no response was received, flow diagram 600 returns back to block 608, where a starting number of energy transitions is again coupled to medium 110. If a response has been received, flow diagram 600 proceeds to block 614.

At block 614, control means 360 determines if the command from digital subsystem 390 is a read-byte command. If it is a read command, flow diagram 600 proceeds to block 620, where a byte of data is read from slave station 200. The read-byte operation at block 620 is explained in greater detail below with reference to a flow diagram 650 shown in FIGS. 9A and 9B. If the command from digital substation 390 is not a read-byte command, flow diagram 600 proceeds to block 616. At this block, master control means 360 determines whether the command is a write-byte command. If so, flow diagram 600 proceeds to block 622 where a byte of data is written to slave station 200. The write-byte operation of block 622 is explained in greater detail below with reference to a flow diagram 700 shown in FIGS. 10A–10B. If the command is not a write-byte command, flow diagram 600 proceeds to block 618. Each of the operations at blocks 620 and 622 also proceed to block 618 after their respective steps are completed.

At block 618, master control means 360 determines whether subsystem 390 has issued a further communication command. If so, flow diagram 600 proceeds to block 624 where the further command is obtained. If there is no further communication command, flow diagram 600 proceeds to block 626, where master control means 360 terminates communications with slave station 200. If a new command is received, flow diagram 600 returns to 614 from block 624, where the nature of the command is determined. Flow diagram 600 proceeds through blocks 614–624 as described above until no further communication commands are provided by digital substation 390.

It may be appreciated that the acknowledgment responses sent by slave station 200 are not needed for communications to be enabled between stations 200 and 300 according to the present invention, but rather are for providing a fault tolerant communication means, as in a further preferred embodiment of the present invention. Thus, the operations of blocks 610–612 are not necessary for carrying out the basic data communications according to the present invention, but rather are preferred.

An exemplary flow diagram for coupling a selected number of energy transitions to coupling medium 110 is shown at 630 in FIG. 8. Flow diagram 630 comprises blocks 632–642, starting at block 632, ending at block 642, and proceeding sequentially through the blocks. At block 634, master control means 360 waits for a synchronization signal from oscillator 340 indicating that a voltage cycle at oscillator output 341 has substantially begun. The synchronization signal is provided at port 362 of master control means 360. Upon receiving the synchronization signal, flow diagram 630 proceeds to block 636, where master control means 360 deactivates its port 361. This allows the voltage cycles from oscillator 340 to be coupled to driver stage 355, and on to inductor means 310. Master control means 360 also counts the number of voltage cycles as indicated on its port 362 until the selected number of energy transitions is coupled to inductor means 310. The selected number may be any of the first, second, third, sixth, and seventh predetermined numbers described above. At block 638, control means 360 waits for the next zero current crossing indication at its port 363. Once receiving the zero current crossing indication, flow diagram 630 proceeds to block 638, where master control means 360 activates port 361 to create a resting duration. The resting duration is preferably on the order of one voltage cycle, as indicated to master control means 360 on its port 362. By monitoring the zero crossing point at block 638 before creating the resting duration at block 640, control means 360 shuts down the signal to inductor means 310 to minimize any over-shoot or under-shoot effects due to the RLC circuit.

As described above, inductor means 310 and driver means 355 may be suitably characterized so as to determine the phase lag between the voltage at oscillator output 341 and the current through inductor 310. Knowing this phase lag, the control means 360 may activate port 361 in block 640 without requiring the monitoring of the zero current in block 638. Rather, in this alternate embodiment, control means 360 deactivates port 361 a predetermined time after the selected number of voltage cycles have been coupled, the predetermined time duration corresponding to the above-described phase lag.

Flow diagram 630 has general applicability and may be used to couple the above-described starting number of energy transitions to coupling medium 110. It may also be used to couple the first, second, third, sixth and seventh predetermined numbers to medium 110 as described below with reference to exemplary flow diagrams for the read-byte and write-byte operations performed at blocks 620 and 622, respectively, in FIG. 7.

An exemplary flow diagram for generating a response for slave station 200 is shown at 830 in FIG. 12. Flow diagram 830 comprises blocks 832–848, starting at block 832, ending at block 848, and proceeding sequentially through the blocks. At block 834, slave control means 260 de-activates its transition counter means from the signals at its ports 261 and 262. This prevents the energy transitions which slave station will subsequently couple to medium 110 as its response from altering the value of the transition count. At block 836, slave control means 260 de-activates the signal at its output port 264. This causes transistors 278 and 279 to decouple storage capacitor 280 from the $V_{DD}$ supply provided by power storage and regulation means 230, all shown in FIG. 4B. At block 838, slave control means 260 activates the signal at its output port 263, which causes transistors 276 and 277 to couple capacitor 280 to inductor means 210 shown in FIG. 4B (or inductor means 210' shown in FIG. 4C). Capacitor 280 resonates with inductor means 310 to coupled one or more energy pulses and energy transitions to coupling medium 110. At block 840, slave control means 260 waits a time duration in which at least one energy transition is coupled from slave station 200. In a preferred embodiment of the present invention, this period is greater than one-half a voltage cycle of master station 300. At block 842, slave control means 260 de-activates the signal at its output port 263, causing capacitor 280 to be isolated from inductor means 310, thus terminating the coupling of energy transitions to medium 110. At block 844, slave control means 260 activates the signal on its output port 264 to resume the charging of capacitor 280. At block 846, slave control means 260 activates its transition counter means to the signals at its ports 261 and 262. Flow diagram 830 ends at block 848. It may be appreciated that the operations at blocks 834 and 846 may be eliminated in those cases where the transition count is reset immediately following the issuance of a response.

Flow diagram 830 has general applicability and may be used to generate an acknowledgment response for slave station 200 as shown at block 810 in FIG. 11. It may also be used to issues appropriate acknowledgment responses in the send data byte and receive data byte operations shown at blocks 818 and 820, respectively, in FIG. 11, as described below in greater detail below with reference to exemplary flow diagrams for these data byte operations.

An exemplary flow diagram for the read-byte operation of block 620 is shown at a flow diagram 650 in FIGS. 9A–9B. Flow diagram 650 comprises blocks 652–694, beginning at block 652 and ending at block 694. In blocks 654 through 658, flow diagram 650 sends a read-byte command to slave station 200. In block 660 through 674, master control means 360 sends the address to slave station 200. In block 676 through 692, master control means 360 reads a data byte from slave station 200. Each of these blocks is described in greater detail below.

From starting block 652, flow diagram 650 proceeds to block 654, where control means 360 couples the sixth predetermined number of energy transitions to coupling medium 110. Block 654 includes the steps of flow diagram 630 shown in FIG. 8, with the selected number of energy transitions being equal to the sixth predetermined number. At the end of the steps of block 654, a resting duration in the energy transitions is created. The sixth predetermined number of transitions indicates to slave station 200 that master station 300 is requesting a byte of data. In response to receiving the sixth predetermined number of energy transitions, slave station 200 couples one or more energy transitions to medium 110 during the subsequent resting duration, as an acknowledgement of receiving and understanding the read-byte command. However, there is a possibility that slave station 200 may not receive or understand the read-byte command due to electromagnetic interference or other reasons, and therefore does not respond. Flow diagram 650 proceeds to block 656, where master control means 360 monitors its port 366 for this response from slave station 200. For this monitoring step, master control means 360 de-activates its port 367 (low voltage) to enable transition sensing means 370, waits a predetermined time for a response, and then re-activates port 367 (high voltage) to disable transition sensing means 370.

From block 656, flow diagram 650 proceeds to block 658, where the determination is made whether slave station 200 has issued a response. If slave station has not issued a response, flow diagram 650 returns back to block 654, where the sixth predetermined number of energy transitions is again coupled to medium 110. This provides fault tolerance for the communication system according to the present invention. If there is a response at block 658, flow diagram 650 proceeds to block 660, where the process of sending the address to slave station 200 begins.

At block 660, control means 360 obtains the first bit of the address and proceeds to block 662, where control means 360 determines whether the bit has a binary zero or a binary one value. If the bit is a binary zero, flow diagram 650 proceeds to block 664, where master control means 360 couples the first predetermined number of energy transitions to medium 110. This block includes the steps of flow diagram 630 shown in FIG. 8, with the selected number of energy transitions being equal to the first predetermined number. If the address bit is a binary one, flow diagram 650 proceeds to block 666, where the second predetermined number of energy transitions is coupled to medium 110. This block includes the steps of flow diagram 630 shown in FIG. 8, with the selected number of energy transitions being equal to the second predetermined number. At the end of the steps of each block 664 and 666, a resting duration in the energy transitions is created.

From block 664 and 666, flow diagram 650 proceeds to block 668, where master control means 360 monitors its port 366 during the subsequent resting duration for a response from slave station 200 acknowledging receipt of either the first or second predetermined number of energy transitions. For this monitoring step, master control means 360 de-activates its port 367 (low voltage), waits a predetermined time for a response, and the re-activates port 367 (high voltage). From block 668, flow diagram 650 proceeds to block 670, where master control means 360 determines whether a response from slave station 200 has been received.

If no response has been received, flow diagram 650 returns back to block 654 to reissue the read-byte command. This provides fault tolerance for the communication system according to the present invention.

If a response is received, flow diagram 650 proceeds to block 672, where master control means 360 determines whether the most recent bit sent is the last bit in the address. If it is not the last bit, flow diagram 650 proceeds to block 674, where the next address bit is obtained. From block 674, flow diagram 650 returns back to block 662 to transmit the next address bit to slave station 200 according to the operations of blocks 662–670. If the most recent bit is the last address bit, flow diagram 650 then proceeds to block 676, where the reception of the requested data byte from slave station 200 begins.

At block 676, the process of reading the first bit in the data byte from slave station 200 begins. The process proceeds to block 678, where the third predetermined number of energy transitions is coupled to medium 110. This block includes the steps of flow diagram 630 shown in FIG. 8, with the selected number of energy transitions being equal to the third predetermined number. Flow diagram 650 then proceeds to block 680, where master control means 360 monitors its block 366 during the resting duration for a possible response back from slave station 200. For this monitoring step, master control means 360 de-activates its port 367 (low voltage), waits a predetermined time for a response, and then re-activates port 367 (high voltage). From block 680, flow diagram 650 proceeds to block 682, where control means 360 determines whether a response from slave station 200 has been received. If no response has been received, flow diagram 650 proceeds to block 684, where the bit is recorded as a binary zero. However, if a response has been received, flow diagram 650 proceeds to block 686, where control means 360 records the bit as a binary one.

Both blocks 684 and 686 then proceed to block 688, where control means 360 determines whether the most recent bit is the last bit of the requested byte. If it is not the last bit, flow diagram 650 proceeds to block 690, where the process for reading the next bit begins. From block 690, flow diagram 650 returns back to block 678, where the third predetermined number of energy transitions is coupled to medium 110. If, however, the most recent bit was the last bit in the byte, flow diagram 650 proceeds to block 692, where the bits of the byte are sent to subsystem 390. From block 692, flow diagram 650 proceeds to the end block 694.

It may be appreciated that the acknowledgment responses sent by slave station 200 are not needed for the communications between stations 200 and 300 according to the present invention, but rather are for providing a fault tolerant communication means, as in a further preferred embodiment of the present invention. Thus, the operations of blocks 656–658 and 668–670 are not necessary for carrying out data communications according to the present invention, but rather are preferred.

An exemplary flow diagram for the write-byte operation of block 622 shown in FIG. 7 is shown at 700 in FIGS. 10A and 10B. Flow diagram 700 comprises blocks 702 through 742, starting at block 702 and ending at block 742. At blocks 704 through 708, the write-byte command is issued to slave station 200. In blocks 710 through 724, master control means 360 sends the address of the byte to be written to slave station 200. In blocks 726 through 740, control means 360 provides the data byte to slave station 200. The steps at each of these blocks is described in greater detail below.

From starting block 702, flow diagram 700 proceeds to block 704, where control means 360 couples the seventh predetermined number of energy transitions to coupling medium 110. Block 704 includes the steps of flow diagram 630 shown in FIG. 8, with the selected number of energy transitions being equal to the seventh predetermined number. At the end of the steps of block 704, a resting duration in the energy transitions is created. The seventh predetermined number of transitions indicates to slave station 200 that master station 300 is providing a byte of data.

In response to receiving the seventh predetermined number of energy transitions, slave station 200 couples one or more energy transitions to medium 110 during the subsequent resting duration, as an acknowledgement of receiving and understanding the write-byte command. However, there is a possibility that slave station 200 may not receive or understand the write-byte command due to electromagnetic interference or other reasons, and therefore does not respond. Flow diagram 700 proceeds to block 706, where master control means 360 monitors its port 366 for this response from slave station 200. For this monitoring step, master control means 360 de-activates its port 367 (low voltage), waits a predetermined time for a response, and then re-activates port 367 (high voltage). From block 706, flow diagram 700 proceeds to block 708, where the determination is made whether slave station 200 has issued a response. If slave station has not issued a response, flow diagram 700 returns back to block 704, where the seventh predetermined number of energy transitions is again coupled to medium 110. This provides fault tolerance for the communication system according to the present invention. If there is a response at block 708, flow diagram 700 proceeds to block 710, where the process of sending the address to slave station 200 begins.

At block 710, control means 360 obtains the first bit of the address and proceeds to block 712, where control means 360 determines whether the bit has a binary zero or a binary one value. If the bit is a binary zero, flow diagram 700 proceeds to block 714, where master control means 360 couples the first predetermined number of energy transitions to medium 110. This block includes the steps of flow diagram 630 shown in FIG. 8, with the selected number of energy transitions being equal to the first predetermined number. If the address bit is a binary one, flow diagram 700 proceeds to block 716, where the second predetermined number of energy transitions is coupled to medium 110. This block includes the steps of flow diagram 630 shown in FIG. 8, with the selected number of energy transitions being equal to the second predetermined number. At the end of the steps of each block 714 and 716, a resting duration in the energy transitions is created.

From block 714 and 716, flow diagram 700 proceeds to block 718, where master control means 360 monitors its port 366 during the subsequent resting duration for a response from slave station 200 acknowledging receipt of either the first or second predetermined number of energy transitions. For this monitoring step, master control means 360 de-activates its port 367 (low voltage), waits a predetermined time for a response, and then re-activates port 367 (high voltage). From block 718, flow diagram 700 proceeds to block 720, where master control means 360 determines whether a response from slave station 200 has been received. If no response has been received, flow diagram 700 returns back to block 704 to reissue the write-byte command. This provides fault tolerance for the communication system according to the present invention.

If a response is received, flow diagram 700 proceeds to block 722, where master control means 360 determines whether the most recent bit sent is the last bit in the address.

If it is not the last bit, flow diagram 700 proceeds to block 724, where the next address bit is obtained. From block 724, flow diagram 700 returns back to block 712 to transmit the next address bit to slave station 200 according to the operations of block 712–720. If the most recent bit is the last address bit, flow diagram 700 then proceeds to block 726, where the sending of the data byte to slave station 200 begins.

At block 726, the first bit of the data byte to be sent is obtained. Flow diagram 700 then proceeds to block 728, where control means 360 determines whether the bit is a binary zero or binary one. If the bit is a binary zero, flow diagram 700 proceeds to block 730, where control means 360 couples the first predetermined number of energy transitions to coupling medium 110. This block includes the steps of flow diagram 630 shown in FIG. 8, with the selected number of energy transitions being equal to the first predetermined number. If the bit is a binary one, flow diagram 700 proceeds to block 732, where the second predetermined number of energy transitions is coupled to medium 110. This block includes the steps of flow diagram 630 shown in FIG. 8, with the selected number of energy transitions being equal to the second predetermined number. At the end of the steps of each block 730 and 732, a resting duration in the energy transitions is created.

From each of blocks 730 and 732, flow diagram 700 proceeds to block 734, where control means 360 monitors its port 366 during the subsequent resting duration for a response back from slave station 200 acknowledging receipt of the data bit. For this monitoring step, master control means 360 de-activates its port 367 (low voltage), waits a predetermined time for a response, and then re-activates port 367 (high voltage). Flow diagram 700 then proceeds to block 736, where control means 360 determines whether slave station 200 has issued a response. If no response has been issued during the resting duration, flow diagram 700 returns back to block 704, where control means 360 reissues the write-byte command to slave station 200. This provides fault tolerance for the communication system according to the present invention. If slave station 200 issues a response, flow diagram 700 proceeds to block 738, where master control means 360 determines if the most recent bit sent is the last bit in the data byte. If not, flow diagram 700 proceeds to block 740 where master control means 360 obtains the next bit in the data byte. From block 740, flow diagram 700 returns back to block 728 to transmit the next bit to slave station 200. If the most recent bit is the last bit, flow diagram 700 proceeds to block 742 where it ends.

It may be appreciated that the acknowledgment responses sent by slave station 200 are not needed for the communications between stations 200 and 300 according to the present invention, but rather are for providing a fault tolerant communication means, as in a further preferred embodiment of the present invention. Thus, the operations of blocks 706–708,718–720, and 734–736 are not necessary for carrying out data communications according to the present invention, but rather are preferred.

A flow diagram of the operation of an exemplary slave control means 260 for master station 300 according to the present invention is shown at 800 in FIG. 11. Flow diagram 800 comprises blocks 802–822, beginning at block 802 and ending at block 822. In blocks 804 through 810, slave control means 260 synchronizes communications with master station 300. In blocks 812–822, slave control means 260 interprets the communication command from master station 300, executes the communication command, and then checks for a further communication command.

From starting block 802, flow diagram 800 proceeds to block 804 where slave control means 260 detects the application of power at its port 244, shown in FIG. 4B. From block 804, flow diagram 800 proceeds to block 806, where slave control means 260 sets its energy transition count to zero. As indicated above, a digital counter means, as well known in the digital circuit arts, may be used for holding the transition count. From block 806, flow diagram 800 proceeds to block 808, where slave control means 260 monitors its port 262 for an indication of an absent energy transition, or resting duration, as provided by master station 300 at the end of block 608 shown in FIG. 7. Once a resting duration is detected, flow diagram 800 proceeds to block 810, where slave control means 260 issues a response for slave station 200. This response is detected by master control means 360 at blocks 610–612 of flow diagram 600 shown in FIG. 7. The operation of slave control means 260 for issuing a response by coupling a number of energy transitions to medium 110 is described below in greater detail with reference to a flow diagram 830 shown in FIG. 12.

From block 810, flow diagram 800 proceeds to block 812, where slave control means 260 counts the number of transitions indicated on its input port 261 until a resting duration is indicated on its input port 262. Flow diagram 800 proceeds to block 814, where slave control means 260 determines whether the number of counted transitions indicates that master station 300 is issuing a read-byte command (the sixth predetermined number of energy transitions). If so, flow diagram 800 proceeds to block 818 where a send-byte operation is performed. The send-byte operation at block 818 is explained in greater detail below with reference to a flow diagram 850 shown in FIGS. 13A and 13B. If the command from master station 300 is not a read-byte command, flow diagram 800 proceeds to block 816. At this block, slave control means 260 determines whether the number of counted transitions indicates that master station 300 is issuing a write-byte command (the seventh predetermined number of energy transitions). If so, flow diagram 800 proceeds to block 820 where byte of data is received from master station 300. The receive-byte operation of block 820 is explained in greater detail below with reference to a flow diagram 900 shown in FIGS. 14A–14B. If the command is not a write-byte command, flow diagram 800 proceeds to block 822. Each of the operations at blocks 818 and 820 also proceed to block 822 after their respective steps are completed. At block 822, slave control means 260 sets its transition count to zero. Flow diagram 800 then returns back to block 812 to count transitions and thereby be enabled to interpret the next command from master station 300.

An exemplary flow diagram for the send-byte operation of block 818 is shown at a flow diagram 850 in FIGS. 13A–13B. Flow diagram 850 comprises blocks 852–892, beginning at block 852 and ending at either of blocks 865 or 892, depending upon transmission conditions. From starting block 852, flow diagram 850 proceeds to block 854, where slave control means 260 issues a response to acknowledge receipt of the read-byte command. This block includes the steps of flow diagram 830 shown in FIG. 12. This response is detected by master control means 360 at blocks 656–658 of flow diagram 650 shown in FIG. 9A. From block 854, flow diagram 850 proceeds to block 856, where slave control means 260 resets its transition count. From block 856, flow diagram 850 proceeds to block 858. In blocks 858 through 875, slave control means 260 receives an address from master station 300. In block 876 through 890, slave control means 260 sends a data byte to master station 300. Each of blocks 858–890 is described in greater detail below.

At block 858, slave control means 260 begins the process of receiving the address for the byte of data which master station 300 is requesting. In a preferred embodiment, the process comprises receiving sets of first and second predetermined numbers of energy transitions, issuing acknowledgement responses, and outputting corresponding address bits to digital subsystem 290. At block 858, reception of the first address bit begins. Flow diagram 850 proceeds to block 860, where slave control means 260 counts the number of transitions indicated on its input port 261 until a resting duration is indicated on its input port 262. From block 860, flow diagram 850 proceeds to block 862 where slave control means 260 determines whether the number of counted transitions indicates a binary zero (first predetermined number). If so, flow diagram 850 proceeds to block 866, where slave control means 260 sends a binary zero address bit to digital subsystem 290 or, in an alternative embodiment, records a binary zero address bit for later transmission to subsystem 290 after the last address bit has been received. If the number of transitions does not indicate a binary zero address bit, flow diagram 850 proceeds to block 864, where slave control means 260 determines whether the number of counted transitions indicates a binary one (second predetermined number). If so, flow diagram 850 proceeds to block 868, where slave control means 260 sends a binary one address bit to digital subsystem 290 or, in an alternative embodiment, records a binary zero address bit for later transmission to subsystem 290 after the last address bit has been received. If the number of transitions does not indicate a binary zero address bit, flow diagram 850 proceeds to block 865 where the send-byte operation is terminated. This may occur if electromagnetic interference has altered the number of energy transitions coupled to slave station 200 by master station 300. In this case, slave control means proceeds to block 822 (from block 818) of flow diagram 800 shown in FIG. 11. Master control means 360 detects this transmission error condition at block 670 of flow diagram 650 (shown in FIG. 9A) because slave station 200 does not issue an acknowledgement response.

From each of blocks 866 and 868, flow diagram 850 proceeds to block 870, where slave control means 260 issues a response acknowledging receipt of the address bit. This block includes the steps of flow diagram 830 shown in FIG. 12. This response is detected by master control means 360 at blocks 668–670 of flow diagram 650 shown in FIG. 9A. From block 870, flow diagram 850 proceeds to block 872, where slave control means 260 resets its transition count. Flow diagram 850 then proceeds to block 874, where slave control means 260 determines whether the most recent address bit sent by master station 300 is the last bit in the address. If it is not the last bit, flow diagram 850 proceeds to block 875, where control means 260 prepares to receive the next address bit. From block 875, flow diagram 850 returns back to block 860 to receive the next address bit according to the operations of blocks 860–872. If the most recent bit is the last address bit, flow diagram 850 then proceeds to block 876, where slave control means 860 receives a data byte from digital subsystem 290 which corresponds to the received address.

From block 876, flow diagram 850 proceeds to block 878, where slave control means 260 gets the first bit of the data byte and begins the process of sending the first data bit to master station 300. From block 878, flow diagram 850 proceeds to block 880, where slave control means 260 counts transitions until a resting duration occurs. In a preferred embodiment of the present invention, the number of counted transitions is equal to the third predetermined number. From block 880, flow diagram 850 proceeds to block 882, where slave control means determines whether the current bit being sent represents a binary one or a binary zero value. If the current bit represents a binary one value, flow diagram 850 proceeds to block 884, where slave control means issues a response comprising the coupling of one or more energy transitions to coupling medium 110. This block includes the steps of flow diagram 830 shown in FIG. 12. From block 884, flow diagram 850 proceeds to block 886, where slave control means 260 resets its transition count. If the current bit represents a binary zero value, flow diagram 850 proceeds from block 882 to block 886 to reset the transition count without issuing a response. Master control means 360 detects whether a response during this resting duration occurs and records a binary one value if one or more transitions occur and a binary zero value if no transitions occur (cf. blocks 680–686 of flow diagram 650 shown in FIGS. 9A–9B). In this way, a binary digit is sent to master station 300.

From block 886, flow diagram 850 proceeds to block 888, where slave control means 260 determines whether the most recent bit sent was the last bit in the data byte. If it is not the last bit, flow diagram 850 proceeds to block 890, where the next address bit is obtained. From block 890, flow diagram 850 returns back to block 880 to transmit the next data bit to master station 300 according to the operations of blocks 880–886. If the most recent bit is the last data bit, flow diagram 850 proceeds to block 892, where the send byte operation ends. The operation of slave control means 260 returns to block 822 (from block 818) of flow diagram 800 shown in FIG. 11.

An exemplary flow diagram for the receive-byte operation of block 820 is shown at a flow diagram 900 in FIGS. 14A–14B. Flow diagram 900 comprises blocks 902–946, beginning at block 902 and ending at either of blocks 915, 935, or 946, depending upon transmission conditions. From starting block 902, flow diagram 900 proceeds to block 904, where slave control means 260 issues a response to acknowledge receipt of the write-byte command. This block includes the steps of flow diagram 830 shown in FIG. 12. This response is detected by master control means 360 at block 706 of flow diagram 700 shown in FIG. 10A. From block 904, flow diagram 900 proceeds to block 906, where slave control means 260 resets its transition count. From block 906, flow diagram 900 proceeds to block 908. In blocks 908 through 925, slave control means 260 receives an address from master station 300. In block 926 through 945, slave control means 260 receives a data byte from master station 300. Each of blocks 908–945 is described in greater detail below.

At block 908, slave control means 260 begins the process of receiving the address of the byte of data which master station 300 is sending. In a preferred embodiment, the process comprises receiving sets of first and second predetermined numbers of energy transitions, issuing acknowledgement responses, and outputting corresponding address bits to digital subsystem 290. At block 908, reception of the first address bit begins. Flow diagram 900 proceeds to block 910, where slave control means 260 counts the number of transitions indicated on its input port 261 until a resting duration is indicated on its input port 262. From block 910, flow diagram 900 proceeds to block 912 where slave control means 260 determines whether the number of counted transitions indicates a binary zero (first predetermined number). If so, flow diagram 900 proceeds to block 916, where slave control means 260 sends a binary zero address bit to digital subsystem 290 or, in an alternative embodiment, records a binary zero address bit for later transmission to subsystem 290 after the last address bit has been received. If the number of transitions does not indicate a binary zero address bit, flow diagram 900 proceeds to block 914, where slave control means 260 determines whether the number of counted transitions indicates a binary one (second predetermined number). If so, flow diagram 900 proceeds to block 918, where slave control means 260 sends a binary one address bit to digital subsystem 290 or, in an alternative embodiment, records a binary zero address bit for later transmission to subsystem 290 after the last address bit has been received.

If the number of transitions does not indicate a binary zero address bit, flow diagram 900 proceeds to block 915 where the receive-byte operation is terminated. This may occur if electromagnetic interference has altered the number of energy transitions coupled to slave station 200 by master station 300. In this case, slave control means proceeds to block 822 (from block 820) of flow diagram 800 shown in FIG. 11. Master control means 360 detects this transmission error condition at block 720 of flow diagram 700 (shown in FIG. 10A) because slave station 200 does not issue an acknowledgement response.

From each of block 916 and 918, flow diagram 900 proceeds to block 920, where slave control means 260 issues a response acknowledging receipt of the address bit. This block includes the steps of flow diagram 830 shown in FIG. 12. This response is detected by master control means 360 at block 718–720 of flow diagram 700 shown in FIG. 10A). From block 920, flow diagram 900 proceeds to block 922, where slave control means 260 resets its transition count. Flow diagram 900 then proceeds to block 924, where slave control means 260 determines whether the most recent address bit sent by master station 300 is the last bit in the address. If it is not the last bit, flow diagram 900 proceeds to block 925, where control means 260 prepares to receive the next address bit. From block 925, flow diagram 900 returns back to block 910 to receive the next address bit according to the operations of block 910–922. If the most recent bit is the last address bit, flow diagram 900 then proceeds to block 928.

At block 928, slave control means 260 prepares to receive the bits of the data byte being sent by master station 300. In a preferred embodiment, the process comprises receiving sets of first and second predetermined numbers of energy transitions, issuing knowledgement responses, and outputting corresponding data bits to digital subsystem 290. At block 928, reception of the first data bit begins. Flow diagram 900 proceeds to block 930, where slave control means 260 counts the number of transitions indicated on its input port 261 until a resting duration is indicated on its input port 262. From block 930, flow diagram 900 proceeds to block 932 where slave control means 260 determines whether the number of counted transitions indicates a binary zero (first predetermined number). If so, flow diagram 900 proceeds to block 936, where slave control means 260 sends a binary zero data bit to digital subsystem 290 or, in an alternative embodiment, records a binary zero data bit for later transmission to subsystem 290 after the last data bit has been received. If the number of transitions does not indicate a binary zero data bit, flow diagram 900 proceeds to block 934, where slave control means 260 determines whether the number of counted transitions indicates a binary one (second predetermined number). If so, flow diagram 900 proceeds to block 938, where slave control means 260 sends a binary one data bit to digital subsystem 290 or, in an alternative embodiment, records a binary zero data bit for later transmission to subsystem 290 after the last data bit has been received.

If the number of transitions does not indicate a binary zero data bit, flow diagram 900 proceeds to block 935 where the receive-byte operation is terminated. This may occur if electromagnetic interference has altered the number of energy transitions coupled to slave station 260 by master station 300. In this case, slave control means proceeds to block 822 (from block 820) of flow diagram 800 shown in FIG. 11. Master control means 360 detects this transmission error condition at block 736 of flow diagram 700 (shown in FIG. 10B) because slave station 200 does not issue an acknowledgement response.

From each of blocks 936 and 938, flow diagram 900 proceeds to block 940, where slave control means 260 issues a response acknowledging receipt of the data bit. This block includes the steps of flow diagram 830 shown in FIG. 12. (This response is detected by master control means 360 at blocks 734–736 of flow diagram 700 shown in FIG. 10B). From block 940, flow diagram 900 proceeds to block 942, where slave control means 260 resets its transition count. Flow diagram 900 then proceeds to block 944, where slave control means 260 determines whether the most recent data bit sent by master station 300 is the last bit in the data byte. If it is not the last bit, flow diagram 900 proceeds to block 945, where control means 260 prepares to receive the next data bit. From block 945, flow diagram 900 returns back to block 930 to receive the next data bit according to the operations of blocks 930–942. If the most recent bit is the last data bit, flow diagram 900 then proceeds to block 946, where slave control proceeds to block 946, where the receive byte operation ends. The operation of slave control means 260 returns to block 822 (from block 820) of flow diagram 800 shown in FIG. 11.

Alternate embodiments for coil form 315, inductor means 310, and inductor means 320 are now described with reference to FIGS. 15A and 15B. Shown in FIG. 15A are an alternate coil form 315A, a power inductor means 310A, and a data receiving inductor means 320A. Coil form 315A corresponds in function to coil form 315 shown in FIG. 3, and inductor means 310A and 320A correspond respectively to inductor means 310 and 320, shown in FIG. 3. Also shown in FIG. 15A are coupling medium 110, slave station 200, including substrate 205. Coil form 315A comprises a body of ferromagnetic material shaped in the form of a "C". Inductor means 310A and 320A are wrapped around the midsection of coil form 315A, as shown in FIG. 15A. Between the ends of coil form 315A an air gap is formed, which serves for receiving substrate 205, as shown in FIG. 15A. Electromagnetic coupling medium 110 is disposed in the air gap, as indicated.

Shown in FIG. 15B is an alternative inductor means 310B on a second alternate coil form 315B. Inductor means 310B corresponds in function to inductor means 310 shown in FIG. 3. Also shown in FIG. 15B are slave station 200, including substrate 205, and electromagnetic coupling medium 110. Coil form 315B comprises two bodies of ferromagnetic material, each preferably in the form of a cylinder. The two bodies of coil form 315B are disposed opposite one another with an air gap formed between confronting surfaces thereof. Electromagnetic coupling medium 110 is disposed in this air gap, as shown in FIG. 15B. As with the previous embodiment of the coil form according to the present invention, the air gap is for receiving substrate 205.

Inductor means 310B comprises a first plurality of windings disposed about the outer cylindrical surface of the first body of coil form 315B, and a second plurality of windings disposed about the outer cylindrical surface of the second body of coil form 315B. The two sets of windings for inductor means 310B are coupled together to form two (2) windings electrically coupled in parallel on both sides of coil form 315B. These windings are coupled such that the magnetomotive forces generated by each winding add constructively in the air gap between the two bodies. Inductor means 310B comprises a first terminal 311B, which is coupled to a first terminal of each of the windings, and a second terminal 312B, which is coupled to a second terminal of each of the windings. A data receiving inductor means, such as means 320, may be disposed about the outer cylindrical surface of either body of 315B.

Inductor means 310B and coil form 315B have the advantage, with respect to inductor means 310 and coil form 315 shown in FIG. 3, of providing better electromagnetic coupling to slave station 200 from both the top and bottom surfaces of substrate 205. With respect to coil form 315A and inductor means 310A shown in FIG. 15A, inductor means 310B and coil form 315B have significantly less core losses due to the close placement of inductor means 310B to coupling medium 110. As known in the art, many ferromagnetic materials have significant core losses due to eddy currents. Thus, for coupling the maximum amount of power from inductor means 310 to slave station 200, inductor means 310B and coil form 315B are preferred over inductor means 310A and coil form 315A, and over inductor means 310 and coil form 315, shown in FIG. 3.

Having described exemplary communication system 100, master station 300, and slave station 200, further embodiments thereof are now described. In one further embodiment of communication system 100, master station 300 and slave station 200 are configured as a key entry system where slave station 200 serves to identify the holder of the key (e.g., a human user) and master station 300 selectively allows entry of key holder into a desired area, such as a house, business, warehouse, or classified security area. In this embodiment, digital subsystem 290 of slave station 200 includes an identifier having a plurality of non-volatile data digits, and digital subsystem 390 of master station 300 includes one or more commands, e.g., one or more read-byte commands, for obtaining the identifier from slave station 200. Additionally, digital subsystem 390 includes means for confirming, or authenticating, the identifier of the key holder, such as, for example, a non-volatile memory table of all allowable, i.e., predetermined, identifier values. Also, digital subsystem 390 further includes means responsive to the confirmation of the identifier for controlling access to the desired area, such as, for example, means for generating a digital signal which directs a locking mechanism to open. An advantage of the present invention is that the identifier of the key holder (slave station 200) may be readily changed without having to replace the key.

In this embodiment of the present invention, as well as other appropriate embodiments, slave station 200 may be provided on a badge, a ring, a key, a coin, or a token.

In another embodiment of communication system 100, master station 300 and slave station 200 are configured as a credit-card authorization system where slave station 200 serves to provide the credit account information of a card user to master station 300 and master station 300 evaluates the user's account information in view of a desired purchase and selectively authorizes the purchase depending upon the amount and credit account information. In this embodiment, digital subsystem 290 of slave station 200 includes an account number identifier having a plurality of non-volatile data digits and, optionally, an account expiration date having a plurality of data digits. Additionally, digital subsystem 390 of master station 300 includes one or more commands, e.g., one or more read-byte commands, for obtaining the account number, and optionally expiration date, from slave station 200. Additionally, digital subsystem 390 includes means for confirming, or authenticating, the credit of the card user against the purchase amount, such as for example by transmitting the account number and purchase amount to a central credit agency for approval. An advantage of this system of the present invention is that a personalized identification number may be included to prevent unauthorized persons from using the card. Another advantage is that a credit balance may be included within digital subsystem 290 and updated as purchases are made. This would allow the use of the credit card without having to immediately transmit the account information and purchase amount to the central credit agency for approval. As purchases are made, the credit balance is updated (i.e., reduced). As such, the transaction time for a purchase may be reduced. Periodically, the balance on the card and the balance at the central credit agency may be reconciled.

In another embodiment of communication system 100, master station 300 and slave station 200 are configured as a electronic coin or token system where slave station 200 carries an adjustable monetary value for the card user to be used to electronically pay for services, such as photocopying or transportation fares. Master station 300 reads the current monetary value and, when the purchase amount is less than the current monetary value, authorizes the purchase and adjusts the monetary value to reflect the purchase. In this embodiment, digital subsystem 290 of slave station 200 includes a plurality of non-volatile data digits for storing the monetary value. Additionally, digital subsystem 390 of master station 300 preferably includes one or more commands, e.g., one or more read-byte commands, for obtaining the monetary value and for updating the value after a purchase is made (i.e., providing a revised monetary value to slave station 200). An advantage of this system of the present invention is that monetary transactions could be greatly simplified since the need for providing exact change and the changing of large denomination bill would not be necessary. Another advantage is that a personalized identification number may be included to prevent unauthorized persons from using the money indicated by the electronic coin.

In another embodiment of communication system 100, master station 300 and slave station 200 are configured as an electronic labeling system where slave station 200 serves to provide information for an object (e.g., a shipping container or a human) to which it is affixed and master station 300 accesses the information and, optionally updates or amends the information given certain events. In this embodiment, digital subsystem 290 of slave station 200 preferably includes a plurality of non-volatile data digits for storing the information and digital subsystem 390 of master station 300 includes one or more commands, e.g., one or more read-byte commands, for obtaining the information from slave station 200. In the case where the object is a shipping container or the like, the information may include such things as the origin and destination of the container, the date shipped, and the contents. In the case where the object is a human, the information may include the medical history, medical ailments, and allergic reactions of the human. An advantage of this system of the present invention is that a great deal of information may be provided within slave station 200. A further advantage is that this information can be configured such that it is accessible only to authorized persons.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiment(s) but, on the contrary, is intended to cover various modifications and equivalent arrangements included within the scope of the appended claims.

What is claimed is:

1. A system for data transmission between a master station and a slave station in which an electromagnetic coupling medium is formed between the master station and the slave station, the electromagnetic coupling medium being capable of communicating data bi-directionally between the master station and the slave station in the form of electromagnetic energy transitions, said system comprising:

means in said master station for transmitting a first digital value to said slave station, including means for causing a first predetermined number of energy transitions to be coupled to said medium followed by a first resting duration in which substantially no energy transitions are coupled to said medium by said master station, said energy transitions being coupled through said medium in the form of energy pulses, each said energy pulse having a first energy level, a second energy level, and energy transitions between said first and second energy levels;

means in said master station for transmitting a second digital value to said slave station, including means for causing a second predetermined number of energy transitions to be coupled to said medium followed by a second resting duration in which substantially no energy transitions are coupled to said medium by said master station;

means in said slave station for detecting from said medium said first predetermined number of energy transitions followed by said first resting duration and for outputting a signal representative of said first digital value in response thereto, and for detecting said second predetermined number of energy transitions followed by said second resting duration and for outputting a signal representative of said second digital value in response thereto; and means in said slave station for powering said slave station from the energy pulses coupled to it by said master station through said electromagnetic coupling medium.

2. The system of claim 1 further comprising:

means in said master station for initiating a read operation from said slave station, including means for causing a third predetermined number of energy transitions to be coupled to said medium followed by a third resting duration in which substantially no energy transitions are coupled to said medium by said master station;

means in said slave station for detecting from said medium said third predetermined number of energy transitions followed by said third resting duration and for outputting a read command signal in response thereto, means in said slave station responsive to said read command signal for transmitting a binary zero value to said master station, including means for causing a fourth predetermined number of energy transitions to be coupled to said medium by said slave station during said third resting duration;

means in said slave station responsive to said read command signal for transmitting a binary one value to said master station, including means for causing a fifth predetermined number of energy transitions to be coupled to said medium by said slave station during said third resting duration, said fifth predetermined number being different from said fourth predetermined number;

means in said master station for detecting from said medium said fourth predetermined number of energy transitions during said third resting duration and for outputting a signal representative of said binary zero value in response thereto; and means in said master station for detecting from said medium said fifth predetermined number of energy transitions during said third resting duration and for outputting a signal representative of said binary one value in response thereto.

3. The system of claim 2 wherein said third predetermined number is different from said first predetermined number and is different from said second predetermined number.

4. The system of claim 2 wherein said fourth predetermined number of energy transitions used for transmitting said binary zero value is zero, and wherein said fifth predetermined number of energy transitions used for transmitting said binary one value is at least one.

5. The system of claim 1 wherein said first digital value represents a binary zero of a binary digit and said second value represent a binary one of said binary digit.

6. The system of claim 1 wherein said electromagnetic energy coupling medium conveys the energy transitions substantially in the form of magnetomotive force, energy.

7. The system of claim 1 wherein said first energy level of each said energy pulse is substantially zero and wherein said second energy level of each said energy pulse is a non-zero energy value.

8. A system for data transmission between a master station and a slave station in which an electromagnetic coupling medium is formed between the master station and the slave station, the electromagnetic coupling medium being capable of communicating data hi-directionally between the master station and the slave station in the form of electromagnetic energy transitions, said system comprising:

means in said master station for initiating a read operation from said slave station, including means for causing a first predetermined number of energy transitions to be coupled to said medium followed by a first resting duration in which substantially no energy transitions are coupled to said medium by said master station;

means in said slave station for detecting from said medium said first predetermined number of energy transitions followed by said first resting duration and for outputting a read command signal in response thereto, means in said slave station responsive to said read command signal for transmitting a binary zero value to said master station, including means for causing a second predetermined number of energy transitions to be coupled to said medium by said slave station during said first resting duration;

means in said slave station responsive to said read command signal for transmitting a binary one value to said master station, including means for causing a third predetermined number of energy transitions to be coupled to said medium by said slave station during said first resting duration, said third predetermined number being different from said second predetermined number;

means in said master station for detecting from said medium said second predetermined number of energy transitions during said first resting duration and for outputting a signal representative of said binary zero value in response thereto; and means in said master station for detecting from said medium said third predetermined number of energy transitions during said first resting duration and for outputting a signal representative of said binary one value in response thereto.

* * * * *